US012262177B2

(12) United States Patent
Liang et al.

(10) Patent No.: US 12,262,177 B2
(45) Date of Patent: Mar. 25, 2025

(54) AIR-PULSE GENERATING DEVICE PRODUCING ASYMMETRIC AIR PULSES

(71) Applicant: xMEMS Labs, Inc., Santa Clara, CA (US)

(72) Inventors: Jemm Yue Liang, Sunnyvale, CA (US); Jye Ren, Taipei (TW); Eldwin Jiaqiang Ng, Sunnyvale, CA (US)

(73) Assignee: xMEMS Labs, Inc., Santa Clara, CA (US)

( * ) Notice: Subject to any disclaimer, the term of this patent is extended or adjusted under 35 U.S.C. 154(b) by 0 days.

(21) Appl. No.: 18/321,753

(22) Filed: May 22, 2023

(65) Prior Publication Data

US 2023/0292058 A1 Sep. 14, 2023

Related U.S. Application Data

(63) Continuation-in-part of application No. 17/553,806, filed on Dec. 17, 2021, now Pat. No. 11,758,335.

(60) Provisional application No. 63/459,170, filed on Apr. 13, 2023, provisional application No. 63/447,835, filed on Feb. 23, 2023, provisional application No. 63/447,758, filed on Feb. 23, 2023, provisional (Continued)

(51) Int. Cl.

| | |
|---|---|
| ***H04R 23/00*** | (2006.01) |
| ***H04R 1/30*** | (2006.01) |
| ***H04R 3/04*** | (2006.01) |
| ***H04R 7/06*** | (2006.01) |
| ***H04R 17/00*** | (2006.01) |

(52) U.S. Cl.

CPC ............... *H04R 23/00* (2013.01); *H04R 1/30* (2013.01); *H04R 3/04* (2013.01); *H04R 7/06* (2013.01); *H04R 17/00* (2013.01); *H04R 2217/03* (2013.01)

(58) Field of Classification Search

None

See application file for complete search history.

(56) References Cited

U.S. PATENT DOCUMENTS 4,275,363 A 6/1981 Mishiro
4,646,733 A 3/1987 Stroh (Continued)

FOREIGN PATENT DOCUMENTS

CN 101282590 A 10/2008
CN 106454666 A 2/2017

(Continued)

OTHER PUBLICATIONS

TutorialsPoint, Analog Communication—DSBSC Modulation (https://web.archive.org/web/20201126095635/https://www.tutorialspoint.com/analog_communication/analog_communication_dsbsc_modulation.htm ) (archived Nov. 26, 2020) (last accessed Dec. 11, 2023) (Year: 2020).*

(Continued)

*Primary Examiner* — Walter F Briney, III
(74) *Attorney, Agent, or Firm* — Winston Hsu

(57) ABSTRACT

An air-pulse generating device includes a film structure. The film structure is driven to form an amplitude-modulated ultrasonic air pressure variation with an ultrasonic carrier frequency. The film structure is driven to form an opening at a rate synchronous with the ultrasonic carrier frequency. The air-pulse generating device produces a plurality of air pulses according to the amplitude-modulated ultrasonic air pressure variation, and the plurality of air pulses is asymmetric.

27 Claims, 34 Drawing Sheets

Related U.S. Application Data application No. 63/436,103, filed on Dec. 29, 2022, provisional application No. 63/435,275, filed on Dec. 25, 2022, provisional application No. 63/434,474, filed on Dec. 22, 2022, provisional application No. 63/433,740, filed on Dec. 19, 2022, provisional application No. 63/428,085, filed on Nov. 27, 2022, provisional application No. 63/354,433, filed on Jun. 22, 2022, provisional application No. 63/353,610, filed on Jun. 19, 2022, provisional application No. 63/353,588, filed on Jun. 18, 2022, provisional application No. 63/347,013, filed on May 30, 2022, provisional application No. 63/346,848, filed on May 28, 2022, provisional application No. 63/171,281, filed on Apr. 6, 2021, provisional application No. 63/143,510, filed on Jan. 29, 2021, provisional application No. 63/142,627, filed on Jan. 28, 2021, provisional application No. 63/139,188, filed on Jan. 19, 2021, provisional application No. 63/138,449, filed on Jan. 17, 2021, provisional application No. 63/137,479, filed on Jan. 14, 2021.

(56) References Cited

U.S. PATENT DOCUMENTS

| | | | | |
|---|---|---|---|---|
| 4,942,939 | A | 7/1990 | Harrison | |
| 4,973,876 | A | 11/1990 | Roberts | |
| 5,109,948 | A | 5/1992 | Sandstrom | |
| 5,611,406 | A | 3/1997 | Matsuzaki | |
| 7,736,324 | B1 | 6/2010 | Helgeson | |
| 10,425,732 | B1 | 9/2019 | Liang | |
| 10,484,784 | B1 | 11/2019 | Liang | |
| 10,771,893 | B1 | 9/2020 | Liang | |
| 10,779,088 | B1 | 9/2020 | Liang | |
| 11,172,310 | B2 | 11/2021 | Liang | |
| 12,028,673 | B2 | 7/2024 | Lo | |
| 2004/0024455 | A1 | 2/2004 | de Vries | |
| 2005/0235988 | A1 | 10/2005 | Hansen | |
| 2008/0121220 | A1 | 5/2008 | Wilder | |
| 2010/0246864 | A1 | 9/2010 | Hildebrandt | |
| 2010/0278368 | A1 | 11/2010 | Martin | |
| 2012/0018244 | A1 | 1/2012 | Robert | |
| 2012/0032892 | A1 | 2/2012 | Pasquero | |
| 2012/0081337 | A1 | 4/2012 | Camp, Jr. | |
| 2013/0044904 | A1 | 2/2013 | Margalit | |
| 2013/0279738 | A1 | 10/2013 | Daley | |
| 2014/0064036 | A1* | 3/2014 | Tseng | G10K 7/00 367/190 |
| 2014/0084396 | A1 | 3/2014 | Jenkins | |
| 2014/0341394 | A1 | 11/2014 | Croft, III | |
| 2016/0059206 | A1 | 3/2016 | Chen | |
| 2016/0261941 | A1 | 9/2016 | Brioschi | |
| 2016/0356876 | A1 | 12/2016 | Lazik | |
| 2016/0366521 | A1 | 12/2016 | Pinkerton, III | |
| 2016/0381464 | A1 | 12/2016 | Elyada | |
| 2017/0041708 | A1 | 2/2017 | Barzen | |
| 2017/0064450 | A1 | 3/2017 | Kursula | |
| 2017/0064457 | A1 | 3/2017 | Kupershmidt | |
| 2017/0201192 | A1* | 7/2017 | Tumpold | H02N 1/006 |
| 2017/0230756 | A1 | 8/2017 | Schelling | |
| 2017/0255007 | A1 | 9/2017 | Inoue | |
| 2018/0179048 | A1 | 6/2018 | Schenk | |
| 2019/0020944 | A1 | 1/2019 | Kubo | |
| 2019/0116417 | A1 | 4/2019 | Liang | |
| 2019/0141435 | A1 | 5/2019 | Lo | |
| 2019/0238974 | A1 | 8/2019 | Hong | |
| 2019/0313189 | A1 | 10/2019 | Liang | |
| 2020/0059719 | A1 | 2/2020 | Liang | |
| 2020/0068281 | A1 | 2/2020 | Chu | |
| 2020/0087138 | A1 | 3/2020 | Schenk | |
| 2020/0100033 | A1* | 3/2020 | Stoppel | H04R 19/005 |
| 2020/0211521 | A1 | 7/2020 | Voss | |
| 2020/0213770 | A1 | 7/2020 | Duan | |
| 2021/0113029 | A1 | 4/2021 | Wu | |
| 2021/0144884 | A1 | 5/2021 | Mou | |
| 2021/0377652 | A1 | 12/2021 | Unruh | |
| 2022/0047841 | A1 | 2/2022 | Vargas | |
| 2022/0224999 | A1 | 7/2022 | Liang | |
| 2022/0225032 | A1 | 7/2022 | Liang | |
| 2023/0388695 | A1 | 11/2023 | Lo | |

FOREIGN PATENT DOCUMENTS

| | | | |
|---|---|---|---|
| CN | 106961651 | A | 7/2017 |
| CN | 110839195 | A | 2/2020 |
| CN | 111083603 | A | 4/2020 |
| CN | 111083615 | A | 4/2020 |
| CN | 108496345 | B | 2/2021 |
| CN | 114390410 | A | 4/2022 |
| EP | 3 860 145 | A1 | 8/2021 |
| EP | 4 030 782 | A1 | 7/2022 |
| EP | 4 283 607 | A1 | 11/2023 |
| JP | 11-313387 | A | 11/1999 |
| JP | 2011-160309 | A | 8/2011 |
| JP | 2020-522178 | A | 7/2020 |
| JP | 2022-16392 | A | 1/2022 |
| JP | 2022-160366 | A | 10/2022 |
| JP | 2022-160367 | A | 10/2022 |
| JP | 2022-160368 | A | 10/2022 |
| KR | 10-1901204 | B1 | 9/2018 |
| KR | 10-2019-0043489 | A | 4/2019 |
| KR | 10-2019-0116898 | A | 10/2019 |
| KR | 10-2093804 | B1 | 3/2020 |
| TW | 201902812 | A | 1/2019 |
| WO | 2016/202790 | A2 | 12/2016 |
| WO | 2020/230484 | A1 | 11/2020 |

OTHER PUBLICATIONS

Liang, the specification, including the claims, and drawings in the U.S. Appl. No. 17/553,808, filed Dec. 17, 2021.

Liang, the specification, including the claims, and drawings in the U.S. Appl. No. 17/553,813, filed Dec. 17, 2021.

Zhang Hui et al., Design and Test of Air-Coupled Capacitive Micromachined Ultrasonic Transducer Array, Chinese Journal of Sensors and Actuators, www.chinatransducers.com, vol. 31, No. 5, p. 803-808, May 2018 , May. 31, 2018.

* cited by examiner

AIR-PULSE GENERATING DEVICE PRODUCING ASYMMETRIC AIR PULSES

CROSS REFERENCE TO RELATED APPLICATIONS

This application is a continuation-in-part of U.S. application Ser. No. 17/553,806, filed on Dec. 17, 2021, which claims the benefit of U.S. Provisional Application No. 63/137,479, filed on Jan. 14, 2021, and claims the benefit of U.S. Provisional Application No. 63/138,449, filed on Jan. 17, 2021, and claims the benefit of U.S. Provisional Application No. 63/139,188, filed on Jan. 19, 2021, and claims the benefit of U.S. Provisional Application No. 63/142,627, filed on Jan. 28, 2021, and claims the benefit of U.S. Provisional Application No. 63/143,510, filed on Jan. 29, 2021, and claims the benefit of U.S. Provisional Application No. 63/171,281, filed on Apr. 6, 2021. Further, this application claims the benefit of U.S. Provisional Application No. 63/346,848, filed on May 28, 2022. Further, this application claims the benefit of U.S. Provisional Application No. 63/347,013, filed on May 30, 2022. Further, this application claims the benefit of U.S. Provisional Application No. 63/353,588, filed on Jun. 18, 2022. Further, this application claims the benefit of U.S. Provisional Application No. 63/353,610, filed on Jun. 19, 2022. Further, this application claims the benefit of U.S. Provisional Application No. 63/354,433, filed on Jun. 22, 2022. Further, this application claims the benefit of U.S. Provisional Application No. 63/428,085, filed on Nov. 27, 2022. Further, this application claims the benefit of U.S. Provisional Application No. 63/433,740, filed on Dec. 19, 2022. Further, this application claims the benefit of U.S. Provisional Application No. 63/434,474, filed on Dec. 22, 2022. Further, this application claims the benefit of U.S. Provisional Application No. 63/435,275, filed on Dec. 25, 2022. Further, this application claims the benefit of U.S. Provisional Application No. 63/436,103, filed on Dec. 29, 2022. Further, this application claims the benefit of U.S. Provisional Application No. 63/447,758, filed on Feb. 23, 2023. Further, this application claims the benefit of U.S. Provisional Application No. 63/447,835, filed on Feb. 23, 2023. Further, this application claims the benefit of U.S. Provisional Application No. 63/459,170, filed on Apr. 13, 2023. The contents of these applications are incorporated herein by reference.

BACKGROUND OF THE INVENTION

1. Field of the Invention

The present invention relates to an air-pulse generating device, and more particularly, to an air-pulse generating device capable of producing asymmetric air pulses and performing synchronous demodulation.

2. Description of the Prior Art

Speaker driver and back enclosure are two major design challenges in the speaker industry. It is difficult for a conventional speaker to cover an entire audio frequency band, e.g., from 20 Hz to 20 KHz. To produce high fidelity sound with high enough sound pressure level (SPL), both the radiating/moving surface and volume/size of back enclosure for the conventional speaker are required to be sufficiently large.

Therefore, how to design a small sound producing device while overcoming the design challenges faced by conventional speakers is a significant objective in the field.

SUMMARY OF THE INVENTION

It is therefore a primary objective of the present invention to provide an air-pulse generating device, to improve over disadvantages of the prior art.

An embodiment of the present disclosure provides an air-pulse generating device comprising a film structure; wherein the film structure is driven to form an amplitude-modulated ultrasonic air pressure variation with an ultrasonic carrier frequency; wherein the film structure is driven to form an opening at a rate synchronous with the ultrasonic carrier frequency; wherein the air-pulse generating device produces a plurality of air pulses according to the amplitude-modulated ultrasonic air pressure variation, and the plurality of air pulses is asymmetric.

An embodiment of the present disclosure provides an air-pulse generating device comprising a modulation means, configured to perform a modulation operation to generate an amplitude-modulated ultrasonic air pressure variation with an ultrasonic carrier frequency, wherein the amplitude-modulated ultrasonic air pressure variation is amplitude modulated according to an input audio signal, and the input audio signal is an electrical representation of a sound signal; a demodulation means, configured to perform a synchronous demodulation operation on the amplitude-modulated ultrasonic air pressure variation, such that spectral components of the amplitude-modulated ultrasonic air pressure variation is shifted by an amount of integer multiple of the ultrasonic carrier frequency; wherein the air-pulse generating device produces a plurality of air pulses via performing the synchronous demodulation operation; wherein an audible spectrum component of the plurality of air pulses is corresponding to the sound signal.

These and other objectives of the present invention will no doubt become obvious to those of ordinary skill in the art after reading the following detailed description of the preferred embodiment that is illustrated in the various figures and drawings.

DETAILED DESCRIPTION

A fundamental aspect of the present invention relates to an air-pulse generating device, and more particularly, to an air-pulse generating device comprising a modulating means and a demodulating means, where the said modulating means generates an ultrasonic air pressure wave/variation (UAW) having a frequency $f_{UC}$, where the amplitude of UAW is modulated according to an input audio signal $S_{IN}$, which is an electrical (analog or digital) representation of a sound signal SS. This amplitude modulated ultrasonic air pressure wave/variation (AMUAW) is then synchronously demodulated by the said demodulating means such that spectral components embedded in AMUAW are shifted by $\pm n \cdot f_{UC}$, where n is a positive integer. As a result of this synchronous demodulation, spectral components of AMUAW, corresponding to sound signal SS, is partially transferred to the baseband and audible sound signal SS is reproduced as a result. Herein, the amplitude-modulated ultrasonic air pressure wave/variation AMUAW may be corresponding to a carrier component with the ultrasonic carrier frequency $f_{UC}$ and a modulation component corresponding to the input audio signal $S_{IN}$.

Figure 1:
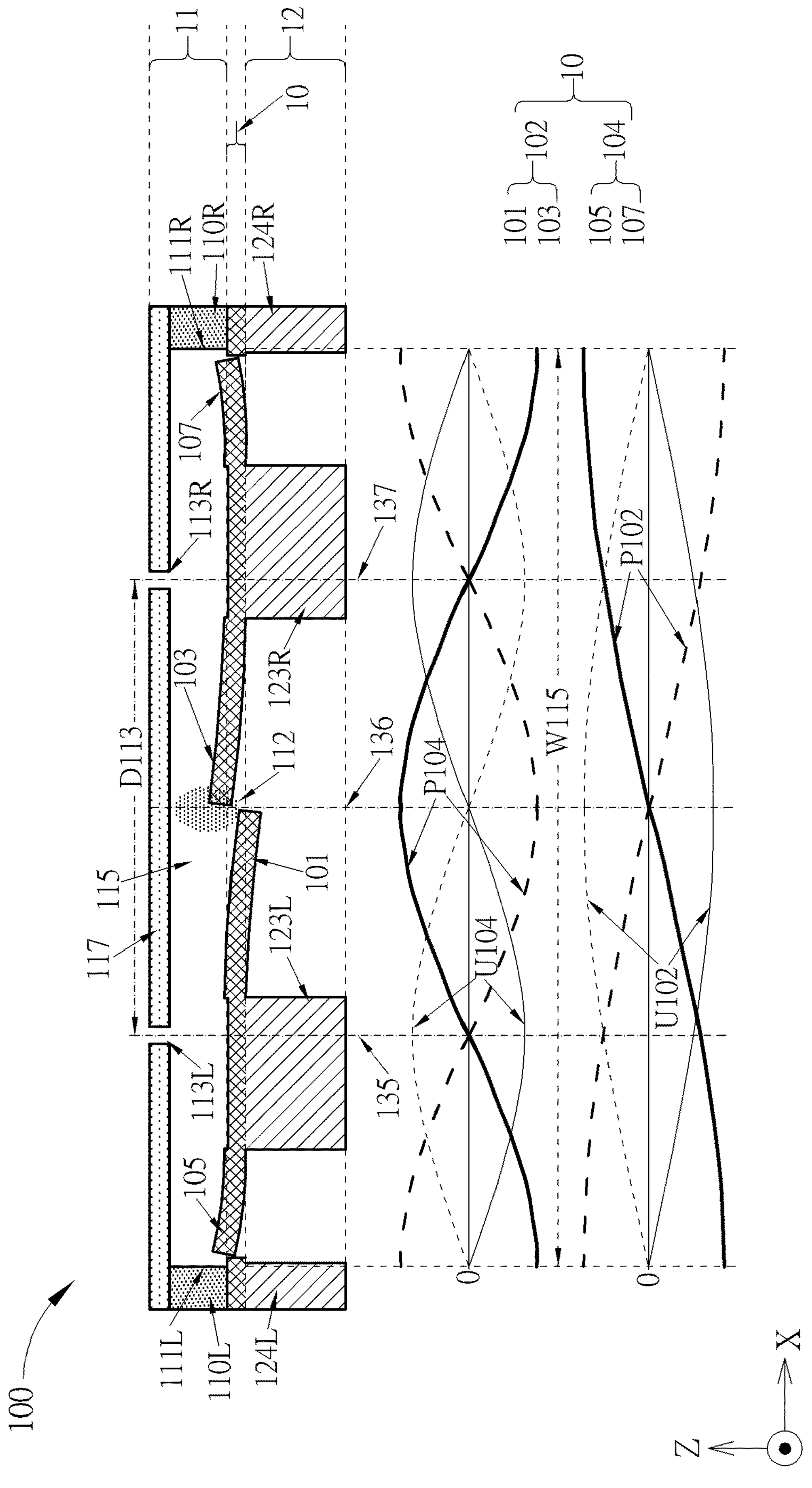
FIG. 1 is a schematic diagram of an air-pulse generating device according to an embodiment of the present invention.

FIG. 1 illustrates a schematic diagram of an air-pulse generating (APG) device 100 according to an embodiment of the present invention. The device 100 may be applied as a sound producing device which produces an acoustic sound according to an input (audio) signal $S_{IN}$, but not limited thereto.

The device 100 comprises a device layer 12 and a chamber definition layer 11. The device layer 12 comprises walls 124L, 124R and supporting structures 123R, 123L supporting a thin film layer which is etched to flaps 101, 103, 105, and 107. In an embodiment, the device layer 12 may be fabricated by MEMS (Micro Electro Mechanical Systems) fabrication process, for example, using a Si substrate of 250~500 μM in thickness, which will be etched to form 123L/R and 124R/L. In an embodiment, on top of this Si substrate, a thin layer, typically 3~6 μM in thickness, made of silicon on insulator SOI or POLY on insulator POI layer, will be etched to form flaps 101, 103, 105 and 107.

The chamber definition layer (which may be also viewed/named as "cap" structure) 11 comprises a pair of chamber sidewalls 110R, 110L and a chamber ceiling 117. In an embodiment, the chamber definition layer (or cap structure) 11 may be manufactured using MEMS fabrication technology. A resonance chamber 115 is defined between this chamber definition layer 11 and the device layer 12.

In other words, the device 100 may be viewed as comprising a film structure 10 and the cap structure 11, between which the chamber 115 is formed. The film structure 10 can be viewed as comprising a modulating portion 104 and a demodulating portion 102. The modulating portion 104, comprising the (modulating) flaps 105 and 107, is configured to be actuated to form an ultrasonic air/acoustic wave within the chamber 115, where air/acoustic wave can be viewed as a kind of air pressure variation, varying both temporally and spatially. In an embodiment, the ultrasonic air/acoustic wave or air pressure variation may be an amplitude DSB-SC (double-sideband suppress carrier) modulated air/acoustic wave with the ultrasonic carrier frequency $f_{UC}$. The ultrasonic carrier frequency $f_{UC}$ may be, for example, in the range of 160 KHz to 192 KHz, which is significantly larger than the maximum frequency of human audible sound.

The terms air wave and acoustic wave will be used interchangeably below.

The demodulating portion 102, comprising the (demodulating) flaps 101 and 103, is configured to operate synchronously with the modulating portion 104, shifting spectral components of DSB-SC modulated acoustic wave generated by the modulating portion 104 by $\pm n \times f_{UC}$, where n is positive integer, producing a plurality air pulses toward an ambient according to the ultrasonic air wave within the chamber 115, such that the baseband frequency component of the plurality air pulses (which is produced by the demodulating portion 102 according to the ultrasonic air wave within the chamber 115) would be or be corresponding/related to the input (audio) signal $S_{IN}$, where the low frequency component of the plurality air pulses refers to frequency component of the plurality air pulses which is within an audible spectrum (e.g., below 20 or 30 KHz). Herein, baseband may usually be referred to audible spectrum, but not limited thereto.

In other words, in sound producing application, the modulating portion 104 may be actuated to form the modulated air wave according to the input audio signal $S_{IN}$, and the demodulating portion 102, operate in synchronous with modulation portion 104, produces the plurality air pulses with low frequency component thereof as (or corresponding/related to) the input audio signal $S_{IN}$. For sound producing applications, where $f_{UC}$ is typically much higher than the highest human audible frequency, such as $f_{UC}\geq 96$ KHz≈5×20 KHz, then through the natural/environmental low pass filtering effect (caused by physical environment such as walls, floors, ceilings, furniture, or the high propagation loss of ultrasound, etc., and human ear system such as ear canal, eardrum, malleus, incus, stapes, etc.) on the plurality air pulses, what the listener perceive will only be the audible sound or music represented by the input audio signal $S_{IN}$.

Figure 34:
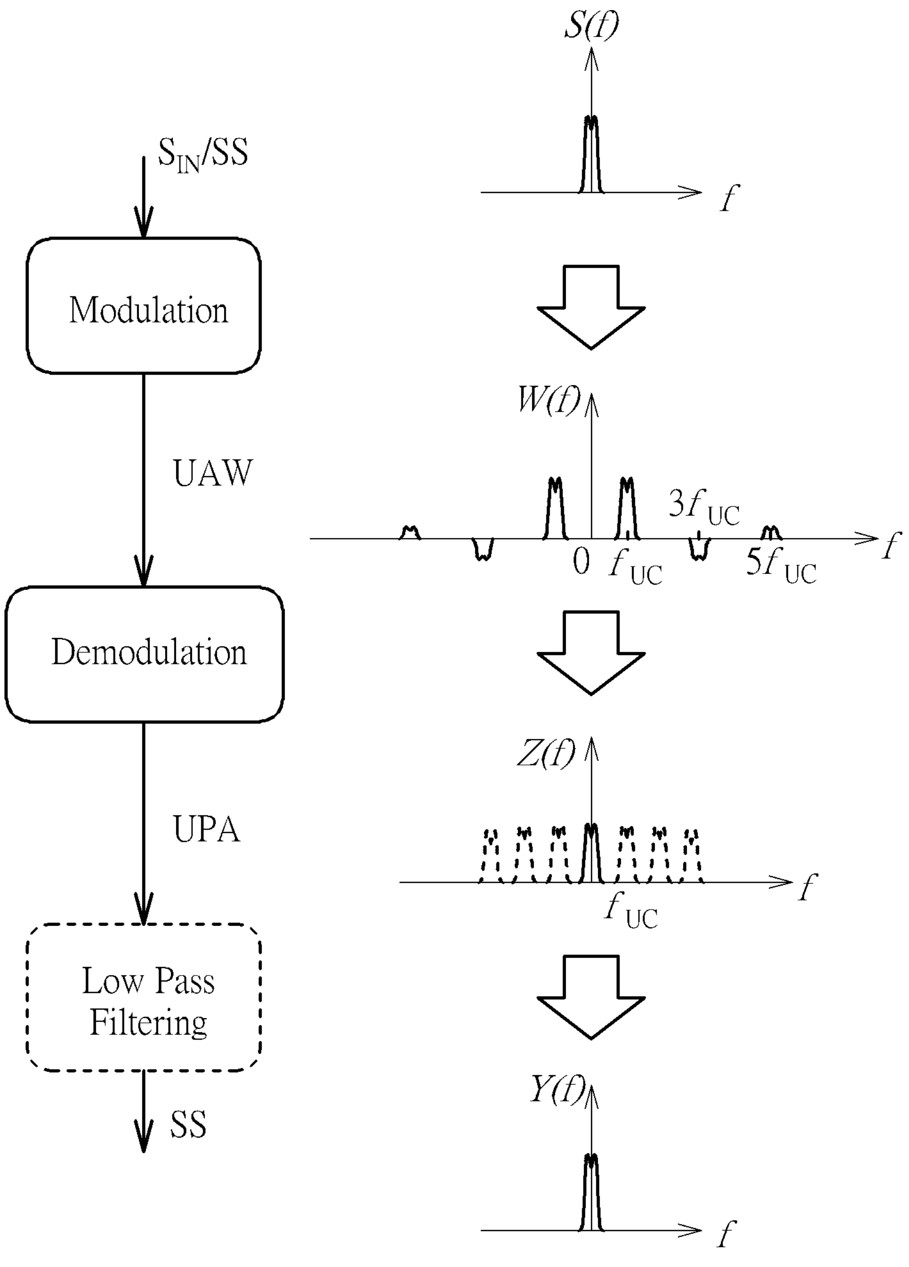
FIG. 34 illustrates a system perspective of the functions of each component and their corresponding frequency domain effects.

Illustratively, FIG. 34 conceptually/schematically demonstrates the effect of (de)modulation operation by showing frequency spectrums of signals before and after the (de) modulation operation. In FIG. 34, the modulation operation produces an amplitude modulated ultrasonic acoustic/air wave UAW with spectrum shown as W(f), according to the input audio signal $S_{IN}$, which is an electrical (analog or digital) representation of a sound signal SS. The spectrum of $S_{IN}$/SS is represented as S(f) in FIG. 34. The synchronous demodulation operation, producing an ultrasonic pulse array UPA (comprising the plurality of pulses) with spectrum illustrated as Z(f), can be viewed as (comprising step of) shifting spectral components of the ultrasonic acoustic/air wave UAW by $\pm n\times f_{UC}$ (with integer n) and spectral component of the ultrasonic air wave UAW corresponding to the sound signal SS is partially transferred to the baseband. Hence, as can be seen from Z(f), baseband component of the ultrasonic pulse array UPA is significant, compared to the amplitude modulated UAW W(f). The ultrasonic pulse array UPA propagates toward ambient. Through the inherent low pass filtering effect of natural/physical environment and human hearing system, a resulting spectrum Y(f) corresponding to the sound signal SS can be reproduced.

Note that, different from conventional DSB-SC amplitude modulation using sinusoidal carrier, WO has component at $\pm 3\times f_{UC}$, $\pm 5\times f_{UC}$ and higher order harmonic of $f_{UC}$ (not shown in FIG. 34). It is because that the carrier of the modulation of the present invention is not purely sinusoidal.

Referring back to FIG. 1, as an embodiment of the synchronous demodulation operation, the demodulating portion 102 may be actuated to form an opening 112 at the time and location which are corresponding/aligned to peak(s) of the modulated air wave. In other words, when the modulated air wave reaches its peak at the location of the opening 112, the demodulating portion 102 may be actuated such that the opening 112 also reaches its peak.

In the embodiment shown in FIG. 1, the demodulating portion 102 forms the opening 112 at a center location between the sidewalls 110L and 110R, which have a surface-to-surface, or 111L to 111R, spacing of (substantially) $\lambda_{UC}$ between them, meaning that tips of the flaps 101 and 103 are (substantially) $\lambda_{UC}/2$ away from the sidewalls 110L and 110R, or away from the sidewall surfaces 111L and 111R, where $\lambda_{UC}$ represent a wavelength corresponding to the ultrasonic carrier frequency $f_{UC}$, i.e., $\lambda_{UC}=C/f_{UC}$ with C being the speed of sound.

In an embodiment, the demodulating portion 102 may be actuated to form the opening 112 at a valve opening rate synchronous to/with the ultrasonic carrier frequency $f_{UC}$. In the present invention, the valve opening rate being synchronous to/with the ultrasonic carrier frequency $f_{UC}$ generally refers that the valve opening rate is the ultrasonic carrier frequency $f_{UC}$ times a rational number, i.e., $f_{UC}\times(N/M)$, where N and M represent integers. In an embodiment, the valve opening rate (of the opening 112) may be the ultrasonic carrier frequency $f_{UC}$. For example, the valve/opening 112 may open every operating cycle $T_{CY}$, where the operating cycle $T_{CY}$ is a reciprocal of the ultrasonic carrier frequency $f_{UC}$, i.e., $T_{CY}=1/f_{UC}$.

In the present invention, (de)modulating portion 102/104 is also used to denote the (de)modulating flap pair. Moreover, the demodulating portion (or flap pair) 102 forming the opening 112 may be considered as a virtual valve, which performs an open-and-close movement and forms the opening 112 (periodically) according to specific valve/demodulation driving signals.

In an embodiment, the modulating portion 104 may substantially produce a mode-2 (or $2^{nd}$ order harmonic) resonance (or standing wave) within the resonance chamber 115, as pressure profile P104 and airflow profile U104 illustrated in FIG. 1. In this regard, the spacing between sidewall surfaces 111L and 111R substantially defines a full wavelength $\lambda_{UC}$ corresponding to the ultrasonic carrier frequency $f_{UC}$, i.e., $W115\approx\lambda_{UC}=C/f_{UC}$. Furthermore, in the embodiment shown in FIG. 1, a free end of the modulating flap 105/107 is disposed by the sidewall 110L/110R.

Please be aware that, inter-modulation (or cross-coupling) between the modulation of generating the modulated air wave and the demodulation of forming the opening 112 might occur, which would degrade resulting sound quality. In order to enhance sound quality, minimizing inter-modulation (or cross-coupling) is desirable. To achieve that (i.e., minimize the cross coupling between the modulation and the demodulation), the modulating flaps 105 and 107 are driven to have a common mode movement and the demodulating flaps 101 and 103 are driven to have a differential-mode movement. The modulating flaps 105 and 107 having the common mode movement means that the flaps 105 and 107 are simultaneously actuated/driven to move toward the same direction. The demodulating flaps 101 and 103 having the differential-mode movement means that the flaps 101 and 103 are simultaneously actuated to move toward opposite directions. Furthermore, in an embodiment, the flaps 101 and 103 may be actuated to move toward opposite directions with (substantially) the same displacement/magnitude.

The demodulating portion 102 may substantially produce a mode-1 (or $1^{st}$ order harmonic) resonance (or standing wave) within the resonance chamber 115, as pressure profile P102 and airflow profile U102 formed by the demodulating portion 102 illustrated in FIG. 1. Hence, the demodulating portion 102 shall operate at a valve operating/driving frequency $f_{D\_V}$ (corresponding to valve/demodulation-driving signal) such that $W115\approx\lambda_{D\_V}/2$, where $\lambda_{D\_V}=C/f_{D\_V}$, and the valve operating/driving frequency shall be half of the ultrasonic carrier frequency $f_{UC}$, i.e., $f_{D\_V}=f_{UC}/2$.

Figure 2:
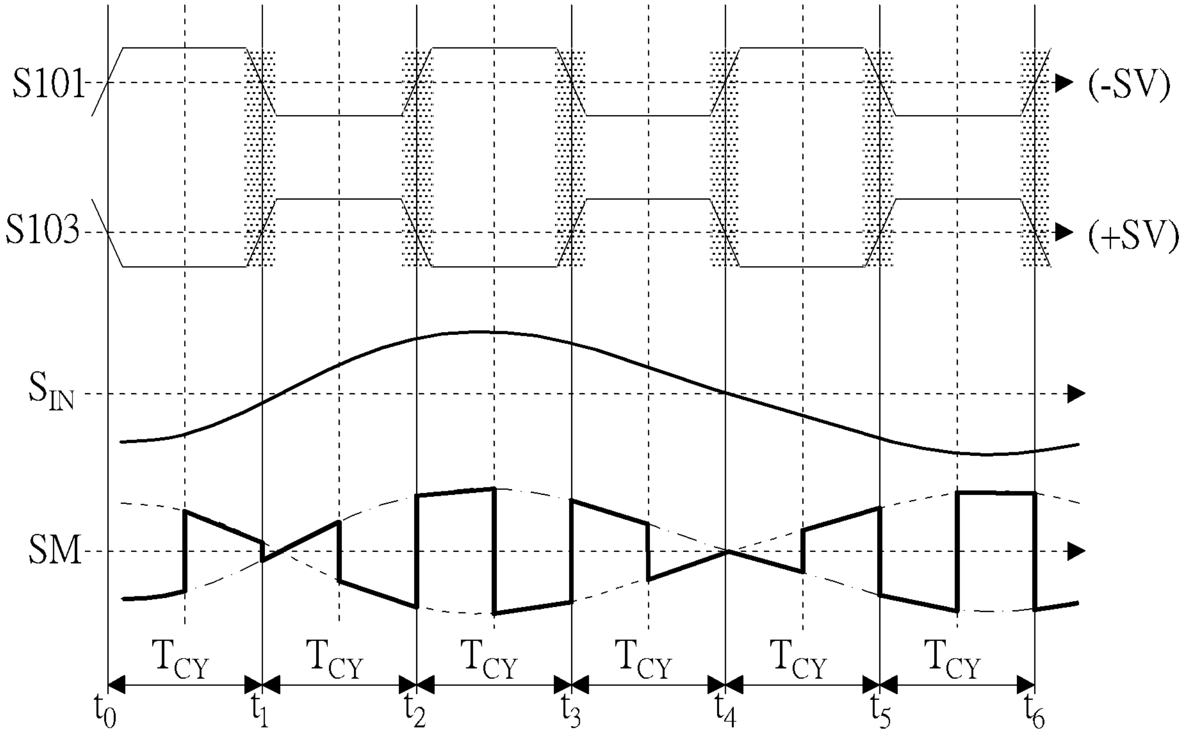
FIG. 2 illustrates waveforms of demodulation-driving signals and a modulation-driving signal according to an embodiment of the present invention.

The common mode movement and the differential mode movement can be driven by (de)modulation-driving signals. FIG. 2 illustrates waveforms of demodulation-driving signals S101, S103 and a modulation-driving signal SM. The modulation-driving signal SM is used to drive the modulating flaps 105 and 107. The demodulation-driving signals (or valve driving signals) S101 and S103 are used to drive the demodulating flaps 101 and 103, respectively.

In an embodiment, the modulation-driving signal SM can be viewed as pulse amplitude modulation (PAM) signal which is modulated according to the input audio signal $S_{IN}$. Furthermore, different from convention PAM signal, polarity (with respect to a constant voltage) of the signal SM toggles within one operating cycle $T_{CY}$. Generally, the modulation-driving signal SM comprises pulses with alternating polarities (with respect to the constant voltage) and with an envelope/amplitude of the pulses is (substantially) the same as or proportional/corresponding to an AC (alternative current) component of the input audio signal $S_{IN}$. In other words, the modulation-driving signal SM can be viewed as comprising a pulse amplitude modulation signal or comprising PAM-modulated pulses with alternating polarities with respect to the constant voltage. In the embodiment shown in FIG. 2, a toggling rate of the modulation-driving signal SM is $2\times f_{UC}$, which means that the polarity of the pulses within the modulation-driving signal SM alternates/toggles twice in one operating cycle $T_{CY}$.

The demodulation-driving signals S101 and S103 comprises two driving pulses of equal amplitude but with opposite polarities (with respect to a constant/average voltage). In other words, at a specific time, given S101 comprises a first pulse with a first polarity (with respect to the constant/average voltage) and S103 comprises a second pulse with a second polarity (with respect to the constant/average voltage), the first polarity is opposite to the second polarity. As shown in FIG. 2, a toggling rate of the demodulation-driving signal S101/S103 is $f_{UC}$, which means that the polarities of the pulses within the demodulation-driving signal S101/S103 alternates/toggles once in one operating cycle $T_{CY}$. Hence, the toggling rate of the modulation-driving signal (SM) is twice of the toggling rate of the demodulation-driving signal S101/S103.

The slopes of S101/S103 (and the associated shaded area) are simplified drawing representing the energy recycling during the transitions between voltage levels. Note that, transition periods of the signals S101 and S103 overlap. Energy recycling may be realized by using characteristics of an LC oscillator, given the piezoelectric actuators of flap 101/103 are mostly capacitive loads. Details of the energy recycling concept may be referred to U.S. Pat. No. 11,057,692, which is incorporated herein by reference. Note that, piezoelectric actuator serves as an embodiment, but not limited thereto.

To emphasize the flap pair 102 is driven differentially, the signals S101 and S103 may also be denoted as −SV and +SV, signifying that this pair of driving signals have the same waveform but differ in polarity. For illustration purpose, −SV is for S101 and +SV is for S103, as shown in FIG. 2, but not limited thereto. In an embodiment, S101 may be +SV and S103 may be −SV.

In another embodiment, there may be a DC bias voltage $V_{BIAS}$ and $V_{BIAS}\neq 0$, under such situation driving signal S101=$V_{BIAS}$−SV, S103=$V_{BIAS}$+SV. Variations such as this shall be considered as within the scope of this disclosure.

In addition, FIG. 2 demonstrates difference in toggling rate between the modulation-driving signal SM and the demodulation-driving signal ±SV. Relative phase delay, meaning timing alignment, between the modulation-driving signal SM and the demodulation-driving signal ±SV may be adjusted according to practical requirement.

In an embodiment, driving circuit for generating the signals SM and ±SV may comprise a sub-circuit, which is configured to produce a (relative) delay between the modulation-driving signal SM and the demodulation-driving signal ±SV. Details of the sub-circuit producing the delay are not limited. Known technology can be incorporated in the sub-circuit. As long as the sub-circuit can generate the delay to fulfill the timing alignment requirements (which will be detailed later), requirements of the present invention is satisfied, which will be within the scope of the present invention.

Note that, the tips of the flaps 101 and 103 are at substantially the same location (the center location between the sidewalls 111L and 111R) and experience substantially the same air pressure at that location. In addition, the flaps 101 and 103 move differentially. Hence, movements of the tips of the flaps 101 and 103 owns a common mode rejection behavior, similar to the common mode rejection known in the field of analog differential OP-amplifier circuit, which means that the displacement difference of the tips of the demodulating flaps 101 and 103, or $|d_{101}-d_{103}|$, is barely impacted by air pressure formed by the modulating flaps 105 and 107.

Figure 3:
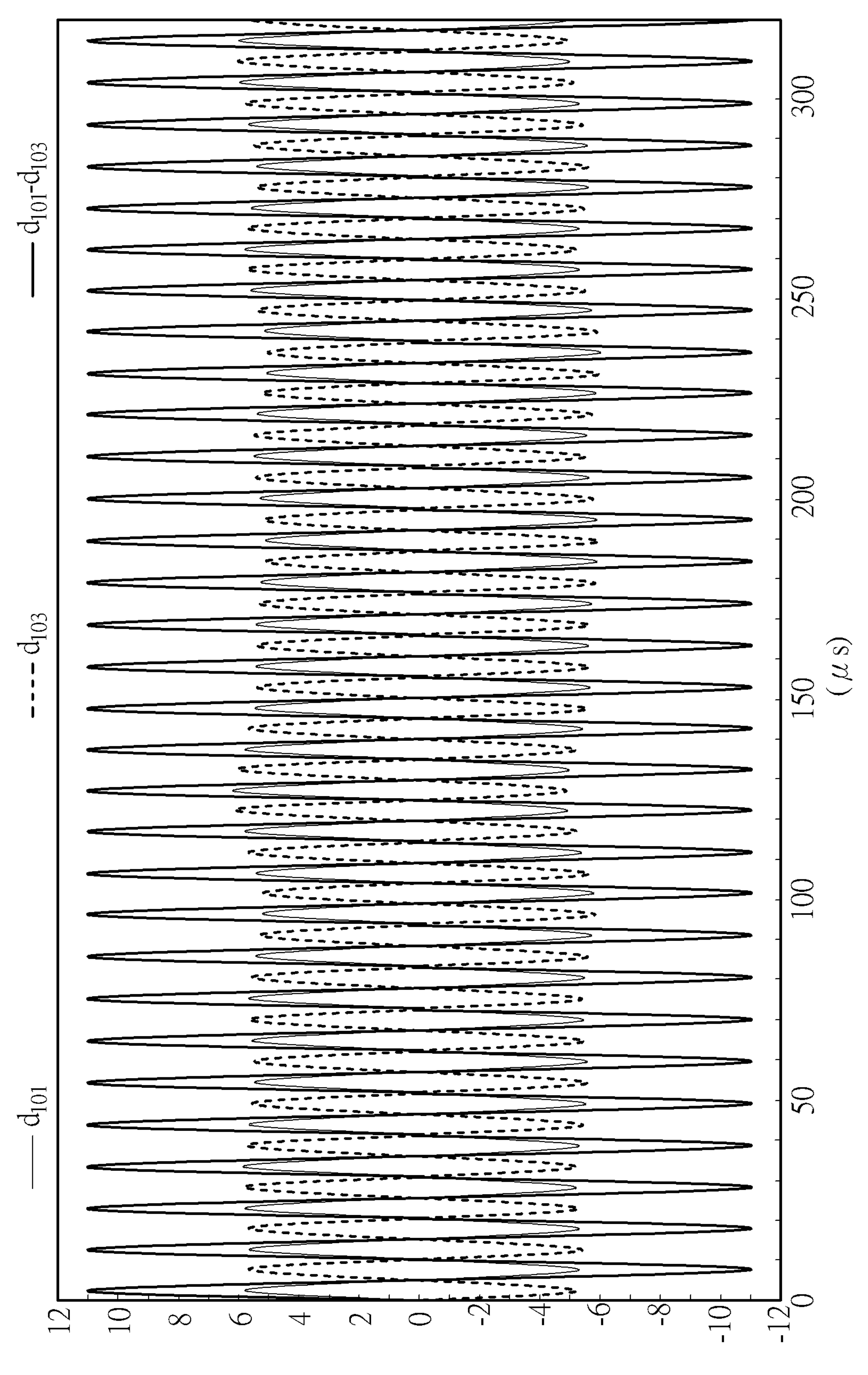
FIG. 3 illustrates simulated results corresponding to the device in FIG. 1.

The common mode rejection, or modulator-to-demodulator isolation, can be evidenced by FIG. 3. FIG. 3 illustrates simulated results generated from an equivalent circuit model of the device 100. Curves $d_{101}$ and $d_{103}$ represents movements/displacements of the tips of the flaps 101 and 103, respectively. As can be observed in FIG. 3, even though $d_{101}$ and $d_{103}$ fluctuates quite significantly due to the acoustic pressure generated by the modulating flap 105/107 (P104), the differential movement, represented by the curve denoted by $d_{101}-d_{103}$ in FIG. 3, remains (substantially) consistent. That is, width/gap of the valve opening 112 would be consistent even when the modulation portion 104 operates. In other words, modulator movement produces negligible impact on the functionality and performance of the demodulator, which is what "modulator-to-demodulator isolation" means.

On the other hand, as for demodulator-to-modulator isolation, since the flaps 101/103 produce $1^{st}$ order harmonic resonance or standing wave within the chamber 115, as can be seen from FIG. 1, pressure exerted by P102 on the flap 105 and the flap 107 would have substantially the same magnitude but of opposite polarity, causing the movements of the flap 105 and the flap 107 to experience changes (due to P102) that are also of the same magnitude but of opposite polarity. This will produce two ultrasonic waves (one by 105, the other by 107) that also changes same magnitude but of opposite polarity. When these two ultrasonic waves propagate to the location above the valve opening 112 (indicated by the dotted area shown in FIG. 1), they are merged into one pressure. Since the location of this "merge" occurs at the center of device 100, along X-axis or X direction, with equal distance from the tips of 105 and 107, the P102 induced changes would cancel/compensate each other and produce a net rest that is largely free from the interference of demodulator/virtual-valve operation.

Figure 4:
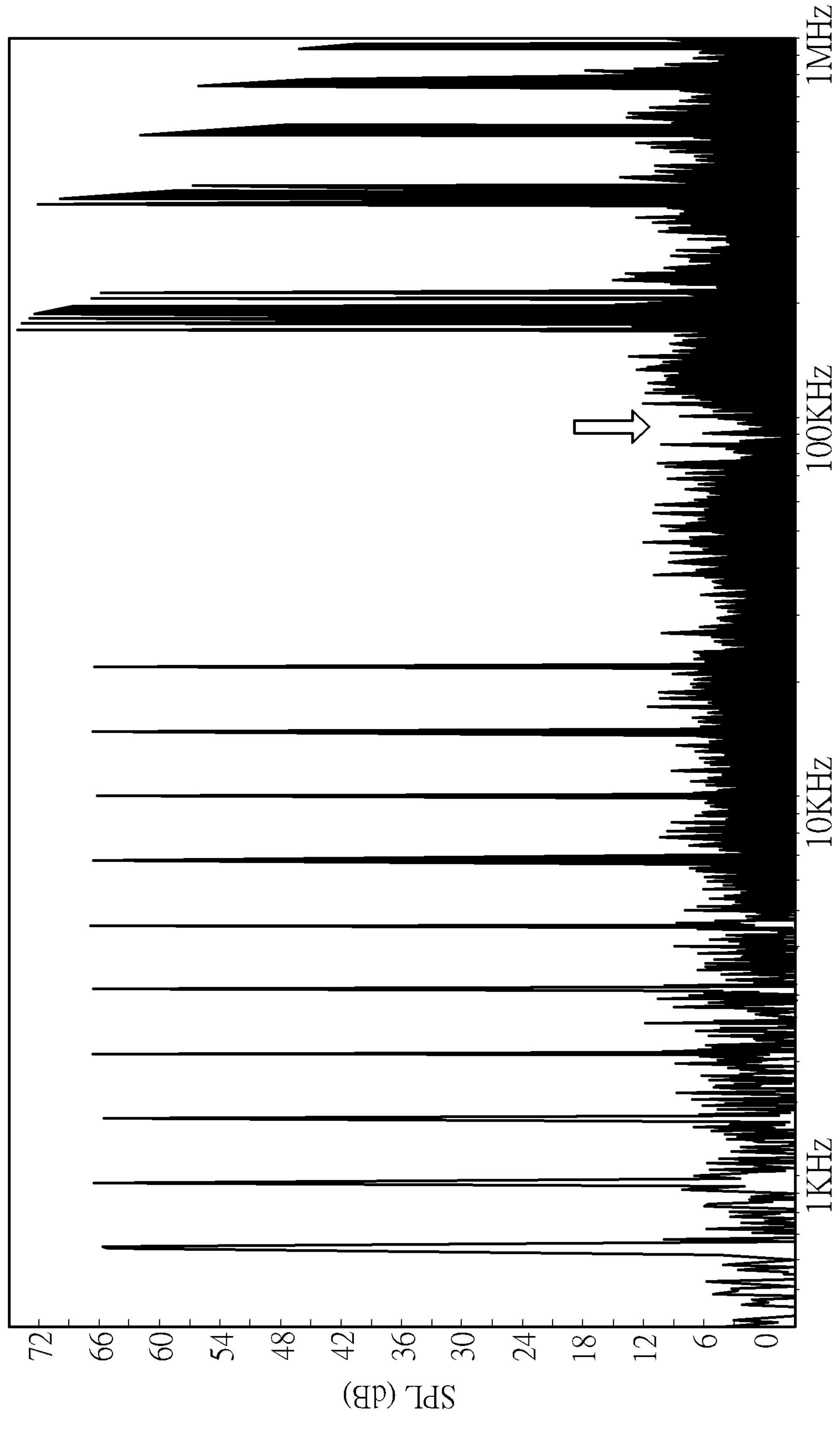
FIG. 4 plots a simulated frequency response of sound pressure level of the APG device in FIG. 1.

Illustratively, FIG. 4 plots a simulated frequency response of an SPL (sound pressure level), measured at 1 meter away from the device 100, under the condition that $S_{IN}$ is a 10-tone equal amplitude test signal (within 650~22K Hz and with equal log scale spacing) and an equivalent circuit simulation model of the device 100 is used. In the current simulation, the ultrasonic carrier frequency is set as $f_{UC}$=192 KHz and the valve operating frequency is set as $f_{D\_V}=f_{UC}/2$=96 KHz.

The demodulator-to-modulator isolation can be evidenced by the absence of extraneous spectral component at and around 96 KHz (pointed by block arrow in FIG. 4), indicating a high degree of isolation.

As a result, the interference of the movements of these two flap-pairs (101/103 versus 105/107) is minimized through the common mode (on modulator) versus differential-mode (on demodulator) orthogonality/arrangement.

In addition, the percentage of time valve remains open, or duty factor, is a critical factor affecting the output of device 100. Increasing amplitude of driving voltage S101 and S103 can increase the amplitude of the movements of the flaps 101 and 103, which will increase the maximum open width of the valve opening 112, and raising the driving voltage also raises the duty factor of valve opening. In other words, duty factor of the valve opening 112 and the maximum open width/gap of the valve opening 112 can be determined by the driving voltage S101 and S103.

Figure 5:
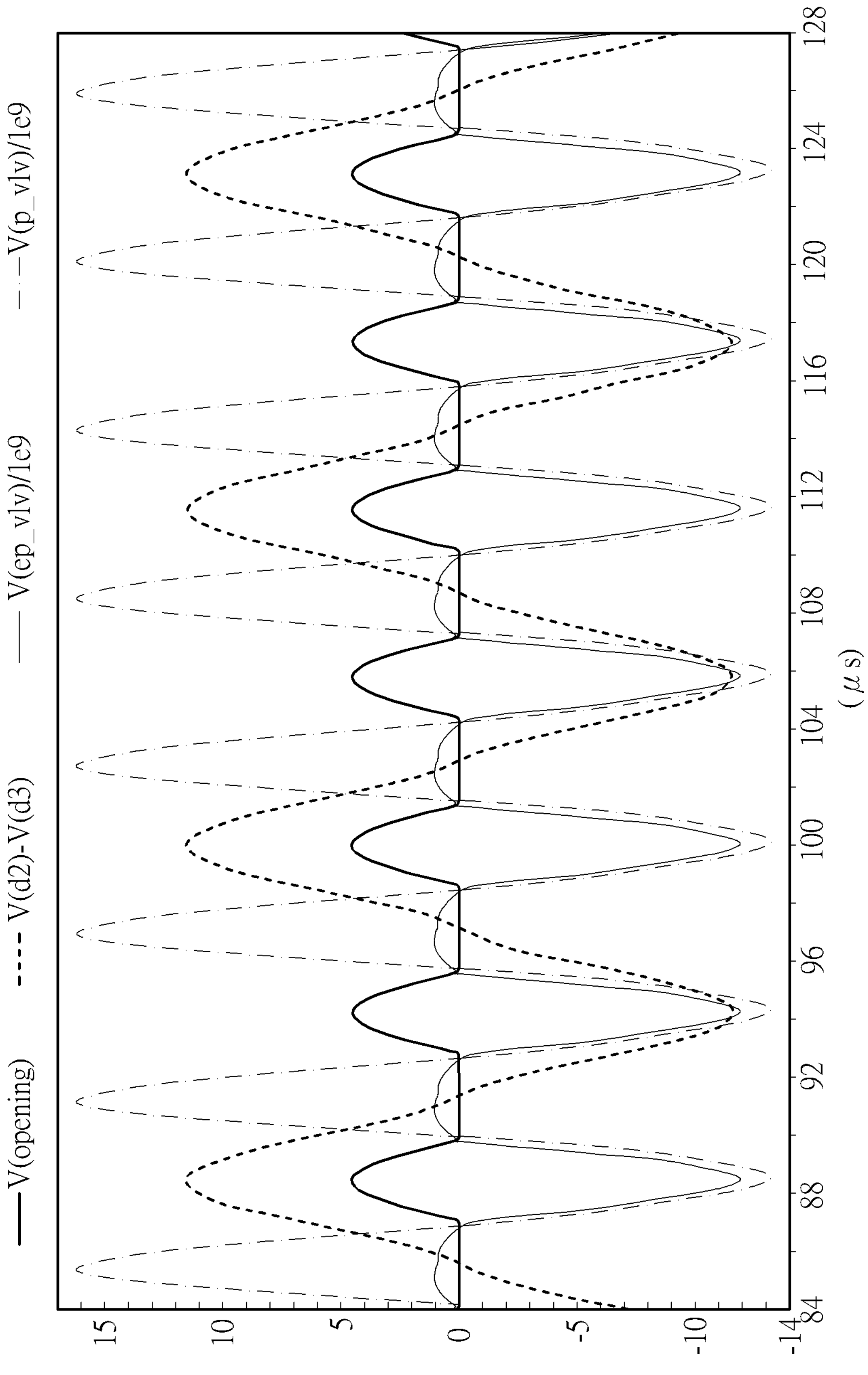
FIG. 5 illustrates simulated results corresponding to the device in FIG. 1.

When the opening duty factor of valve approaches 50%, such as the example shown in FIG. 5, which is generated from one of the equivalent circuit simulation models mentioned previously, the period of each valve opening, shown as curve labeled as V(opening)>0, overlaps with the same half-cycle of the amplitude modulated ultrasonic standing wave at the location atop the valve opening 112 (indicated by the dotted region in FIG. 1). By synchronizing and timing-aligning the opening-closing of valve opening 112 to the in-chamber standing wave, illustrated as curve labeled as V(p_vlv) in FIG. 5, a nicely shaped output pressure pulse, illustrated as curve labeled as V(ep_vlv), is produced.

Figure 6:
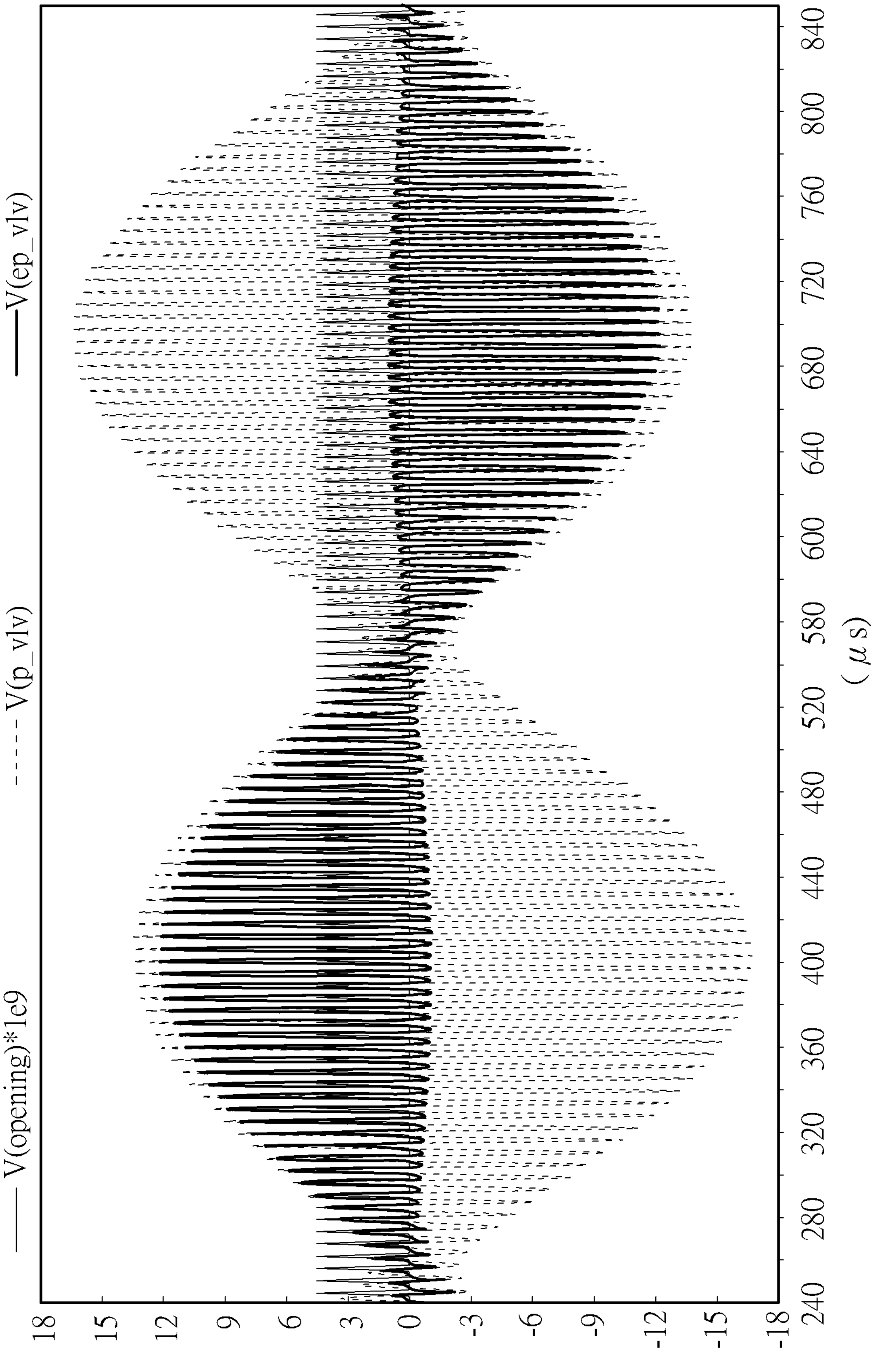
FIG. 6 illustrates simulated results corresponding to the device in FIG. 1.

In FIG. 5, curve labeled as V(d2)−V(d3) represent difference in displacement of flaps 101 and 103, i.e., $d_{101}-d_{103}$, curve labeled as V(opening) represent a degree of opening of the virtual valve 112. V(opening)>0 when |V(d2)−V(d3)|>TH, where TH is a threshold defined by parameters such as the thickness of the flaps 101 and 103, width of slit between claps 101 and 103, boundary layer thickness, etc. V(ep_vlv) being nicely shaped may refer that pulses illustrated by V(ep_vlv) are highly asymmetric, unlike V(p_vlv) which is highly symmetric. Asymmetricity of output pressure pulses would demonstrate low frequency component (i.e., frequency component in audible band) of air pulses generated by the air pulse generating device, or APG device for brief, which is a desirable feature for the APG device. The higher the asymmetric is, the stronger the baseband frequency component of the air pulses will be. A zoomed-out view of FIG. 5 is illustrated in FIG. 6, showing the asymmetricity of V(ep_vlv) corresponding to the envelope of the baseband sound signal of 1.68 KHz. In the present invention, the opening (112) is opened/formed or in an opened status when difference in displacement of flaps 101 and 103 is larger than a threshold, e.g., |V(d2)−V(d3)|>TH, and is closed or in a closed status otherwise.

Furthermore, it is observed that the maximum output will occur when the duty factor of valve opening, defined as |V(d2)−V(d3)|>TH, is equal to or slightly larger than 50%, such as in the range of 55~60%, but not limited thereto. However, when the duty factor of valve opening is significantly higher than 50%, such as 80~85%, more than half-cycle of the in-chamber ultrasonic standing wave will pass through the valve, leading portions of the standing wave with different polarities to cancel each other out, resulting in lower net SPL output from device 100. It is therefore generally desirable to keep the duty factor of valve opening close to 50%, typically in the range between 50% and 70% (where the duty factor in the range between 45% and 70% is within the scope of present invention).

In addition to duty factor, to ensure the modulator-to-demodulator isolation, resonance frequency $f_{R\_V}$ of demodulating flaps 101/103 is suggested to be sufficiently deviated from the ultrasonic carrier frequency $f_{UC}$, which is another design factor.

It can be observed (from equivalent circuit simulation model) that, under the constraint of valve open duty factor equals 50%, for any given thickness of flaps 101/103, the higher is the resonance-to-driving ratio ($f_{R\_V}$:$f_{D\_V}$ or $f_{R\_V}/f_{D\_V}$), the wider the valve can open. Since the output of device 100 is positively related to the max width valve opens, it is therefore desirable to have the resonance-to-driving ratio higher than 1.

However, when $f_{R\_V}$ falls within the range of $f_{UC}$±max($f_{SOUND}$), flap 101/103 will start to resonate with the AM ultrasonic standing wave, converting portion of the ultrasound energy into common mode deformation of flap 101/103, where max($f_{SOUND}$) may represent maximum frequency of the input audio signal $S_{IN}$. Such common mode deformation of flaps 101/103 will cause the volume atop the flaps 101/103 to change, result in fluctuation of pressure inside chamber 115 at the vicinity of valve opening 112, over the affected frequency range, leading to depressed SPL output.

In order to avoid valve resonance induced frequency response fluctuations, it is preferable to design the flap 101/103 with a resonance frequency outside of the range of ($f_{UC}$±max($f_{SOUND}$))×M, where M is a safety margin for covering factors such as manufacturing tolerance, temperature, elevation, etc., but not limited thereto. As a rule of thumb, it is generally desirable to have $f_{R\_V}$ either significantly lower than fug as in $f_{R\_V}$≤($f_{UC}$−20 KHz)×0.9 or significantly high than $f_{UC}$ as in $f_{R\_V}$≥($f_{UC}$+20 KHz)×1.1. Note that 20 KHz is used here because it is well accepted as highest human audible frequency. In applications such as HD-/Hi-Res Audio, 30 KHz or even 40 KHz may be adopted as max($f_{SOUND}$), and the formula above should be modified accordingly.

In addition, suppose w(t) and z(t) represent functions of time for the amplitude-modulated ultrasonic acoustic/air wave UAW and the ultrasonic pulse array UPA (comprising the plurality of pulses). Since the opening 112 is formed periodically in the opening rate of the ultrasonic carrier frequency $f_{UC}$, a ratio function of z(t) to w(t), denoted as r(t) and can be expressed as r(t)=z(t)/w(t), is periodic with the opening rate of the ultrasonic carrier frequency $f_{UC}$. In other words, z(t) may be viewed as a multiplication of w(t) and r(t) in time domain, i.e., z(t)=r(t)·w(t), and the synchronous demodulation operation performed on UAW can be viewed as the multiplication on w(t) by r(t) in time domain. It implies that Z(f) may be viewed as a convolution of W(f) and R(f) in frequency domain, i.e., Z(f)=R(f)*W(f) where * denotes convolution operator, and the synchronous demodulation operation performed on UAW can be viewed as the convolution of W(f) with R(f) in frequency domain. Note that, when r(t) is periodic in time domain with the rate of the frequency $f_{UC}$, R(f) is discrete in frequency domain where frequency/spectrum components of R(f) are equally spaced by $f_{UC}$. Hence, the convolution of W(f) with R(f), or the synchronous demodulation operation, involves/comprises step of shifting W(f) (or the spectral components of UAW) by ±n×$f_{UC}$ (with integer n). Herein, r(t)/w(t)/z(t) and R(f)/W(f)/Z(f) form Fourier transform pair.

Figure 7:
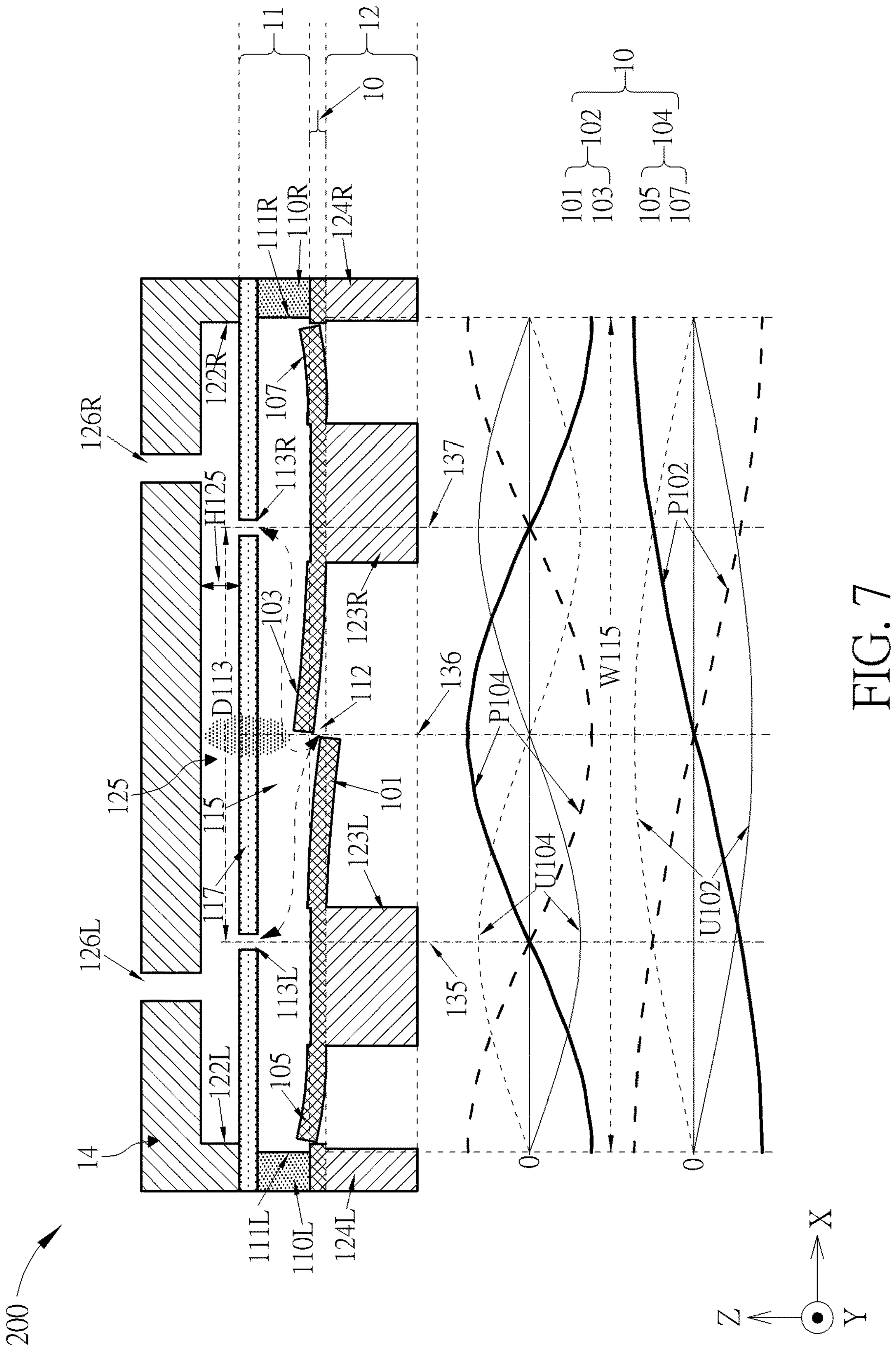
FIG. 7 is a schematic diagram of an air-pulse generating device according to an embodiment of the present invention.

FIG. 7 is a schematic diagram of an APG device 200 according to an embodiment of the present invention. The device 200 is similar to the device 100, and thus same notations are used. Different from the device 100, the device 200 further comprises an enclosing structure (enclosure) 14. A chamber 125 is formed between the enclosing structure 14 and the cap structure 11. Note that vents 113L/R are formed within the ceiling 117 located at $\lambda_{UC}/4$ from the sidewalls 111L/R, respectively, on the nodes of the ultrasonic standing pressure wave P104, as indicated by lines 135/137.

The purpose of vents 113L/R in FIG. 7 is to allow the airflow generated during the demodulation operation (as indicated by the two dashed 2-way pointed-curves between 112 and 113L/R) to be vented from chamber 115, such that the difference between the average pressure inside the chamber 115 and outside in the ambient is minimized and the function of chamber 125 is to disrupt the spectral components carried by the airflow into chamber 125, preventing these airflow from forming additional audible sound signal. By locating vents 113L/R on the nodes of the standing pressure wave, the spectral components surrounding $f_{UC}$ are prevented from exiting chamber 115, allowing demodulation to form UPA (ultrasonic pulse array) and produce the desired APPS (air pressure pulse speaker) effect.

In the present invention, APG device having APPS effect generally refers that, the baseband frequency component (especially frequency component in audible band) embedded within the air pulses output by the APG device at the ultrasonic carrier frequency is not only observable but also of significant intensity. For APG device producing APPS effect, the spectrum of the electrical input signal $S_{IN}$ will be reproduced acoustically within baseband of audible spectrum (low frequency compared to carrier frequency) via producing the plurality of air pulses by the APG device, which is suitable for being used in sound producing application. The intensity of baseband produced through APPS effect is related to the amount of, or degree of, asymmetricity of air pulses produced by the APG device, where asymmetricity will be discussed later.

Note the, the supporting structures 123L and 123R of the device 100 or 200 have parallel and straight walls (with respect to X-axis), where space/channel between 123L and 123R functions as an sound outlet. Simulation results using FEM (finite element method) show that, when the frequency rises above 350 KHz, lateral standing waves, along the X direction, start to be formed between the walls of 123L/123R, and the output starts to self-nullify. Such lateral-resonance induced self-nullifying phenomenon cause the energy transfer ratio over the height of the walls of 123L-123R (in Z direction) to degrade.

Figure 8:
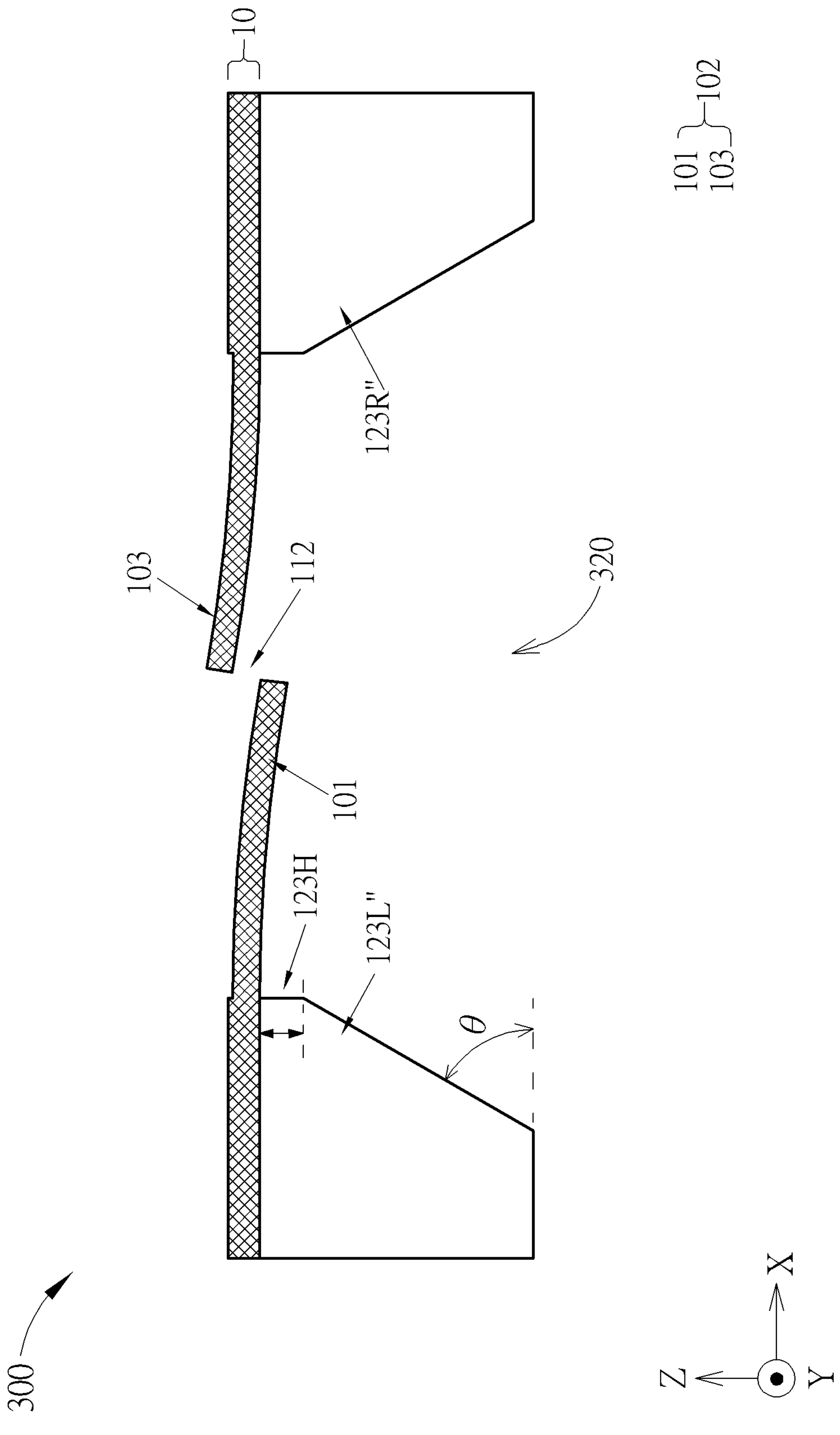
FIG. 8 is a schematic diagram of an air-pulse generating device according to an embodiment of the present invention.

To bypass this problem, a horn-shaped outlet is proposed. For example, FIG. 8 is a schematic diagram of a portion of an APG device 300 according to an embodiment of the present invention. Similar to the device 100, the device 300 comprises the flaps 101 and 103, anchored on the supporting structure 123L" and 123R", respectively, and configured to form the opening 112 to produces a plurality of air pulses via an outlet 320 toward an ambient. Different from the supporting structure 123L and 123R of the device 100 which have straight and parallel walls, walls of the supporting structure 123L" and 123R" of the device 300 are oblique and has a non-right angle θ with respect to X-Axis or X direction, such that the outlet 320 with horn-shape is formed. The non-right angle θ may be designed according to practical requirement. In an embodiment, the non-right angle θ may be 54.7°, but not limited thereto. In the present invention, the horn-shaped outlet generally refers to an outlet with an outlet dimension or a tunnel dimension which is gradually widened from the film structure toward an ambient.

Figure 9:
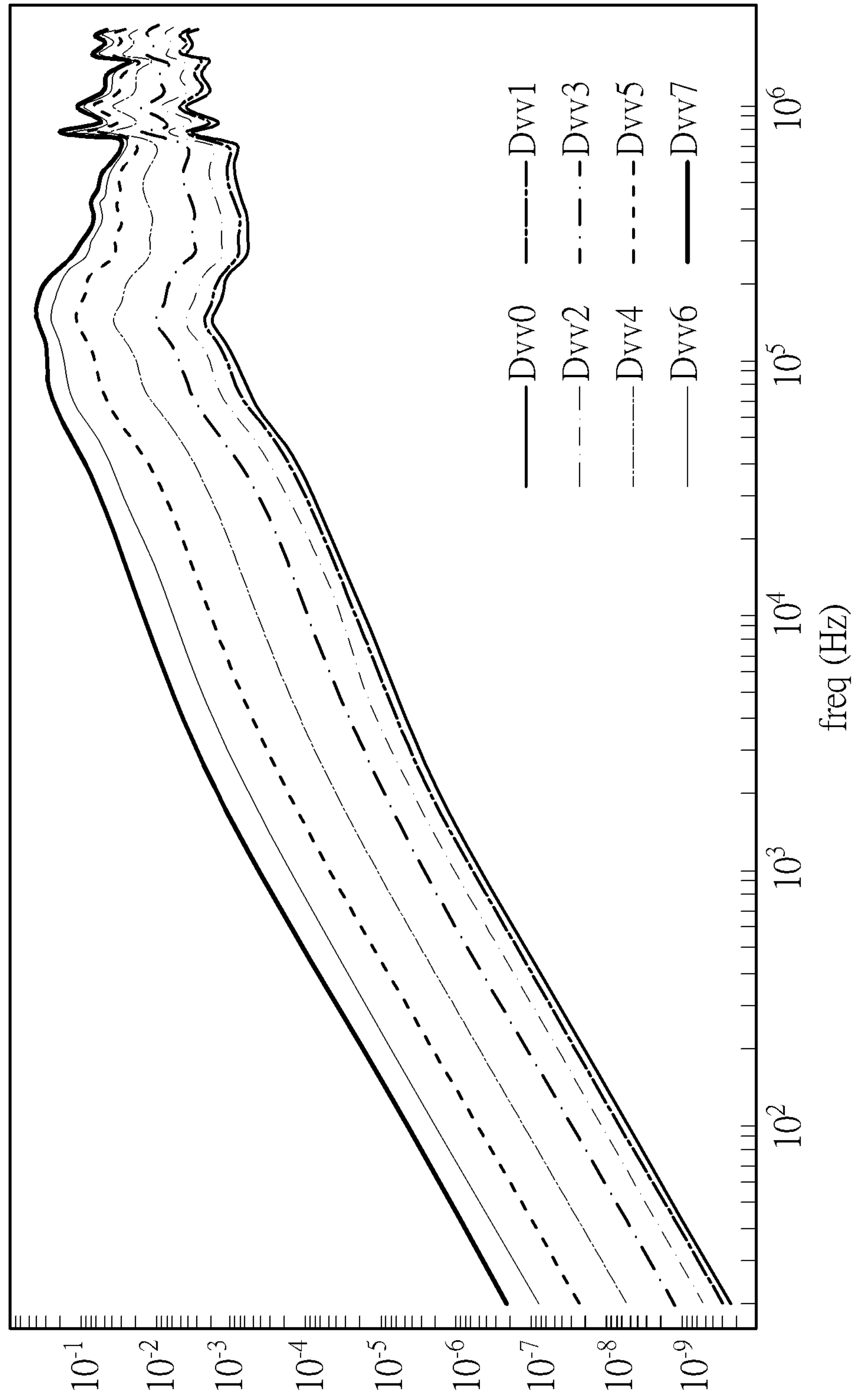
FIG. 9 illustrates frequency responses of energy transfer ratio of the device in FIG. 1.
Figure 10:
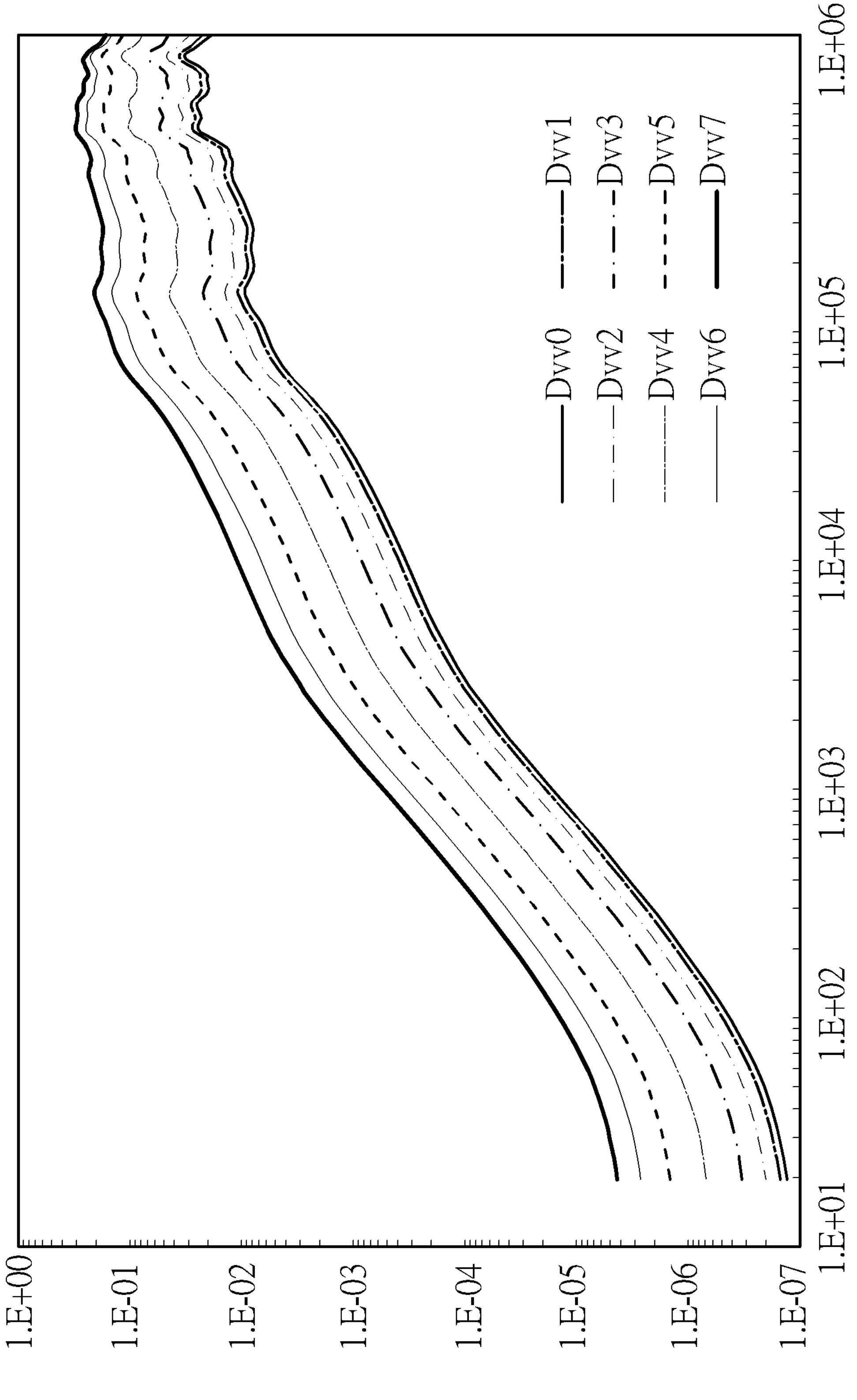
FIG. 10 illustrates frequency responses of energy transfer ratio of the device in FIG. 8.

FIG. 9 and FIG. 10 illustrate frequency responses of energy transfer ratio of the device 100 and 300, respectively, for 8 different displacements of flaps 101 and 103, where Dvv=k means the displacement of the tips of each flap is k μM, which produces a differential movement of 2 k μM. FIG. 9 and FIG. 10 are simulated by using FEM. By comparing FIG. 9 and FIG. 10, the device 100 produces energy transfer ratio that starts to roll-off above 170 KHz, with a few jumps and dips as the frequency rises above 170 KHz; while the device 300 produces energy transfer ratio that retains a rising trend roughly above 120 KHz, with a much smoother frequency response for frequency above 170 KHz. It means, frequency response of energy transfer ratio (above 170 KHz) of the device 300 is much smoother than which of the device 100, which is benefit for the APG device operating at ultrasonic pulse rate (i.e., the ultrasonic carrier frequency $f_{UC}$) and its high order harmonic (e.g., $n \times f_{UC}$). Furthermore, the device 300 produces a roughly 5 times energy transfer ratio higher than which produced by the device 100. Hence, it can be validated from FIG. 9 and FIG. 10 that horn-shaped outlet brings better energy transfer ratio for APG device.

Figure 11:
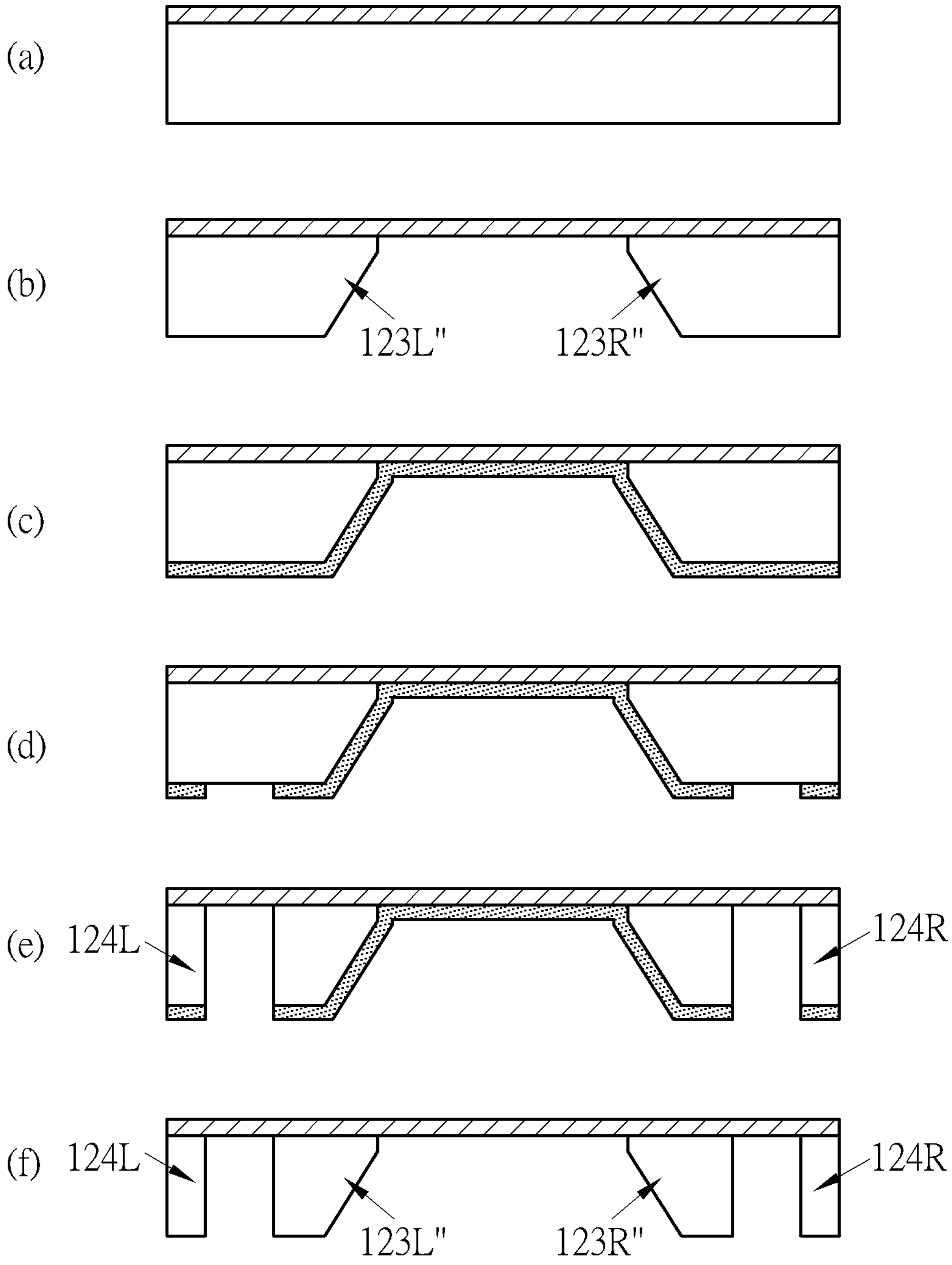
FIG. 11 illustrates a process of a manufacturing method for the device in FIG. 8.

FIG. 11 shows an embodiment of a two-step etching/manufacturing method to etch walls at two different angles. First, the wall of 123R"/123L" is etched with a tapered angle (as shown in FIG. 11(*b*)), and the tapered wall is then covered by photoresist or spin-on dielectric using a spray coating method (as shown in FIG. 11(*c*)). The photoresist or spin-on dielectric is then patterned by photolithography methods (as shown in FIG. 11(*d*)), followed by the etching of the wall of 124L and 124R at a straight angle (as shown in FIG. 11(*e*)). The fabrication method provided above is for illustration purpose only and the scope of the invention is not limited thereof.

Figure 12:
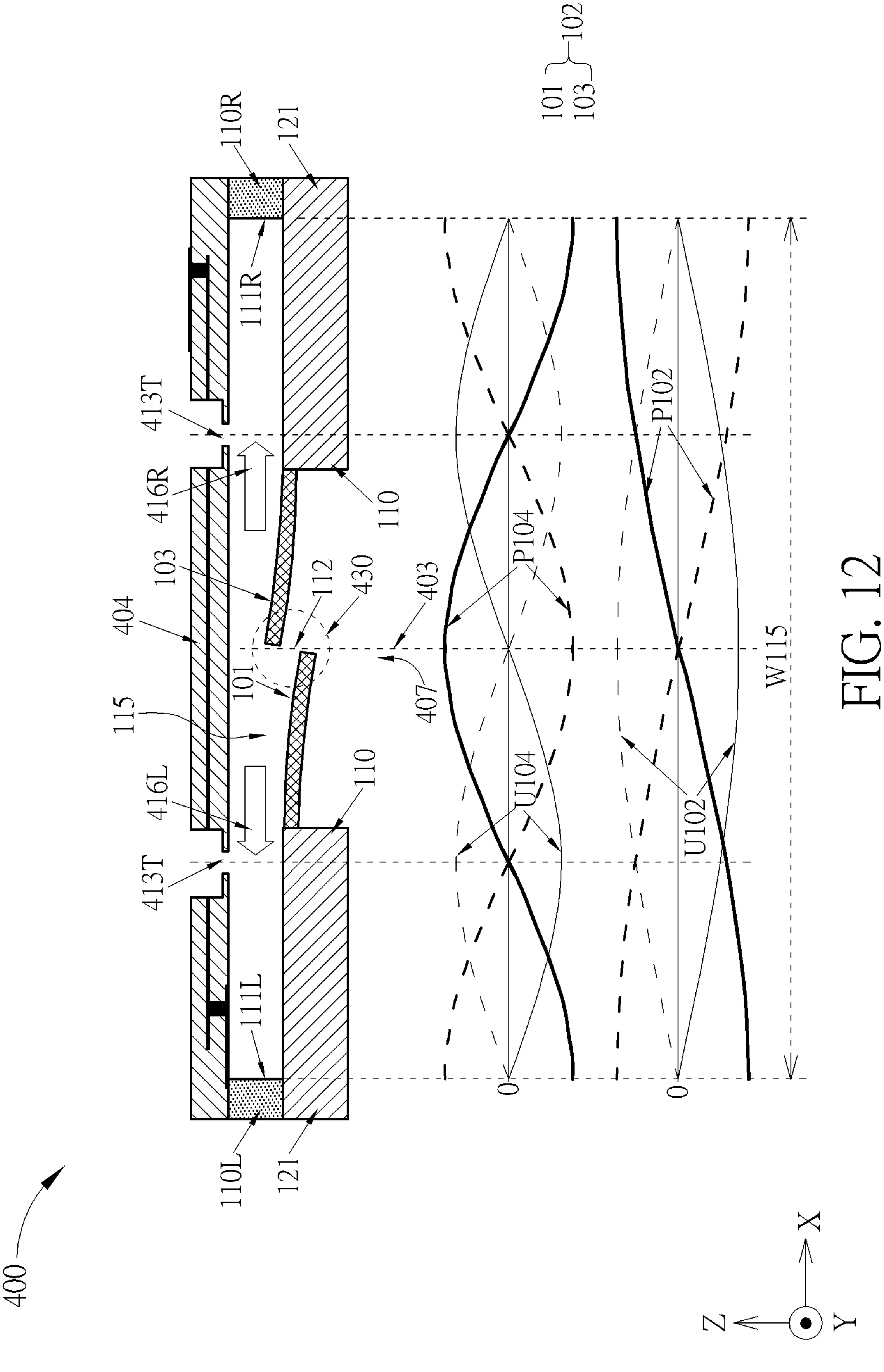
FIG. 12 is a schematic diagram of an air-pulse generating device according to an embodiment of the present invention.

FIG. 12 is a schematic diagram of an APG device 400 according to an embodiment of the present invention. The device 400 is modified from FIG. 7 of U.S. application Ser. No. 17/553,806 and similar to the device 100 shown in FIG. 1 of the present invention. Different from the device 100, the device 400 comprises only flap pair 102 (but no flap pair 104). The flap pair 102 is configured to perform both the modulation operation (which is to form amplitude-modulated air pressure variation with the ultrasonic carrier frequency $f_{UC}$) as well as the demodulation operation (which is to form the opening 112, synchronous to the amplitude-modulated ultrasonic carrier at frequency $f_{UC}$, to produce air pulses according to the envelope of the said amplitude-modulated ultrasonic air pressure variation).

In FIGS. 12, U104 and P104 represent pressure profile and airflow profile formed by the flap pair 102 in response to the modulation-driving signal SM, and U102 and P102 represent pressure profile and airflow profile formed by the flap pair 102 in response to the demodulation-driving signal ±SV. Herein the demodulation-driving signal is denoted by ±SV to emphasize the flap pair 102 is driven differentially (which implies the demodulation-driving signals +SV and −SV have the same magnitude but opposite polarity) to perform the demodulation operation. For example, S101 and/or S103 above may be represented by −SV and/or +SV.

In other words, modulator and demodulator are co-located at/as the flap pair 102. Like the device 100, the film structure 10 of the flap pair 102 of the device 400 is actuated to have not only a common mode movement to perform the modulation and a differential mode movement to perform the demodulation.

In other words, the "modulation operation" and the "demodulation operation" are performed by the same flap pair 102, at the same time. This colocation of "modulation operation" together with "demodulation operation" is achieved by new driving signal wiring schemes such as those shown in FIG. 13. Given that the device 400 may comprise an actuator 101A/103A disposed on the flap 101/103 and the actuator 101A/103A comprises a top electrode and a bottom electrode, both of the top and bottom electrodes may receive the modulation driving signal SM and the demodulation-driving signal ±SV.

Figure 13:
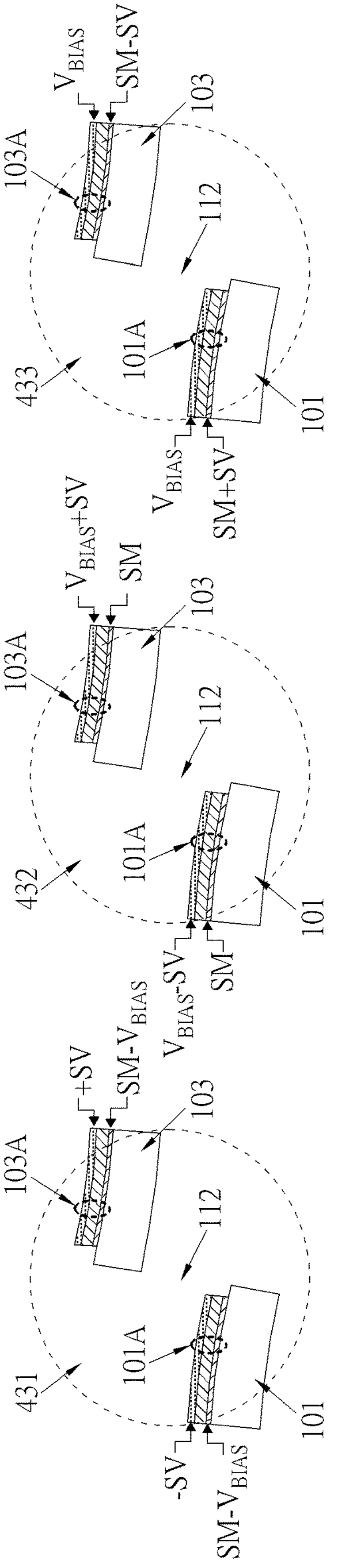
FIG. 13 illustrates driving signal wiring schemes according to embodiments of the present invention.

In an embodiment, one electrode of the actuator 101A/103A may receive the common mode modulation-driving signal SM; while the other electrode may receive the differential mode demodulation-driving signal S101(−SV)/S103(+SV). For example, diagrams 431 to 433 shown in FIG. 13 illustrate details of a region 430 shown in FIG. 12. As shown in the diagrams 431 and 432, bottom electrodes of the actuator 101A/103A receive the common mode modulation-driving signal SM; while top electrodes of the actuator 101A/103A receive the differential mode demodulation-driving signal S101(−SV)/S103(+SV). A suitable bias voltage $V_{BIAS}$ may be applied to either the bottom electrode (like diagram 432 shows) or the top electrode (like diagram 433 shows), where the bias voltage $V_{BIAS}$ can be determined according to practical requirement.

In an embodiment (shown in diagram 433), one electrode of the actuator 101A/103A may receive both the common mode modulation-driving signal SM and differential mode demodulation-driving signal S101(−SV)/S103(+SV); while the other electrode is properly biased. In the embodiment shown in diagram 433, the bottom electrodes receive the common mode modulation-driving signal SM and differential mode demodulation-driving signal S101(−SV)/S103(+SV); while the top electrode are biased.

The driving signal wiring schemes shown in FIG. 13 achieve a goal that, (without considering $V_{BIAS}$) an applied signal of one actuator (e.g., 101A) is or comprises −SM−SV while an applied signal of the other actuator (e.g., 103A) is or comprises −SM+SV. Note that, driving signal wiring schemes may be modified or altered according to practical situation/requirement. As long as a common-mode signal component between the two applied signals applied on the flap pair 102 comprises the modulation-driving signal SM (plus $V_{BIAS}$) and a differential-mode signal component between the two applied signals applied on the flap pair 102 comprises the demodulation-driving signal SV, requirements of present invention is satisfied and is within the scope of the present invention. Herein (or generally), a common-mode signal component between two arbitrary signals a and b may be expressed as (a+b)/2; while a differential-mode signal component between two arbitrary signals a and b may be expressed as (a−b)/2.

Further note that, in order to minimize the cross coupling between the modulation operation (as a result of driving signal SM) and the demodulation operation (as a result of driving signal ±SV), in an embodiment, the flaps 101 and 103 are made into a mirrored/symmetric pair in both their mechanical construct, dimension and electrical characteristics. For instance, the cantilever length of flap 101 should equal that of 103; the membrane structure of flap 101 should be the same as flap 103; the location of virtual valve 112 should be centered between, or equally spaced from, the two supporting walls 110 of flap 101 and flap 103; the actuator pattern deposited on flap 101 should mirror that of flap 103; the metal wiring to actuators deposited atop flap 101 and 103 should be symmetrical. Herein, a few items are names for mirrored/symmetric pair (or the flaps 101 and 103 are mirrored/symmetric), but not limited thereto.

Figure 14:
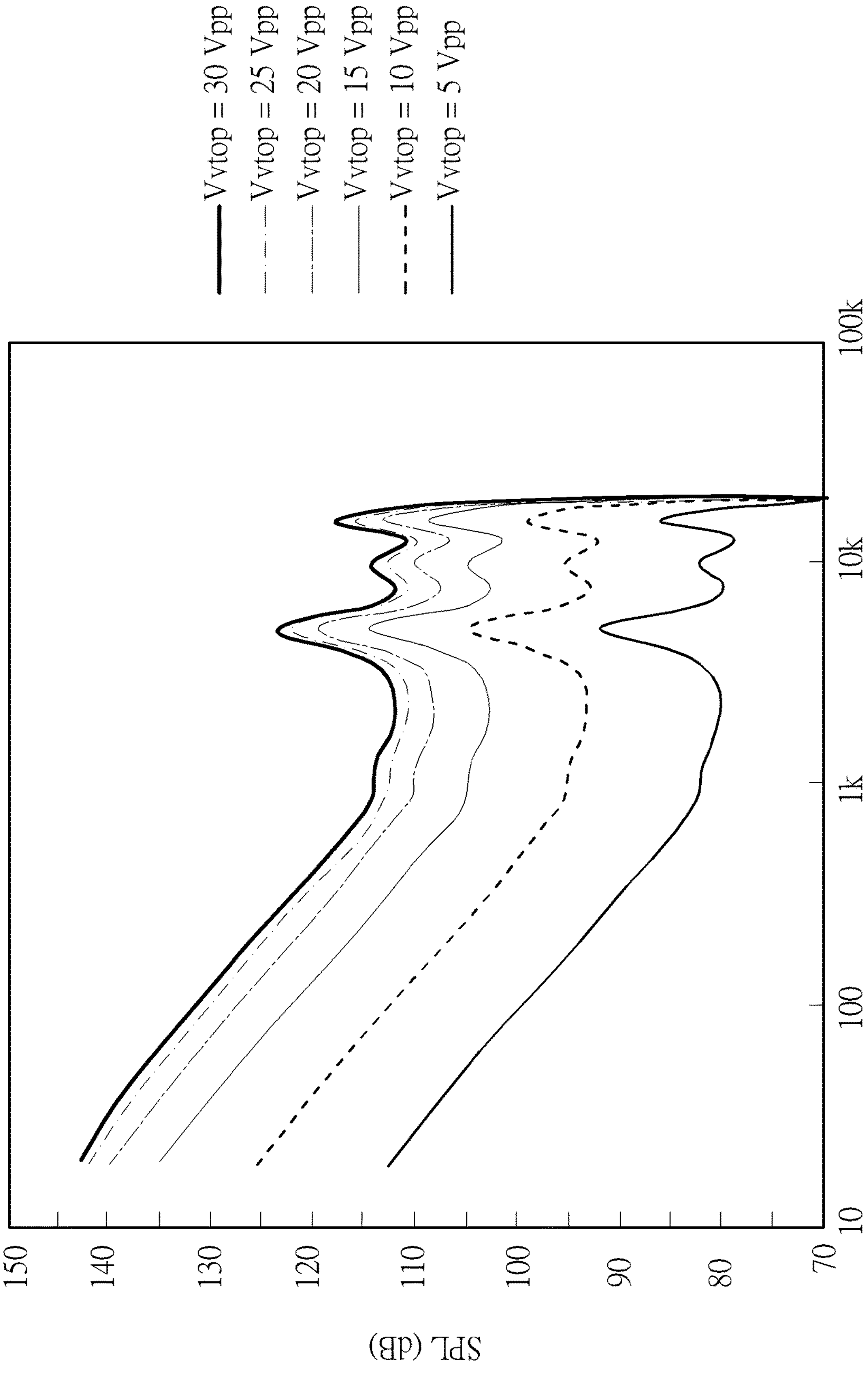
FIG. 14 illustrates SPL measurement results versus frequency of the device of FIG. 12.

FIG. 14 illustrates a sets of frequency response measurement results of a physical embodiment of the device 400 in an IEC711 occluded ear emulator, where driving scheme shown in diagram 431 is used to drive the device 400, Vrms for modulation-driving signal SM for bottom electrodes is 6 Vrms, Vpp (peak-to-peak voltage) for demodulation-driving signal ±SV for top electrodes is swept from 5 Vpp to 30 Vpp, and a GRAS RA0401 ear simulator is used for measuring acoustic results. Operating frequency (i.e., ultrasonic carrier frequency $f_{UC}$) of the device 400 is 160 KHz, and the device dimension is designed accordingly (e.g., W115≈$\lambda_{UC}$=C/$f_{UC}$ 2.10 mm for C=336 m/s). As can be seen from FIG. 14, the device 400 is able to produce sound of high SPL at low frequency band (at least 99 dB for frequency less than 100 Hz).

Figure 15:
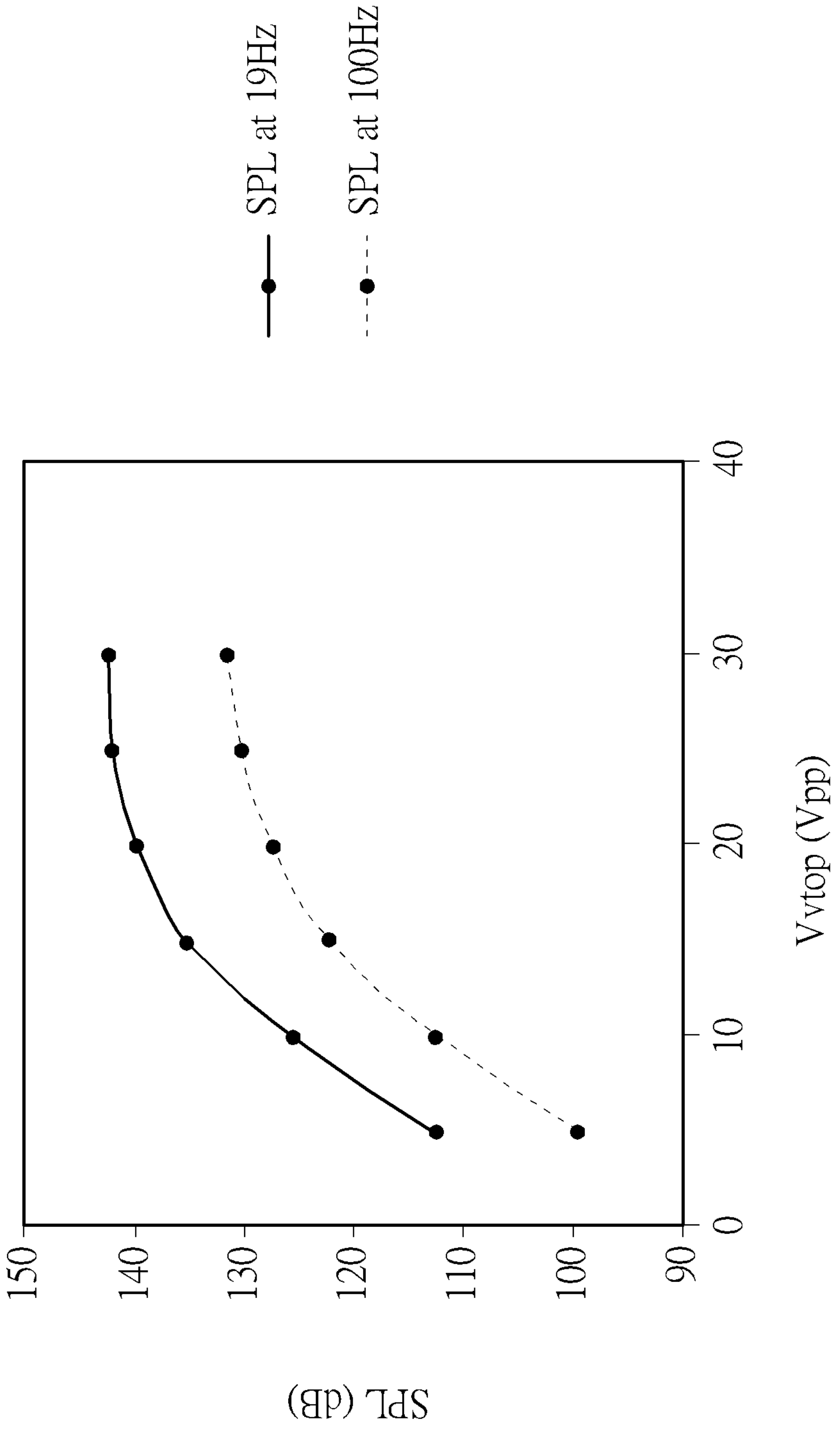
FIG. 15 illustrates SPL measurement results versus peak-to-peak voltage of the device of FIG. 12.

Furthermore, FIG. 15 illustrates and analysis of measurement results of the device 400 shown in FIG. 14. In FIG. 15, the SPL at 100 Hz (bold dashed line) and 19 Hz (bold solid line) of FIG. 14 is plotted versus Vvtop (Vpp), where Vvtop (Vpp) is the peak-to-peak voltage for the demodulation-driving signal applied on the top electrodes, as shown in connection diagram 431. It can be seen from FIG. 14 and FIG. 15 that SPL increases as Vvtop increases. In addition, simulation results of equivalent lumped-circuit model of the device 100 also concurred that SPL increases as amplitude of (valve-driving or) demodulation-driving signal increases. Therefore, it can be obtained that a volume of a sound produced by the air-pulse generating device of the present invention may be controlled via an amplitude of the demodulation-driving signal.

Based on the results from FIG. 14 and FIG. 15, it can be concluded that the concept of modulator-demodulator co-location is validated, meaning that modulation (forming amplitude-modulated ultrasonic air pressure variation) and demodulation (forming opening synchronously to produce asymmetric air pulses) performed by the device 400 successful produce APPS effect. Hence, it may be possible to shrink the chamber width (e.g., W115 of the device 100).

Figure 16:
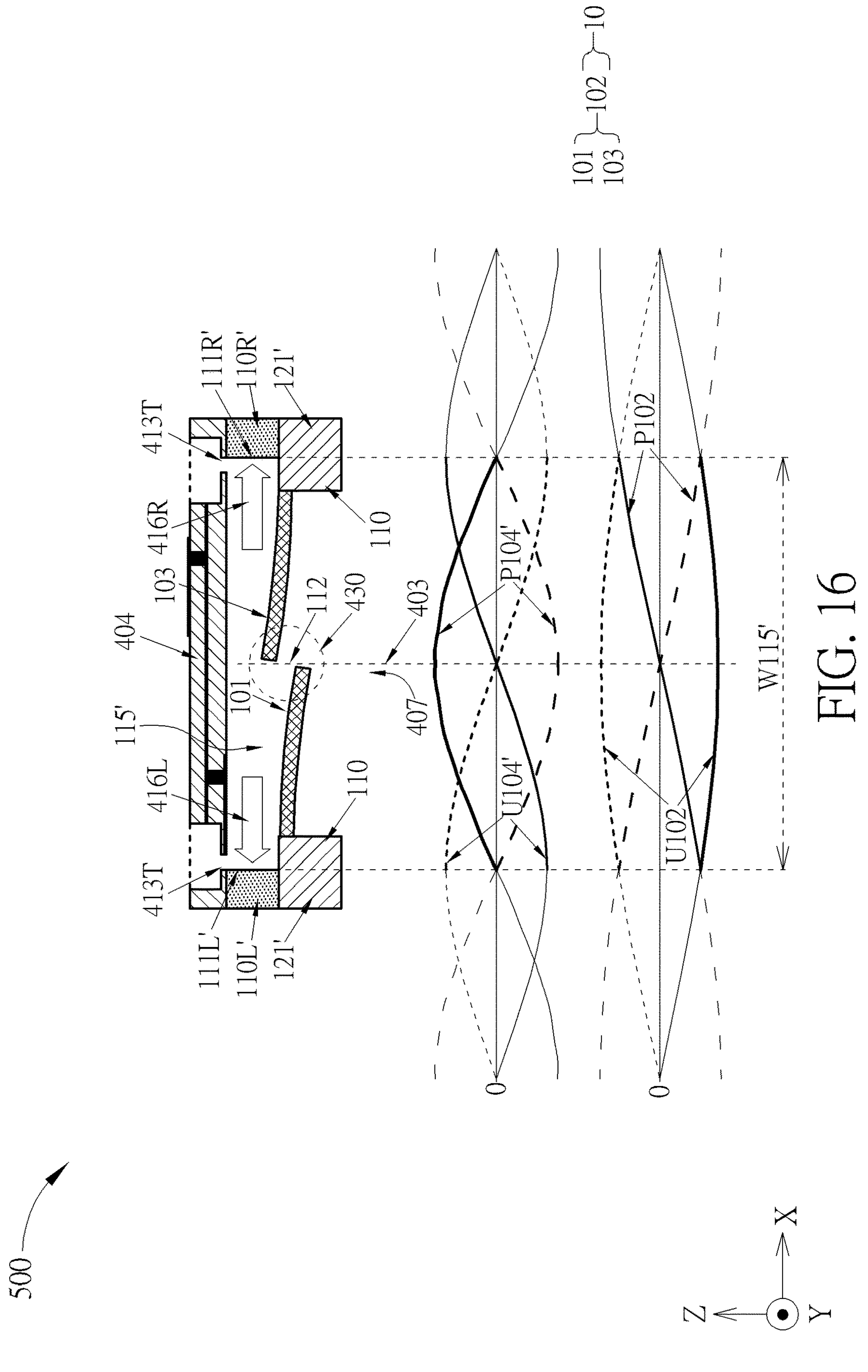
FIG. 16 is a schematic diagram of an air-pulse generating device according to an embodiment of the present invention.

For example, FIG. 16 is a schematic diagram of an APG device 500 according to an embodiment of the present invention. The device 500 is similar to the device 400, where the flap pair 102 is also driven via one of the driving schemes shown in FIG. 13, but not limited thereto. Compared to the device 400, the chamber width W115' of the device 500 is reduced by half. In an embodiment, the chamber width W115' of the device 500 may be $\lambda_{UC}/2$.

Furthermore, standing wave within the chamber, such as 115 of FIG. 12 or 115' of FIG. 16, may not be required, which means, the chamber width (W115) does not have to be (related to) $\lambda_{UC}$ or $\lambda_{UC}/2$, and there is no need to form/maintain/reflect planar wave between sidewalls 111R/111R' and 111L/111L'. It is free/flexible to change the shape of chamber to optimize other factors, e.g., reducing the chamber length to enhance sound producing efficiency, which can be evaluated by SPL per area ($mm^2$) of the device.

Figure 17:
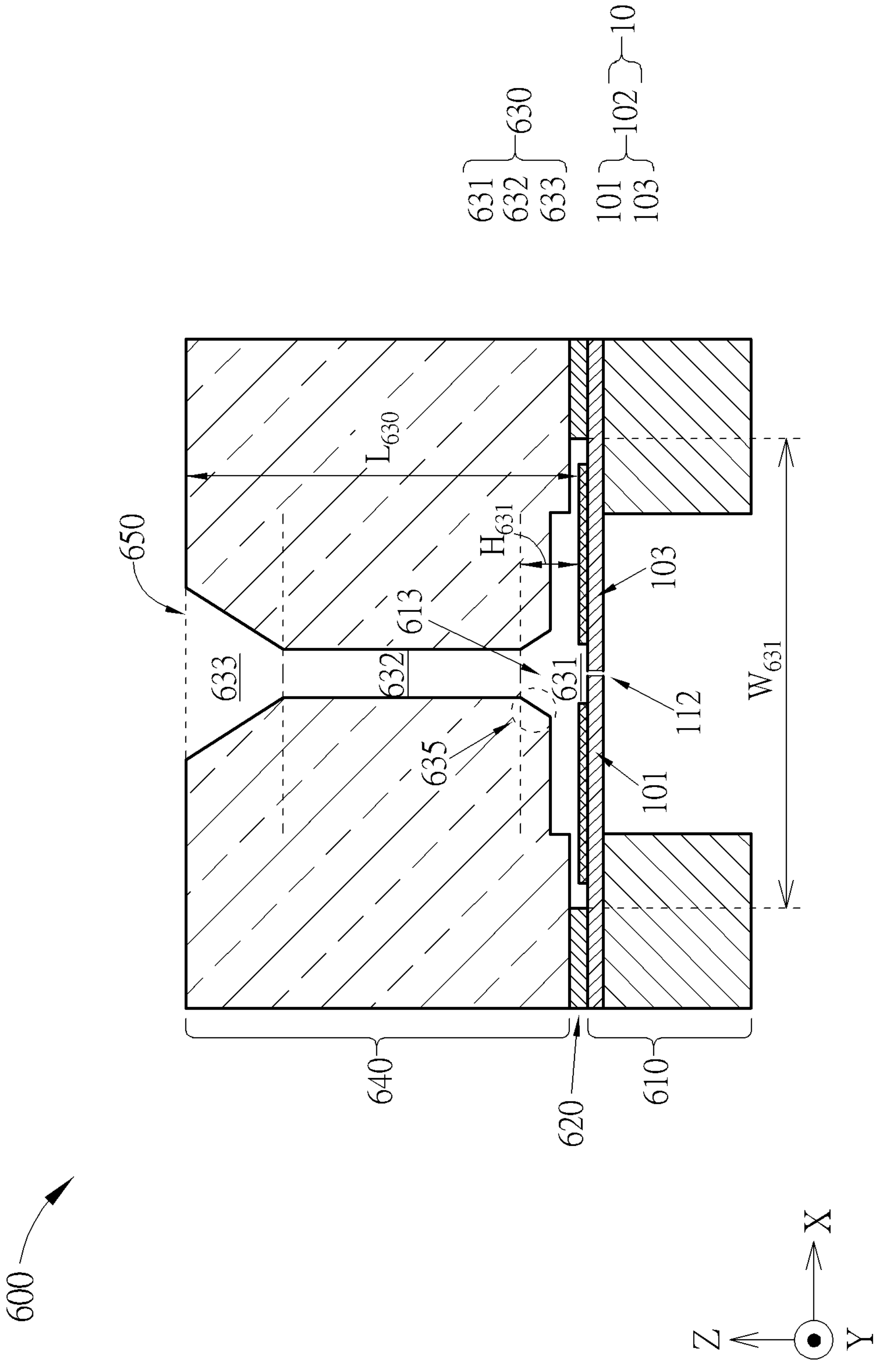
FIG. 17 is a schematic diagram of an air-pulse generating device according to an embodiment of the present invention.

FIG. 17 is a schematic diagram of an APG device 600 according to an embodiment of the present invention. The device 600 may comprise subassemblies 610 and 640. In an embodiment, the subassemblies 610 and 640 may be fabricated via known MEMS process, and be bounded together through layer 620 using bounding or adhesive material such as dry film or other suitable die attach material/methods. The subassembly 610 by itself may be viewed as an APG device (which will be detailed later in FIG. 26 and related paragraphs), which comprises the flap pair 102 or the film structure 10. The subassembly 640 may be viewed as a cap structure.

Similar to the device 500, the device 600 comprises the flap pair 102 with flaps 101 and 103 driven via one of the driving schemes shown in FIG. 13, but not limited thereto, and the flap pair 102 of the device 600 is actuated to form amplitude-modulated ultrasonic air pressure variation with ultrasonic carrier frequency $f_{UC}$ and to form the opening 112 at the rate synchronous with the ultrasonic carrier frequency $f_{UC}$ and produce a plurality of air pulses via an outlet toward ambient according to the ultrasonic air pressure variation.

Different from the device 500, a conduit 630 is formed within the device 600. The conduit 630 connects air volume above the virtual valve 112 (the slit between flaps 101 and 103) outward to the ambient. The conduit 630 comprises a chamber 631, a passageway 632 and an outlet 633 (or zones 631-633). The chamber 631 is formed between the film structure 10 and the cap structure (subassembly) 640. The passageway 632 and the outlet 633 are formed within the cap structure (subassembly) 640.

The chamber 631 may be viewed as a semi-occluded compression chamber, where an air pressure within the compression chamber 631 may be compressed or rarefied in response to the common-mode modulation-driving signal SM, and the ultrasonic air pressure variation/wave may be generated and directly fed into the passageway 632 via an orifice 613. The passageway 632 serves as a waveguide, where the shape and dimension thereof should be optimized to allow the pressure variation/pulse generated in zone/chamber 631 to propagate outward efficiently. The outlet 633 is configured to minimize reflection/deflections and maximize the acoustic energy coupling to ambient. To achieve that, a tunnel dimension (e.g., a width in X direction) of the outlet 633 is gradually widened toward the ambient and the outlet 633 may have a horn-shape.

In an embodiment, a length/distance $L_{630}$ of the conduit 630 between the opening 112 (equivalently, the flap pair 102 or the film structure 10) and a surface 650 may be (substantially) a quarter wavelength $\lambda_{UC}/4$ corresponding to $f_{UC}$ (with, for example, ±10% tolerance). For example, $L_{630}$ may be 450 μm for case of $f_{UC}$=192 KHz, which is not limited thereto. Note that, (referring back to FIG. 16) it is observed that air pressure wave (as a kind of air pressure variation) propagates within the chamber 115' of the device 500 (or the chamber 115 within the device 100) along X direction, and a distance between virtual valve (opening) 112 and sidewall surfaces 111L'/111R' is $\lambda_{UC}/4$. In FIG. 17, the device 600 may be viewed as folding/rotating air wave propagation path by 90° to align with Z-direction, such that air wave or air pressure pulse is emitted via the Z-direction toward ambient directly.

Figure 18:
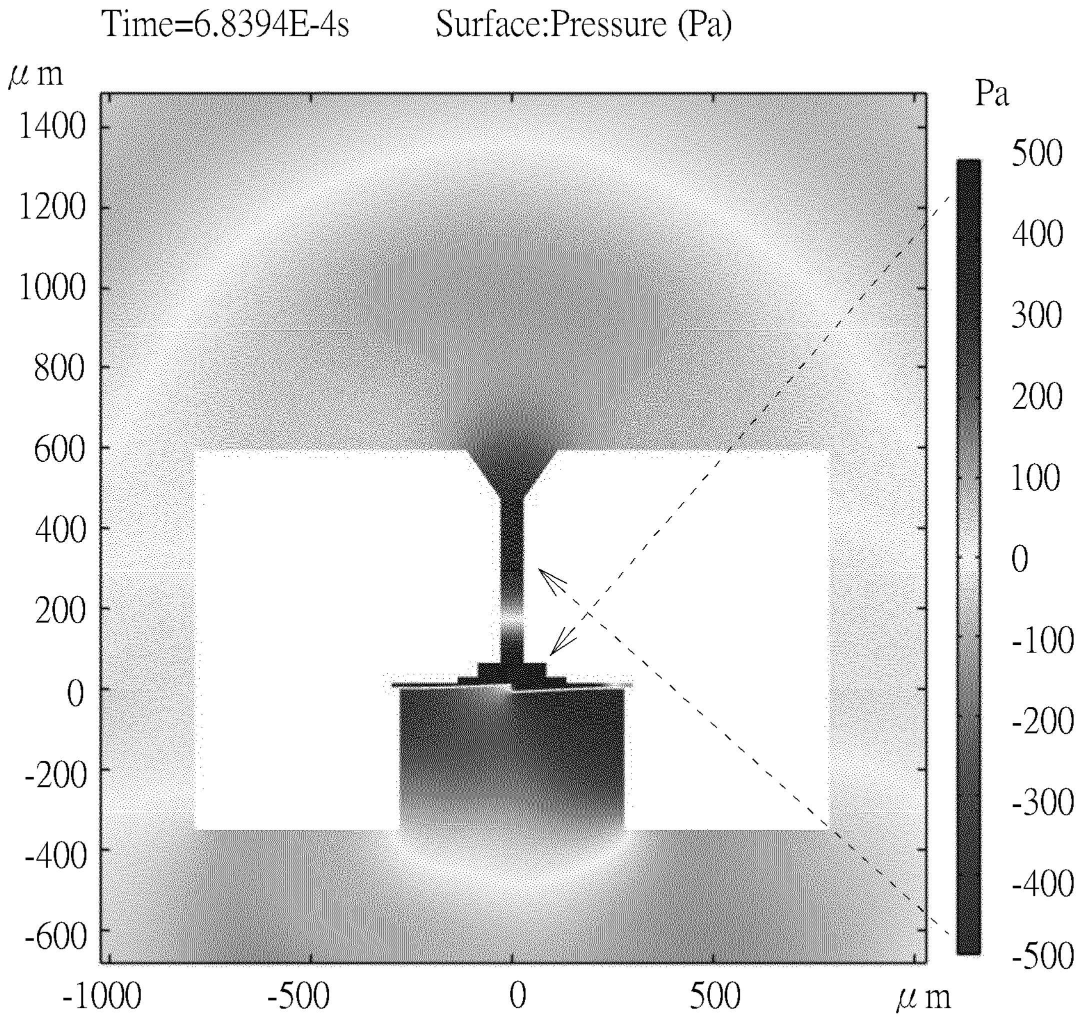
FIG. 18 illustrates a snapshot of FEM (finite element method) simulated pressure profile of a device similar to the device of FIG. 17.

FIG. 18 illustrates a snapshot of FEM simulated pressure profile of a device similar to the device 600, according to an embodiment of present invention. In FIG. 18, auxiliary arrows are presented to indicate polarity/sign of the pressure values. Difference between the device 600 and the device shown in FIG. 18 is that, chamfer 635 is added on the subassembly 640 at an interface between the chamber 631 and the passageway 632 to minimize disturbance to the airflow. In FIG. 18, pressure within zone 631 is about +500 Pa, and pressure within zone 632 closed to 633 is about −500 Pa. Brightest zone presents pressure nodal plane.

Note that, nodal plane within zone 632 indicates proper forming of wave propagation, and space/distance between nodal plane 632 and nodal plane outside the device is about 1.2*λ/2 (herein λ=346 (m/s)/192 (KHz)), which is close to (and slightly larger than) λ/2. It implies that, non-interrupted pressure wave propagation at the speed of sound exists. In other words, pressure pulses or air wave generated by the film structure of the device 600 radiate toward ambient, as shown in FIG. 18.

Figure 19:
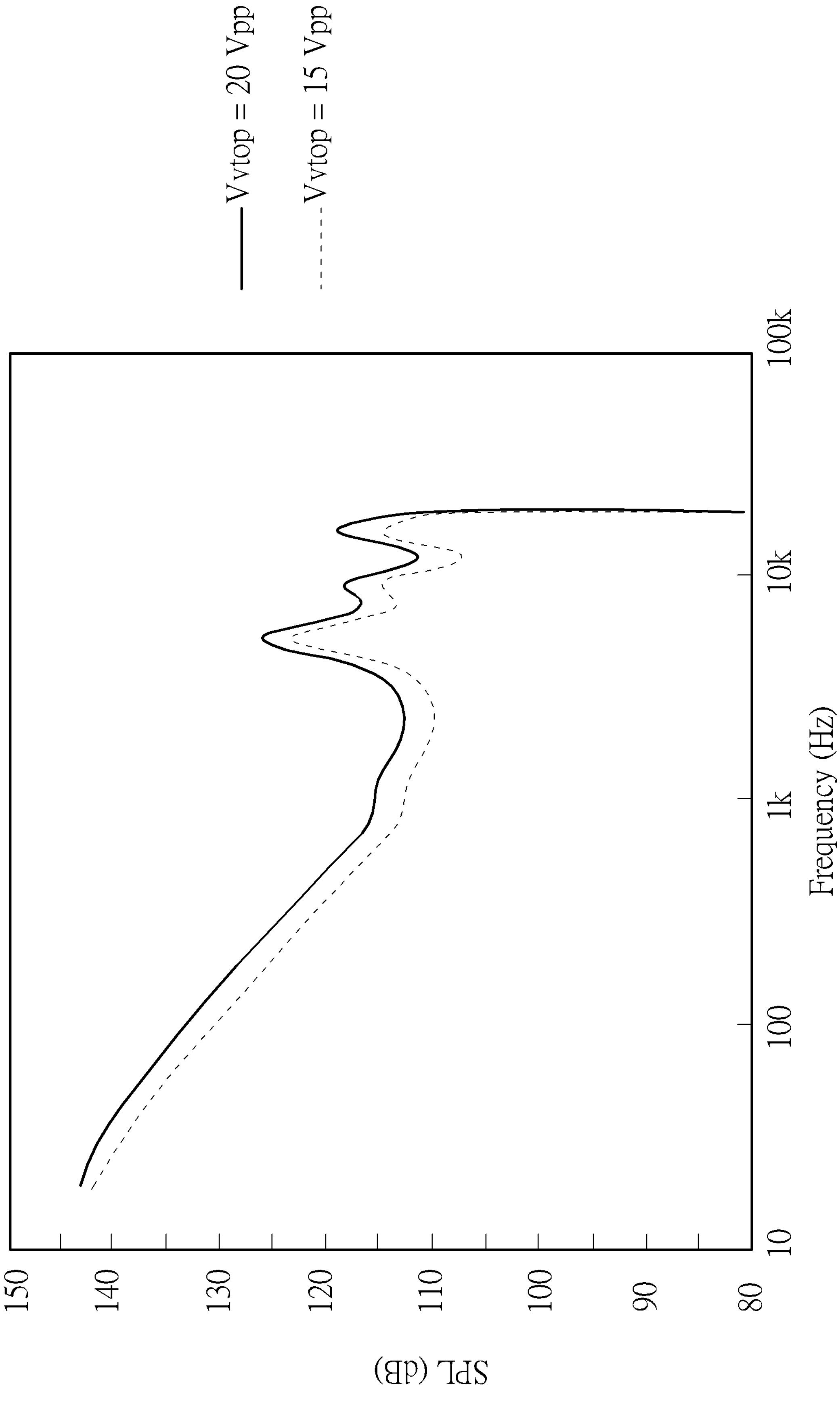
FIG. 19 illustrates ear coupler SPL measurement results versus frequency of the device of FIG. 17.

FIG. 19 illustrates IEC711 occluded ear coupler SPL measurement results versus frequency of a physically implemented device 600, where results corresponding to the demodulation-driving signal ±SV with 20 Vpp and 15 Vpp are plotted. Also, parameters of the devices 400 and 600 for producing maximum SPL are compared in TABLE I.

TABLE I

| | Device 400 | Device 600 |
|---|---|---|
| SV | 30 Vpp | 20 Vpp |
| SM | 6 Vrms (16 Vpp) | 5 Vpp |
| SPL | 142.39 dB at 19 Hz<br>131.44 dB at 100 Hz | 143.52 dB at 19 Hz<br>133.44 dB at 100 Hz |
| Die Size | 50 $mm^2$ | 30 $mm^2$ |

As can been seen from FIG. 14, FIG. 19 and TABLE I, the device 600 can achieve slighter higher SPL than the device 400 with lower input amplitude while reducing the die size by 40% at the same time. It means, the device 600 with conduit 630 is far more efficient both in terms of power consumed and in terms of silicon space/area occupied.

In general, a width W631 of the chamber 631 is significantly less than $\lambda_{UC}/2$, for example, in the example of device 600 W631≈570 μM while $\lambda_{UC}/2$≈900 μM. For zone 631 to perform chamber compression, the dimension of the chamber 631 should be much smaller than $\lambda_{UC}$. In an embodiment, a height $H_{631}$ of the chamber 631 may be less than $\lambda_{UC}/5$, i.e., $H_{631}<\lambda_{UC}/5$. Note that, the width of the chamber 631 (i.e., a dimension in X direction) may be getting narrower from the film structure 10 toward the passageway 632, either in a staircase fashion or a tapered fashion, where both cases are within the scope of present invention.

Figure 20:
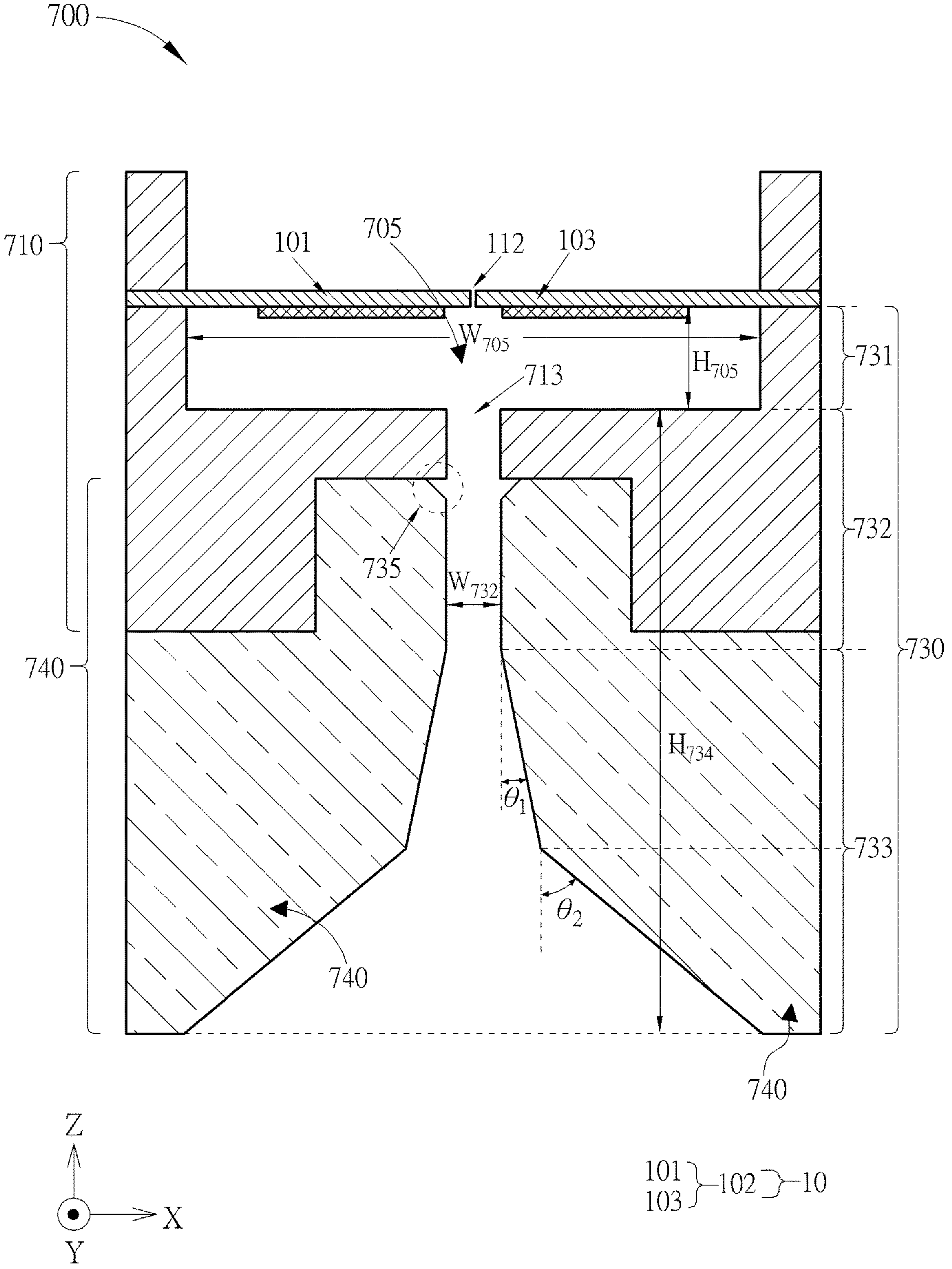
FIG. 20 is a schematic diagram of an air-pulse generating device according to an embodiment of the present invention.

FIG. 20 is a schematic diagram of an APG device 700 according to an embodiment of the present invention. Similar to the device 600, the device 700 comprises subassemblies 710 and 740, and has a conduit 730 formed therewithin. The subassembly 710 may be fabricated by MEMS process, and may be viewed as an APG device also. A chamber 705 is formed within the subassembly 710. The subassembly 710 may itself be an APG device, which can be viewed as a combination of squeeze mode operation disclosed in U.S. Pat. No. 11,172,310, virtual valve disclosed in U.S. Pat. No. 11,043,197, and driving scheme illustrated in FIG. 13, where U.S. Pat. Nos. 11,172,310 and 11,043,197 are incorporated herein by reference.

The conduit 730 comprises a chamber 731, a passageway/waveguide 732 and a horn-shaped outlet 733 (or zones 731-733), and connects air volume below the virtual valve 112 outward to the ambient. Different from the device 600, the subassembly 740 may be formed/fabricated via technologies such as 3D printing, precision injection molding, stamping, etc. The passageway/waveguide 732 comprises a first section which is the orifice 713 etched on the cap of the subassembly 710 and a second section which is formed within the subassembly 740, where chamfer 735 may be added therebetween to minimize disturbance. The chamber 705 and 731 are overlapped. The pressure variation/wave generated by the flaps 101 and 103 would be fed into the passageway/waveguide 732 directly.

Figure 21:
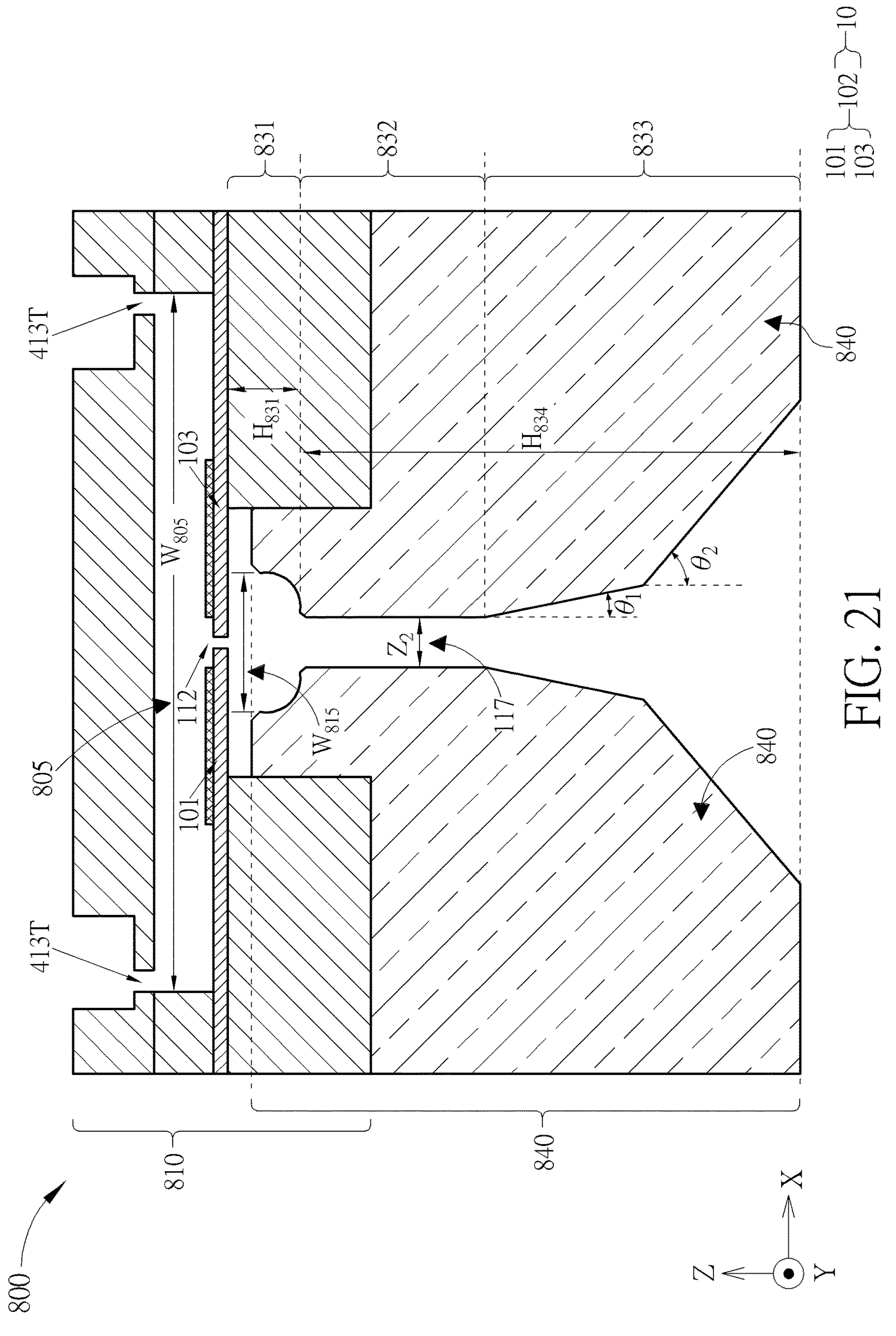
FIG. 21 is a schematic diagram of an air-pulse generating device according to an embodiment of the present invention.

FIG. 21 is a schematic diagram of an APG device 800 according to an embodiment of the present invention. The device 800 comprises subassemblies 810 and 840. The subassembly 810 may have the same or similar structure of the device 500, which can be fabricated by MEMS process and be viewed as an APG device, comprises flaps 101 and 103 driven by one of the schemes shown in FIG. 13, where the virtual valve (opening) 112 is formed. The subassembly 840 may be formed/fabricated via technologies such as 3D printing, precision injection molding, precision stamping, etc. Note that, via the (de)modulation operation, the subassembly 810 produces a plurality of airflow pulses.

A conduit 830, connecting air volume below the virtual valve 112 outward to the ambient, is formed within the device 840. The conduit 830 comprises a (compression) chamber 831, a passageway/waveguide 832 and a horn-shaped outlet 833 (or zones 631-633). The compression chamber 831 is configured to convert the plurality of airflow pulses into a plurality of air pressure pulses. Specifically, the chamber 831 would producing pressure pulses $\Delta P_n \propto P_{0\_n} \cdot \Delta M_n / M_{0\_n}$ (Eq. 1), where $M_{0\_n}$ is the airmass inside chamber 831 before the start of pulse cycle n and $\Delta M_n$ is the airmass associated with the airflow pulse of pulse cycle n. Eq. 1 represents converting airflow pulses into air pressure pulses, and the converted air pressure pulses propagate into the passageway/waveguide 832. In an embodiment, the subassembly 840 in zone 831 may have a brass mouthpiece-like cross section profile.

The passageway/waveguide 832 may have an impedance that is close to, matched to, or within ±15% of, the compression chamber 831, so as to maximize the propagation efficiency of the pressure pulse generated in zone 831 outward to the ambient. In an embodiment, the propagation efficiency may be optimized by properly choosing the cross section area of the passageway 832.

In the embodiment shown in FIG. 21, a tunnel dimension (e.g., width in X direction) of the outlet 833 is gradually widened toward the ambient with a piece-wise linear manner (where $\theta_1 < \theta_2$), such that a horn-shape is formed. Note that, the horn-shape of the outlet may be designed according to practical requirements. The tunnel dimension of the outlet can be widen in polynomial manner, pure linear manner, piece-wise linear manner, parabolic manner, exponential manner, hyperbolic manner, etc., and not limited thereto. As long as the tunnel dimension of the outlet is gradually widened toward the ambient, requirement of the present invention is satisfied, which is within the scope of the present invention.

To perform chamber compression in zone 831, dimension of chamber/zone 831 is suggested to be much smaller than wavelength $\lambda_{UC}$ corresponding to operating frequency $f_{UC}$. For instance, in an embodiment of $f_{UC}$=160 KHz and $\lambda_{UC}$=(346/160)=2.16 mm, a height $H_{831}$ may be in a range of $\lambda_{UC}/10 \sim \lambda_{UC}/60$ (e.g., $H_{831} = \lambda_{UC}/35$=62 μm) and a width $W_{815}$ may be in a range of $\lambda_{UC}/5 \sim \lambda_{UC}/30$ (e.g., $W_{815}$ in a range of 115 μm~350 μm), but not limited thereto.

Note that, the film structure 10 subdivide a volume of space into a resonance chamber 805 on one side and a compression chamber 831 on another (or the other) side, and by nature of this subdivision, the displacements due to common-mode movement of flaps 101 and 103, as observed from the space of chamber 805 and chamber 831, will have exactly the same magnitude but of opposite direction/polarity. In other words, along with the common mode movement of the flaps 101 and 103, a push-pull operation will be formed, and such push-pull operation will increase (e.g., doubles) the pressure difference across flaps 101 and 103, and thus the airflow will be increased when virtual valve 112 is opened.

Specifically, for the compression chamber 831 with volume V1 and the resonance chamber 805 with volume V2, a membrane/flap movement, resulting in a volume difference DV (assuming DV<<V1, V2), would cause a pressure change in V1 as $\Delta P_{V1} = 1 - V1/(V1-DV) = -DV/(V1-DV) \approx -DV/V1$ and a pressure change in V2 as $\Delta P_{V2} = 1 - V2/(V2+DV) = DV/(V2+DV) \approx DV/V2$. The pressure difference between two volume may be $\Delta P_{V2} - \Delta P_{V1} = DV/(V2+DV) + DV/(V1-DV)$. When $V1 \approx V2 \approx Va$, $\Delta P_{V2} - \Delta P_{V1} \approx DV/(Va+DV) + DV/(Va-DV) = DV \cdot 2Va/(Va^2 - DV^2) \approx 2 \cdot DV/Va \approx 2 \cdot \Delta P_{V2}$, which means that the push-pull operating can doubles the pressure difference between the two subspaces separated by flaps 101 and 103.

Figure 22:
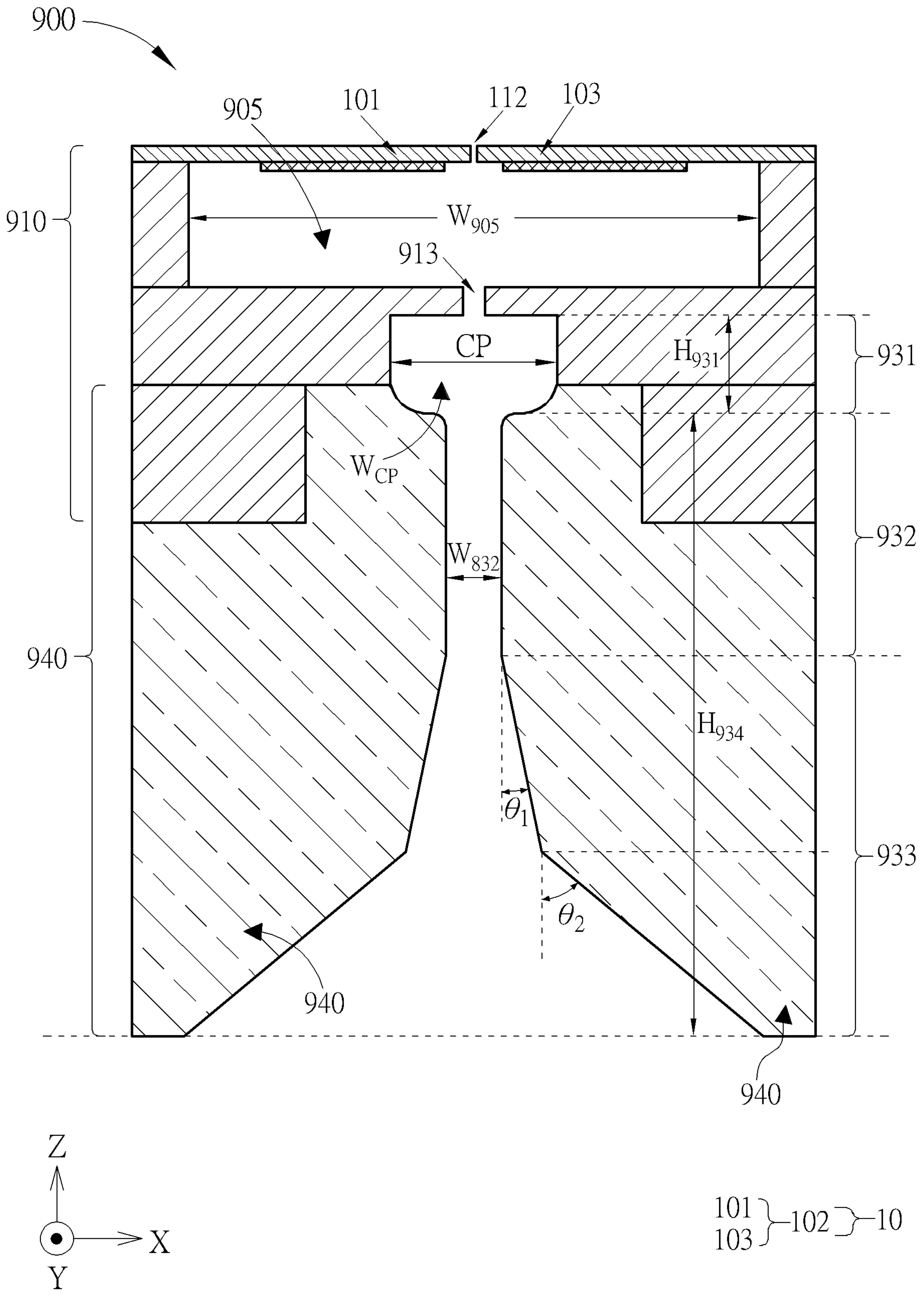
FIG. 22 is a schematic diagram of an air-pulse generating device according to an embodiment of the present invention.

FIG. 22 is a schematic diagram of an APG device 900 according to an embodiment of the present invention. The device 900 comprises subassemblies 910 and 940. The subassembly 910 may be fabricated by MEMS process and may be viewed as an APG device. The subassembly 940 may be fabricated by 3D printing. Similar to the device 700 or the subassembly 710, the subassembly 940 may also be viewed as a combination of squeeze mode operation disclosed in U.S. Pat. No. 11,172,310, virtual valve disclosed in U.S. Pat. No. 11,043,197, and driving scheme illustrated in FIG. 13. In the device 900, squeeze mode operating chamber 905 and compression chamber 931 are separated; while in the device 700, the squeeze mode operating chamber and the compression chamber are merged as chamber 731.

The effect of the subassembly 810 and subassembly 910 are similar in terms of airflow pulse generation, but their operation principles are different. The subassembly 810 exploits resonance; while the assembly 910 exploits compression and rarefication of the squeeze mode operating chamber 905 caused by membrane (flaps 101, 103) movement. Hence, chamber width $W_{905}$ no longer needs not fulfill any relationship with $\lambda_{UC}$, and thus, the size of the chamber 905 may be shrunk as much as practical/desired.

Figure 23:
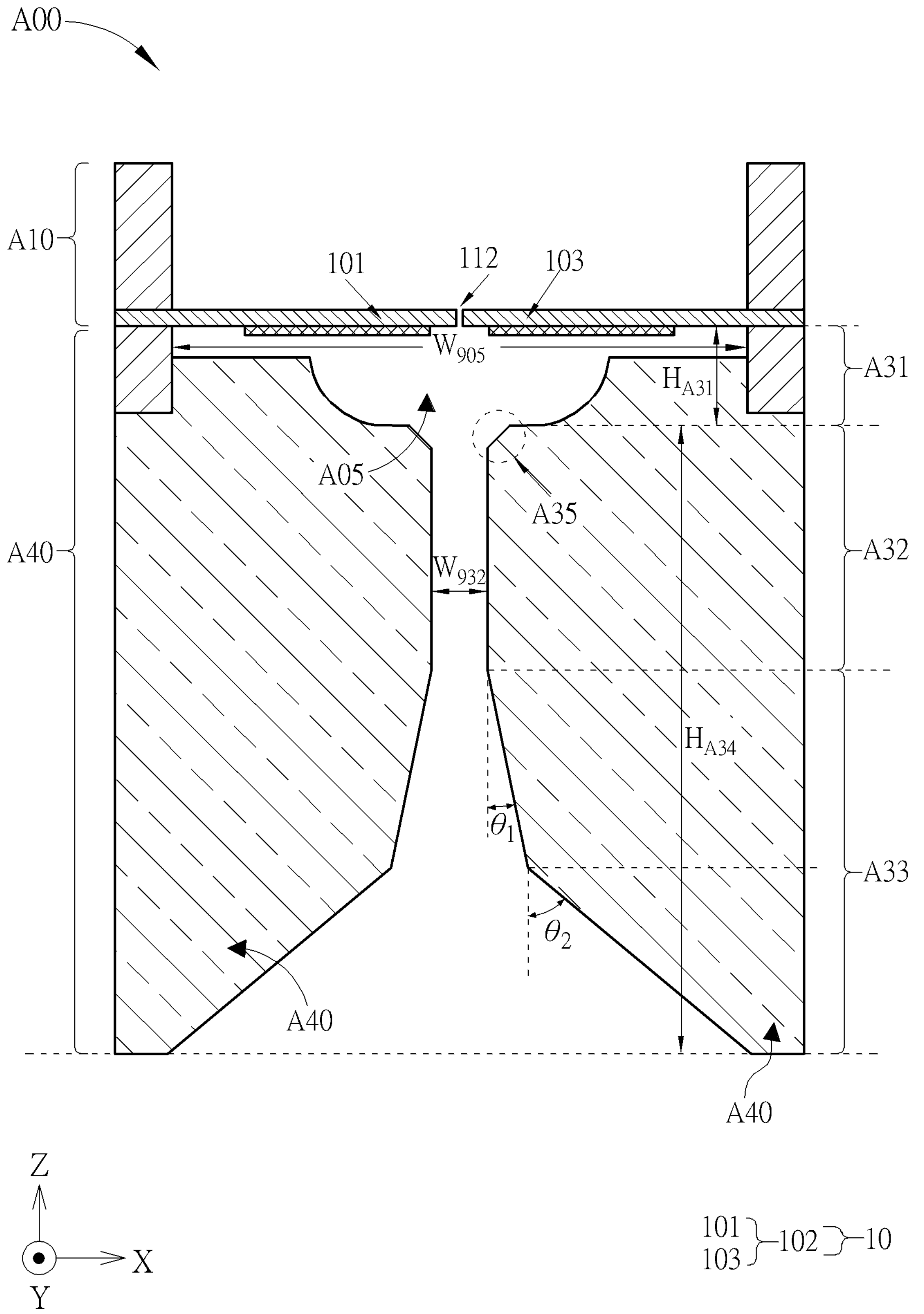
FIG. 23 is a schematic diagram of an air-pulse generating device according to an embodiment of the present invention.

FIG. 23 is a schematic diagram of an ΔPG device A00 according to an embodiment of the present invention. Since resonance is not a requirement, restriction of rectangular cross-section of chamber, such as chamber 905, can be removed, and it is more flexible in geometry to optimize the pressure wave generation or the propagation of wave out to the ambient. For example, chamber A05 or subassembly A40 may have brass mouthpiece-like cross-section.

Another aspect of device A00 of FIG. 23 is that of "direct pressure coupling". Instead of first going through an orifice 913 as in device 900, the pressure wave generated in compression chamber A05 of device A00 is coupled directly to the conduit A32, and then goes out to the ambient via the outlet A33. Such direct coupling between compression chamber and the conduit/outlet eliminates the loss incurred by the orifice 913, resulting in significant efficiency improvement over device 900.

Figure 24:
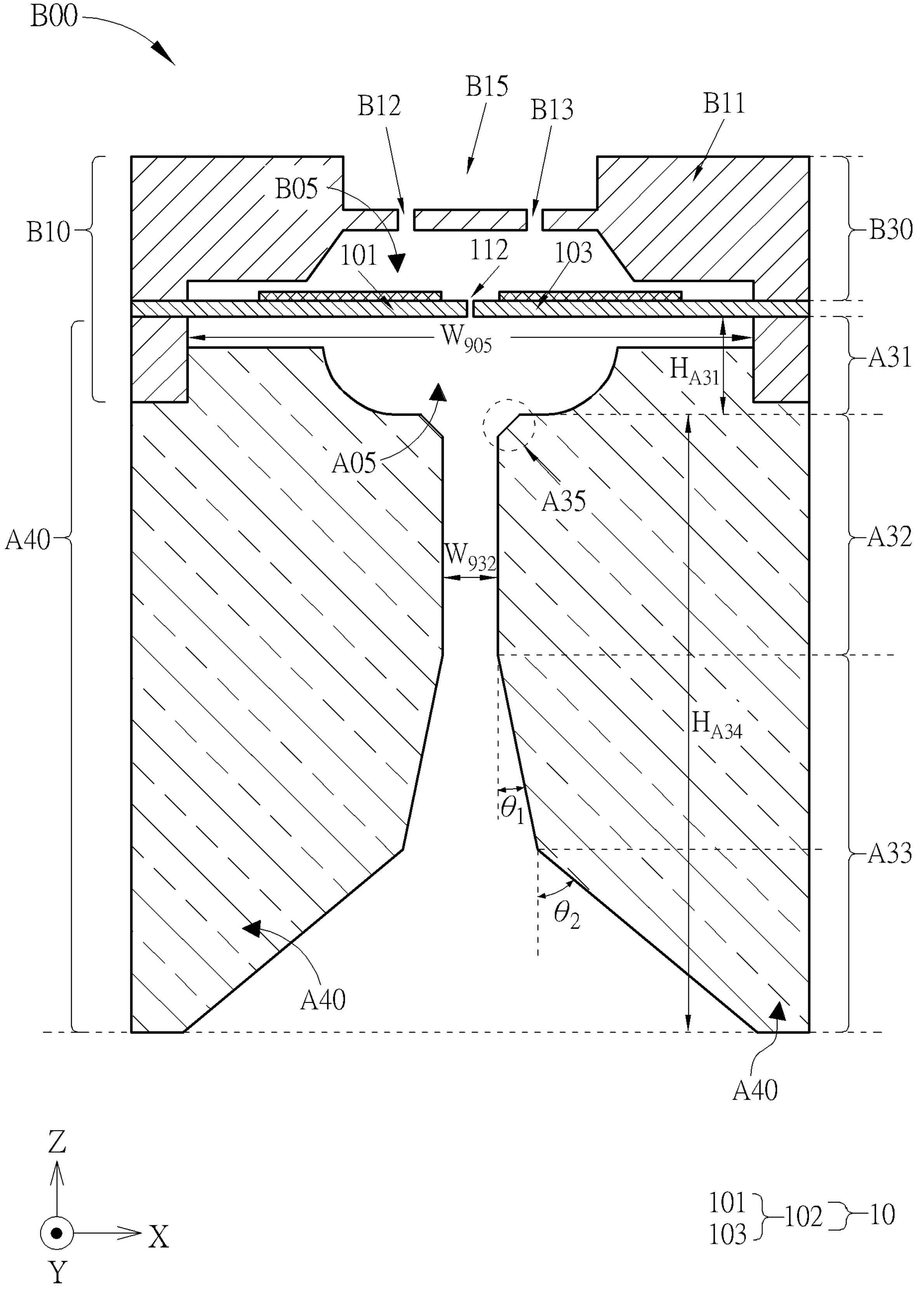
FIG. 24 is a schematic diagram of an air-pulse generating device according to an embodiment of the present invention.

FIG. 24 is a schematic diagram of an APG device B00 according to an embodiment of the present invention. The device B00 is similar to the device A00. Different from the device A00, the device B00 further comprises a (cap) structure B11, and a chamber B05 is formed between the cap structure B11 and the film structure 10. With the chamber A05 formed by one side of the film structure 10 and the chamber B05 formed by the other side of the film structure 10, the push-pull operation may be performed, such that airflow pulse may be enhanced.

Note that, the air pulses produced by the subassemblies 810 and 910 may be viewed as airflow pulses, and the subassemblies 840 and 940 may be viewed as an airflow-to-air-pressure converter, which has a trumpet-like cross section profile. On the other hand, the air pulses produced by the subassemblies 610, 710, A10 and B10 may be viewed as air pressure pulses, which create demodulated/asymmetric air pressure pulses directly and may be more efficient than the devices 800 and 900.

In addition, the subassembly with conduit formed therewithin or the subassembly having conduit with trumpet-like cross section profile may also be applied on the ΔPG device disclosed in U.S. Pat. Nos. 10,425,732, 11,172,310, etc., filed by Applicant, or other device such as U.S. Pat. No. 8,861,752, which is not limited thereto.

Figure 25:
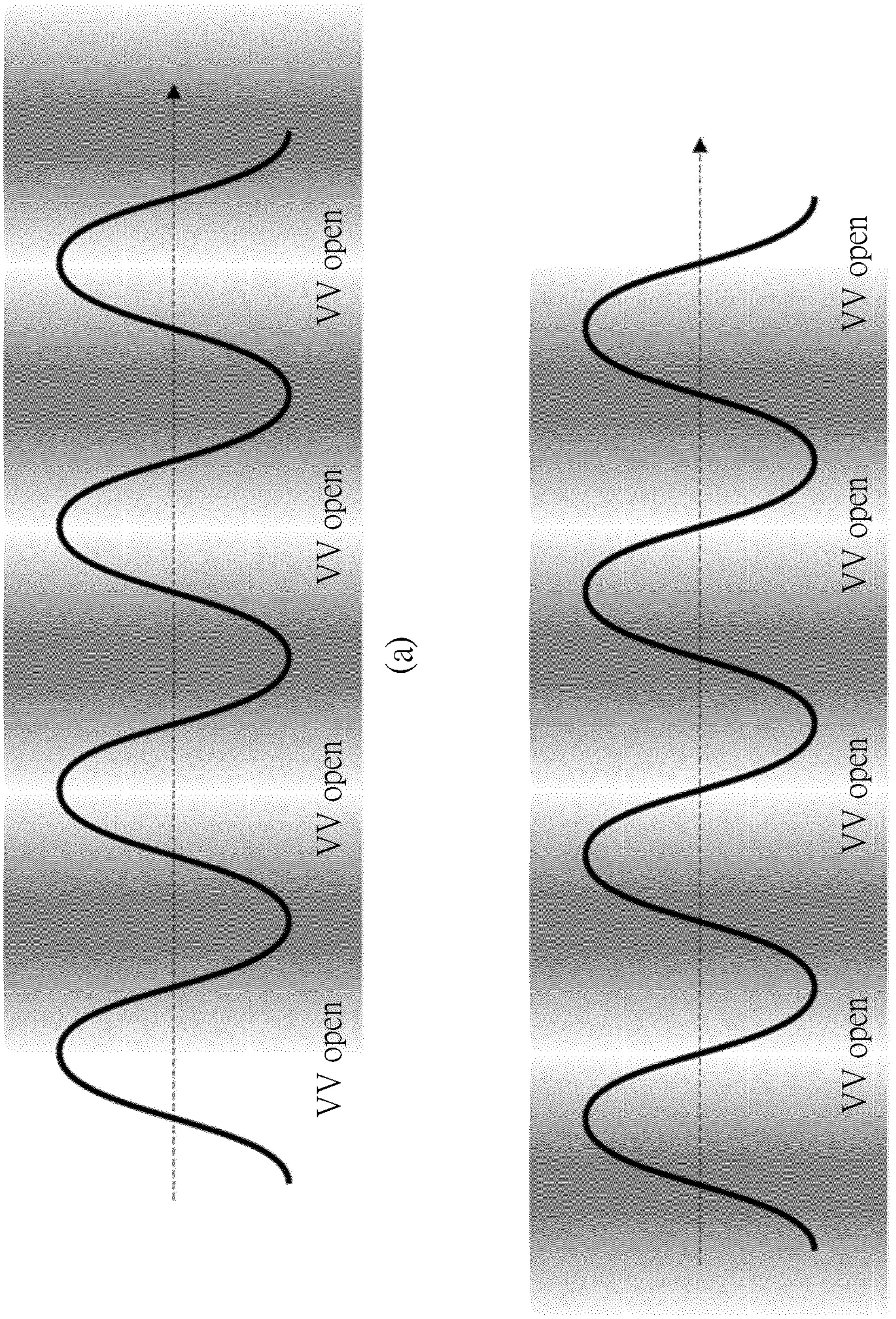
FIG. 25 demonstrates illustrations of timing alignment of virtual valve opening according to an embodiment of the present invention.

FIG. 25 demonstrates illustrations of timing alignment of virtual valve (VV) 112 opening for APG devices of present invention. In FIG. 25, solid curves represent flaps common mode movement produced by modulation-driving signal SM and darkness in the background represents acoustic resistance corresponding to the virtual valve, where darker shade means higher resistance (VV closed, resulting in the volume within the chamber being disconnected from the ambient) and lighter means lower resistance (VV opened, resulting in the volume within chamber being connected to the ambient).

In FIG. 25(*a*), the timing of the open status of virtual valve (VV) 112 is aligned to maximum (a first peak) of pressure within the chamber is achieved which typically lies slightly before the flaps reaching their most positive (a first peak) common-mode displacement; while the timing of the closed status of virtual valve 112 is aligned to minimum (a second peak) of pressure within the chamber is reached which typically lies slightly before the flaps reaching their most negative (a second peak) common-mode displacement. Timing alignment shown in FIG. 25(*a*), where the maximum opening of VV 112 is aligned to a first peak of pressure within the chamber, is to maximize the pulse amplitude of the airflow pluses, which may be suitable for the devices 100~500 (with chamber but without conduit formed therein).

On the other hand, in FIG. 25(*b*), inspired by valve timing of gas/piston engine in the automobile industry, the timing of the open status of virtual valve 112 is aligned to a maximum speed of the common mode movement of membrane (flaps) moving toward a first direction; while the timing of the closed status of virtual valve 112 is aligned to a maximum speed of the common mode movement of membrane (flaps) moving toward a second direction opposite to the first direction. The first direction is a direction from the film structure toward ambient. Timing alignment shown in FIG. 25(*b*) is to maximize the volume of the airflow pluses, which may be suitable for the device 600, or the devices 700~900, A00 and B00 (with chamber comprising conduit formed therein).

Figure 26:
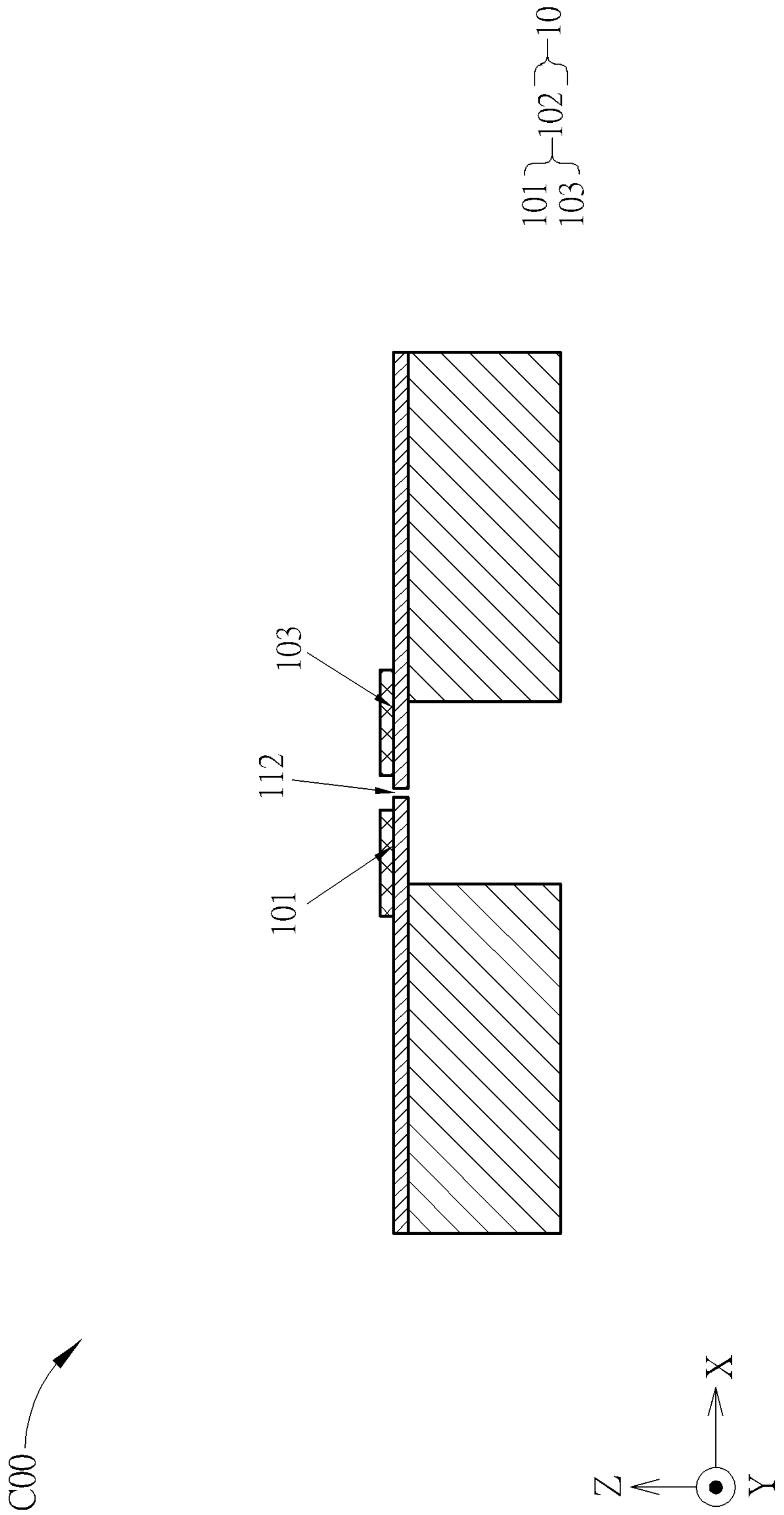
FIG. 26 is a schematic diagram of an air-pulse generating device according to an embodiment of the present invention.

FIG. 26 is a schematic diagram of an APG device C00 according to an embodiment of the present invention. The deice C00 is similar to the APG devices previously introduced, which comprise the flaps 101 and 103. The flaps 101 and 103 may also be driven by the driving scheme shown in FIG. 13.

Different from those devices, the device C00 comprises no cap structure. Compared to the ΔPG devices introduced above, the device C00 has much simple structure, requiring less photolithographic etching steps, done away complicated conduit fabrication steps, and avoid the need to bound two sub-components or subassemblies together. Production cost of the device C00 is reduced significantly.

Since there is no chamber formed under the cap structure to be compressed, the acoustic pressure generated by the device C00 arise mainly out of the acceleration of the flaps (101 and 103) movement. By aligning the timing of opening of the virtual valve 112 (in response to the demodulation-driving signal ±SV) to the timing of acceleration of common mode movement of the flaps 101 and 103 (in response to the modulation-driving signal SM), the device C00 would be able to produce asymmetric air (pressure) pulses.

Note that, the space surrounding flaps 101 and 103 is divided into two subspaces: one in Z>0, or +Z subspace, and one in Z<0, or −Z subspace. For any common mode movements of flaps 101 and 103, a pair of acoustic pressure waves will be produced, one in subspace +Z, and one in the subspace −Z. These two acoustic pressure waves will be of the same magnitude but of opposite polarities. As a result, when the virtual valve 112 is opened, the pressure difference between the two air volumes in the vicinity of the virtual valve 112 would neutralize each other. Therefore, when the timing of differential mode movement reaching its peak, i.e. the timing VV 112 reaches its maximum opening, is aligned to the timing of acceleration of common mode movement reaching its peak, the acoustic pressure supposed to be generated by the common mode movement shall be subdued/eliminated due to the opening of the virtual valve 112, causing the auto-neutralization between two acoustic pressures on the two opposite sides of the flaps 101 and 103, where the two acoustic pressures would have same magnitude but opposite polarities. It means, when the virtual valve 112 is opened, the device C00 would produce (near) net-zero air pressure. Therefore, when the opened period of the virtual valve 112 overlaps a time period of one of the (two) polarities of acceleration of common mode flaps movement, the device C00 shall produce single-ended (SE) or SE-liker air pressure waveform/pulses, which are highly asymmetrical.

In the present invention, SE(-like) waveform may refers that the waveform is (substantially) unipolar with respect to certain level. SE acoustic pressure wave may refer to the waveform which is (substantially) unipolar with respect to ambient pressure (e.g., 1 ATM).

Figure 27:
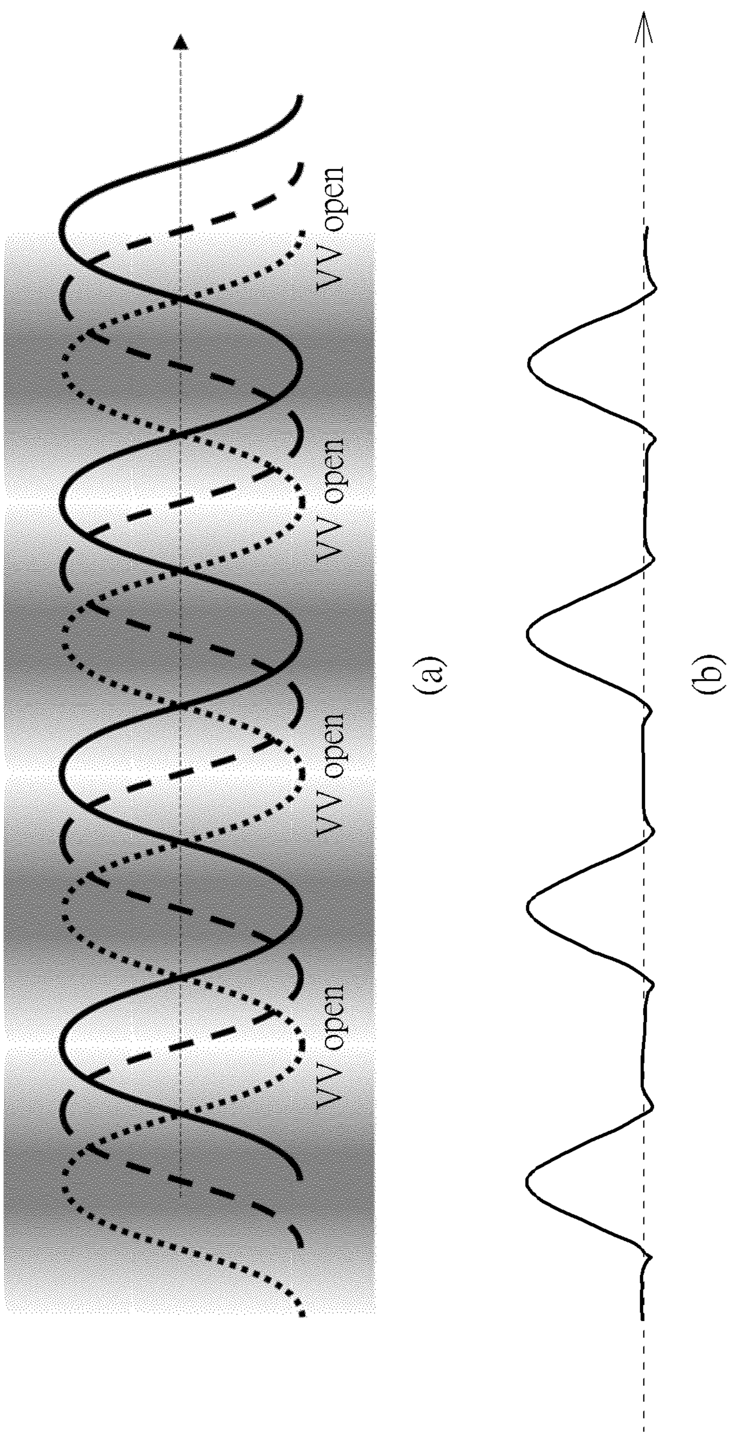
FIG. 27 demonstrates illustrations of timing alignment of virtual valve opening according to an embodiment of the present invention.

FIG. 27 demonstrates illustrations of timing alignment of virtual valve (VV) opening according to an embodiment of the present invention. The timing alignment scheme shown in FIG. 27 may be applied to the device C00. In FIG. 27(*a*), solid/dashed/dotted curve represents displacement/velocity/acceleration of common mode movement of membrane (flaps 101 and 103) in response to the modulation-driving signal SM, and similar to FIG. 25, background darkness represents acoustic resistance caused by open-close action of VV 112. For illustration purpose, waveform of membrane/flaps movement in FIG. 27(*a*) is assumed to be (or approximately plotted as) sinusoidal with constant amplitude, where the velocity/acceleration waveform is the 1st/2nd order derivative of the displacement waveform. As shown in FIG. 27(*a*), the timing of peak VV opening is aligned to the timing of a first peak acceleration of common mode membrane/flaps movement toward a first direction, as discussed above, such timing alignment resulting in auto-neutralization between the two acoustic pressure waves generated in subspaces +Z and −Z, causing the net acoustic pressure to be suppressed, illustrated as the flattened portions of the SE air pressure waveform in FIG. 27(*b*).

Also illustrated in FIG. 27(*a*), the timing of VV being closed is aligned to the timing of a second peak acceleration of common mode membrane/flaps movement toward a second direction, the second direction is opposite to the first direction. Since the VV is closed during/around the second peak acceleration, the acoustic pressure generated by the second peak acceleration of flaps 101 and 103 is able to radiate away from flaps 101 and 103, resulting in a highly asymmetrical acoustic pressure wave as illustrated by the half-sine portions of the SE air pressure waveform in FIG. 27(*b*).

Note that, the opening of virtual valve 112 does not determine the strength/amplitude of the acoustic pressure pulse, but determines how strong is the “near net-zero pressure” (or the auto-neutralization) effect. When the virtual valve 112 opening is wide, the “net-zero pressure” effect is strong, the auto-neutralization is complete, the asymmetry will be strong/obvious, resulting in strong/significant baseband signal or APPS effect. Conversely, when the virtual valve 112 open is narrow, the "net-zero pressure" effect is weak, the auto-neutralization is incomplete, lowering the asymmetry, resulting in weak baseband signal or APPS effect.

In an FEM simulation, the device C00 can produce 145 dB SPL at 20 Hz. From the FEM simulation, it is observed that, even though the SPL produced by the device C00 is about 12 dB lower than which produced by the device 600 (about 157 dB SPL at 20 Hz), under the same driving condition, THD (total harmonic distortion) of the device C00 is 10~20 dB lower than which of the device 600. Hence, the simulation validates the efficacy of the device C00, the APG device without cap structure or without chamber formed therewithin.

Please note that, the statement of the timing of VV opening being aligned to the timing of peak pressure within the chamber or peak velocity/acceleration of common mode membrane movement implicitly implies that a tolerance of ±e % is acceptable. That is, the case of the timing of VV opening being aligned to (1±e %) of peak pressure within the chamber or peak velocity/acceleration of common mode membrane movement is also within the scope of present invention, where e % may be 1%, 5% or 10%, depending on practical requirement.

Figure 28:
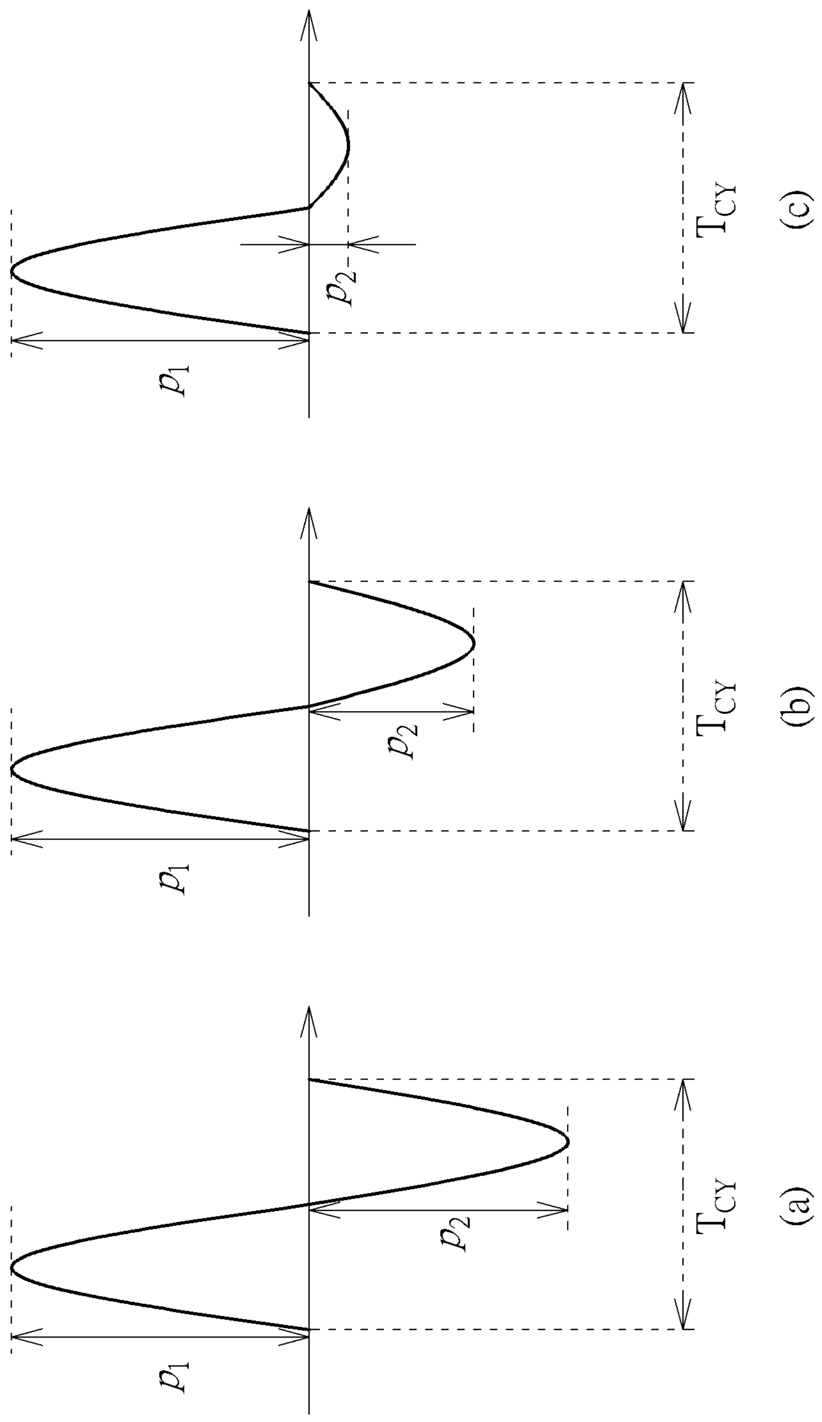
FIG. 28 illustrates full-cycle pulses within one operating cycle with different degrees of asymmetricity.

As for the pulse asymmetricity, FIG. 28 illustrates full-cycle pulses (within one operating cycle $T_{CY}$) with different degrees of asymmetricity. In the present invention, degree of asymmetricity may be evaluated by a ratio of $p_2$ to $p_1$, where $p_1>p_2$, $p_1$ represents a peak value of a first half-cycle pulse with a first polarity with respect to a level, and $p_2$ represents a peak value of a second half-cycle pulse with a second polarity with respect to the level. In acoustic area, the level may be corresponding to ambient condition, either ambient pressure (zero acoustic pressure) or zero acoustic airflow, where air pulses in the present invention may refer to either airflow pulses or air pressure pulses.

FIG. 28(*a*) illustrates a full-cycle pulse with $r=p_2/p_1>80\%$. The full-cycle pulse shown in FIG. 28(*a*) or with $r=p_2/p_1\approx1$ has low degree of asymmetricity. FIG. 28(*b*) illustrates a full-cycle pulse with $40\%\leq r=p_2/p_1\leq 60\%$. The full-cycle pulse shown in FIG. 28(*b*) or with $r=p_2/p_1$ 50% has median degree of asymmetricity. FIG. 28(*c*) illustrates a full-cycle pulse with $r=p_2/p_1<30\%$. The full-cycle pulse shown in FIG. 28(*c*) or with $r=p_2/p_1\rightarrow0$ has high degree of asymmetricity.

As discussed in the above, the higher the degree of asymmetricity is, the stronger the APPS effect and baseband spectrum components of the ultrasonic air pulses will be. In the present invention, asymmetric air pulse refers to air pulse with at least median degree of asymmetricity, meaning $r=p_2/p_1\leq 60\%$.

Note that, the demodulation operation of the APG device of the present invention is to produce asymmetric air pulses according to the amplitude of ultrasonic air pressure variation, which is produced via the modulation operation. In one view, the demodulation operation of the present invention is similar to the rectifier in AM (amplitude modulation) envelope detector in radio communication systems.

In radio communication systems, as known in the art, an envelope detector, a kind of radio AM (noncoherent) demodulator, comprises a rectifier and a low pass filter. The envelope detector would produce envelope corresponding to input amplitude modulated signal thereof. The input amplitude modulated signal of the envelop detector is usually highly symmetric with $r=p_2/p_1\rightarrow1$. One goal of the rectifier is to convert the symmetric amplitude modulated signal such that rectified amplitude modulated signal is highly asymmetric with $r=p_2/p_1\rightarrow0$. After low pass filtering the highly asymmetric rectified AM signal, the envelope corresponding to the amplitude modulated signal is recovered.

The demodulation operation of the present invention, which turns symmetric ultrasonic air pressure variation (with $r=p_2/p_1\rightarrow p_1\rightarrow1$) into to asymmetric air pulses (with $r=p_2/p_1\rightarrow p_1\rightarrow0$), is similar to the rectifier of the envelope detector as AM demodulator, where the low pass filtering operation is left to natural environment and human hearing system (or sound sensing device such as microphone), such that sound/music corresponding to the input audio signal $S_{IN}$ can be recovered, perceived by listener or measured by sound sensing equipment.

It is crucial for the demodulation operation of the APG device to create asymmetricity. In the present invention, pulse asymmetric relies on proper timing of opening which is aligned to membrane (flaps) movement which generates the ultrasonic air pressure variation. Different APG constructs would have different methodology of timing alignment, as shown in FIG. 25 and FIG. 27. In other words, a timing of forming the opening 112 is designated such that the plurality of air pulses produced by the APG device is asymmetric.

APG device producing asymmetric air pulses may also be applied to air pump/movement application, which may have cooling, drying or other functionality.

Figure 29:
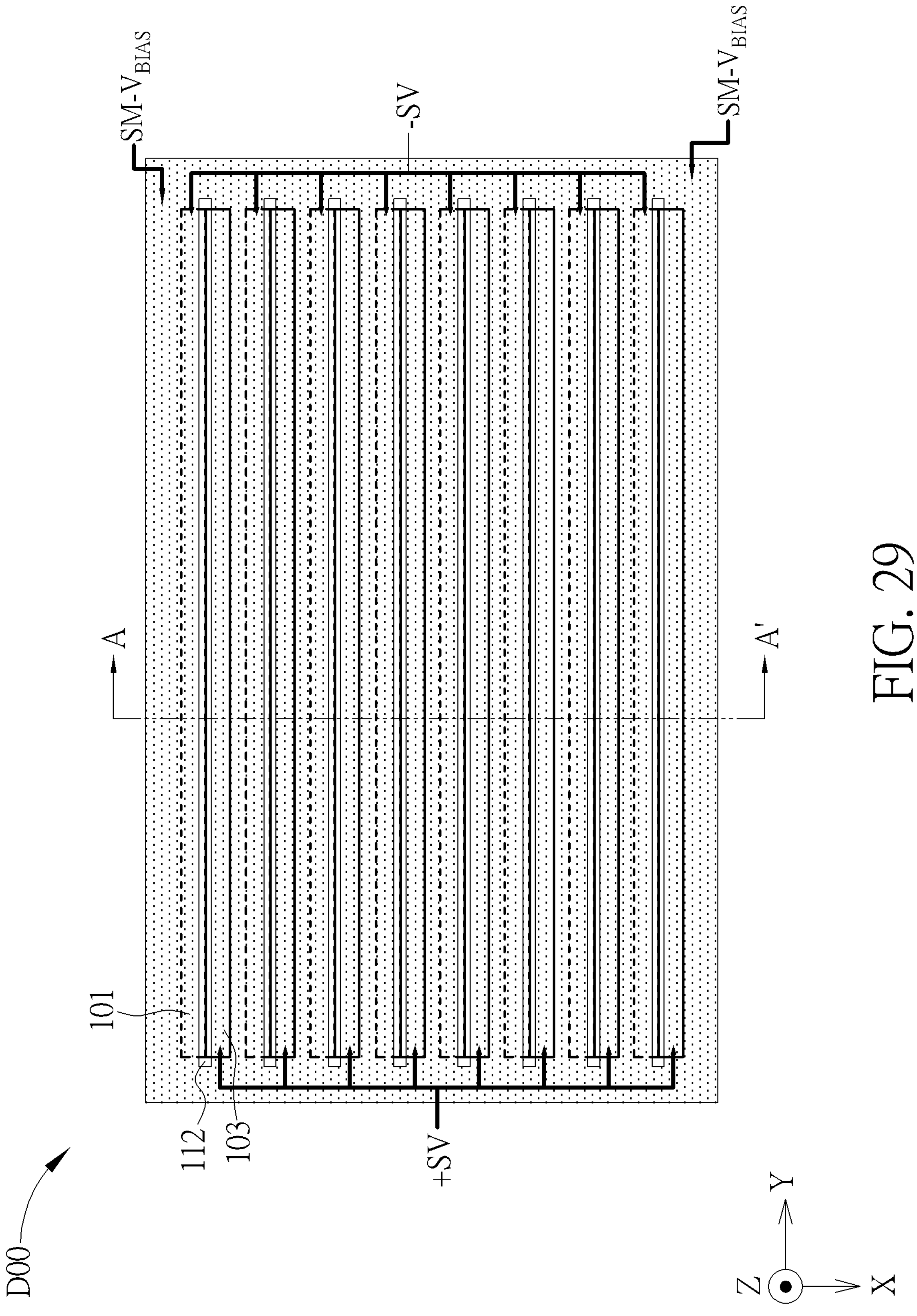
FIG. 29 is a schematic diagram of a top view of an air-pulse generating device according to an embodiment of the present invention.
Figure 30:
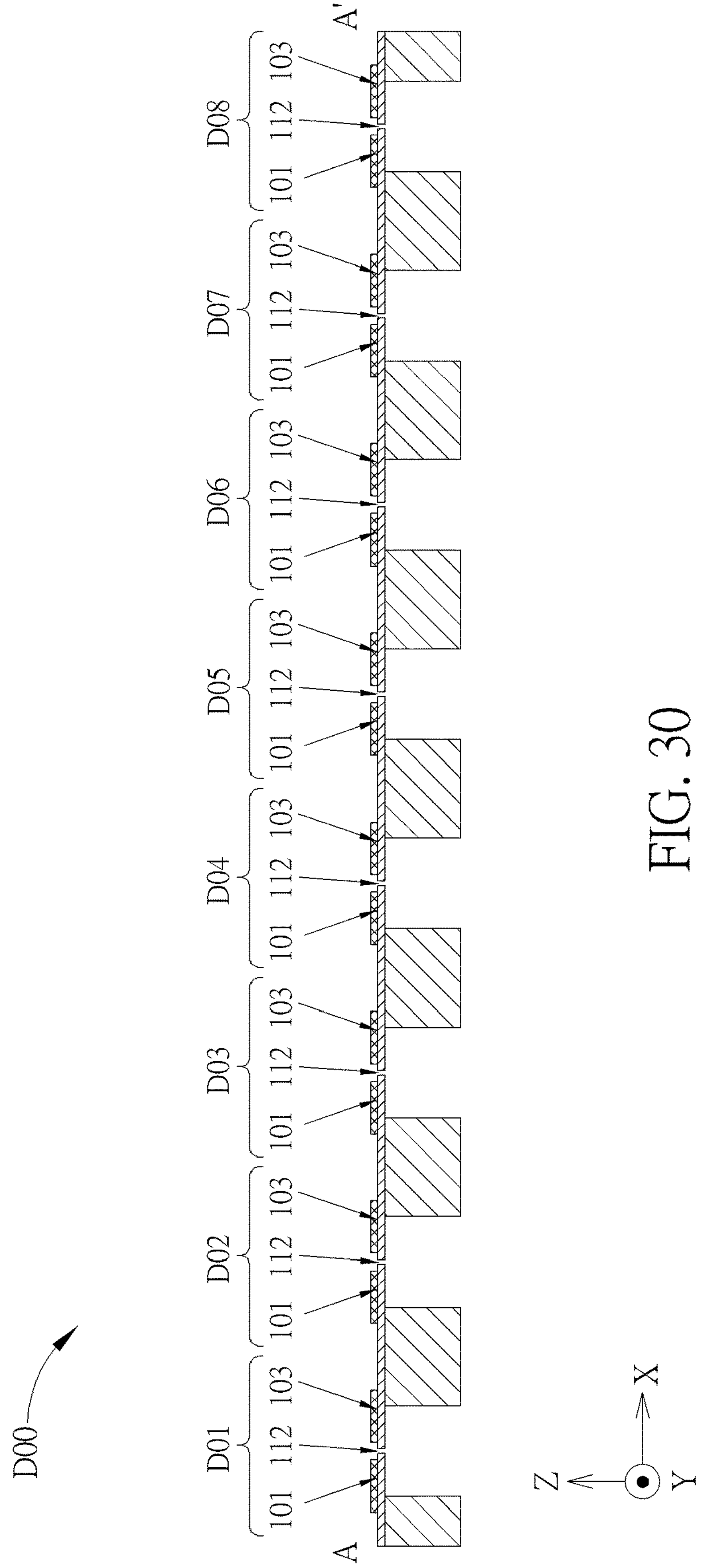
FIG. 30 is a schematic diagram of a side view of the air-pulse generating device of FIG. 29.

In addition, power consumption can be reduced by proper cell and signal route arrangement. For example, FIG. 29 illustrates a top view of an APG device D00 according to an embodiment of the present invention, and FIG. 30 illustrates a cross sectional view of the device D00 along an A-A' line shown in FIG. 29. The device D00 comprises D01~D08 cells arranged in an array. Each cell (D0$x$) may be one of the APG devices (e.g., 400~000) stated in the above. In FIG. 30, cap structures and subassemblies with conduit formed therein are omitted for brevity. Assume all the flaps in the device D00 are driven by the driving signal scheme 431, where top electrodes receive either signal +SV or signal −SV and bottom electrodes receive SM−$V_{BIAS}$.

In FIG. 29, long rectangular elongating along Y direction represents flap or top electrode of the actuators disposed on the flap. Shaded in background may represent that bottom electrodes of the actuators are electrically connected.

In the device D00, flaps (e.g., 101) receiving the signal −SV and flaps (e.g., 103) receiving the signal +SV are spatially interleaved. For example, when the flap 103 of the cell D01 receives the signal +SV, the flap 101 of the cell D02 is suggested to receive the signal −SV. It is because when the signals +SV, −SV toggle polarity or during transition periods of the signals +SV, −SV, there will be capacitive load (dis)charging current flowing through the bottom electrode in X direction, and the effective resistance of the bottom electrode, $R_{BT,P}$ (where p refers to parallel current flow), will be low since L/W<<1 and power consumption of the device D00 would be low, wherein L/W represents channel length/width in perspective of the (dis)charging current.

On the other hand, under a case that the driving signals −SV, +SV been wired in a pattern of {+SV, −SV}, {−SV, +SV}, {+SV, −SV}, {−SV, +SV}, {+SV, −SV}, {−SV, +SV}, {+SV, −SV}, {−SV, +SV} (not shown in FIG. 29), where { . . . , . . . } designates a pair of differential driving signal for one cell D0$x$, the load (dis)charging current would be in Y direction, and the effective resistance of the bottom electrode, $R_{BT,S}$ (where s refers to series current flow), would be much higher (i.e., $R_{BT,S}$>>$R_{BT,P}$, since L/W>>1) and power consumption of such scheme would be higher.

In other word, by utilizing the wiring scheme shown in FIG. 29, (take cells D01 and D02 as an example,) given the flap 103 of the cell D01 receiving the signal +SV is spatially disposed next to the flap 101 of the cell D02 receiving the signal −SV and transition periods of the signals ±SV temporally overlap, the current from the bottom electrodes of one flap (e.g., 103 of D01) travels to a neighboring flap (e.g., 101 of D02) directly, without needing to leave the device D00 from a pad and reenter device D00 from another pad. Hence, effective resistance of the bottom electrode is reduced significantly, so is the power consumption.

In addition, operating frequency may be enhanced by incorporating multiple (e.g., 2) cells. Specifically, the Air Pressure Pulse Speaker (APPS) sound producing scheme using APG devices of the present invention is a type of discrete time sampled system. On one hand, it is generally desirable to raise the sampling rate in such sampled system in order to achieve high fidelity. On the other hand, it is desirable to lower the operating frequency of the device in order to lower the required driving voltage and power consumption.

Instead of raising operating frequency as sampling rate for one APG device, it would be efficient to achieve high pulse/operating rate by interleaving (at least) two groups of (sub-systems) with low pulse/operating rate, temporally and spatially.

Figure 31:
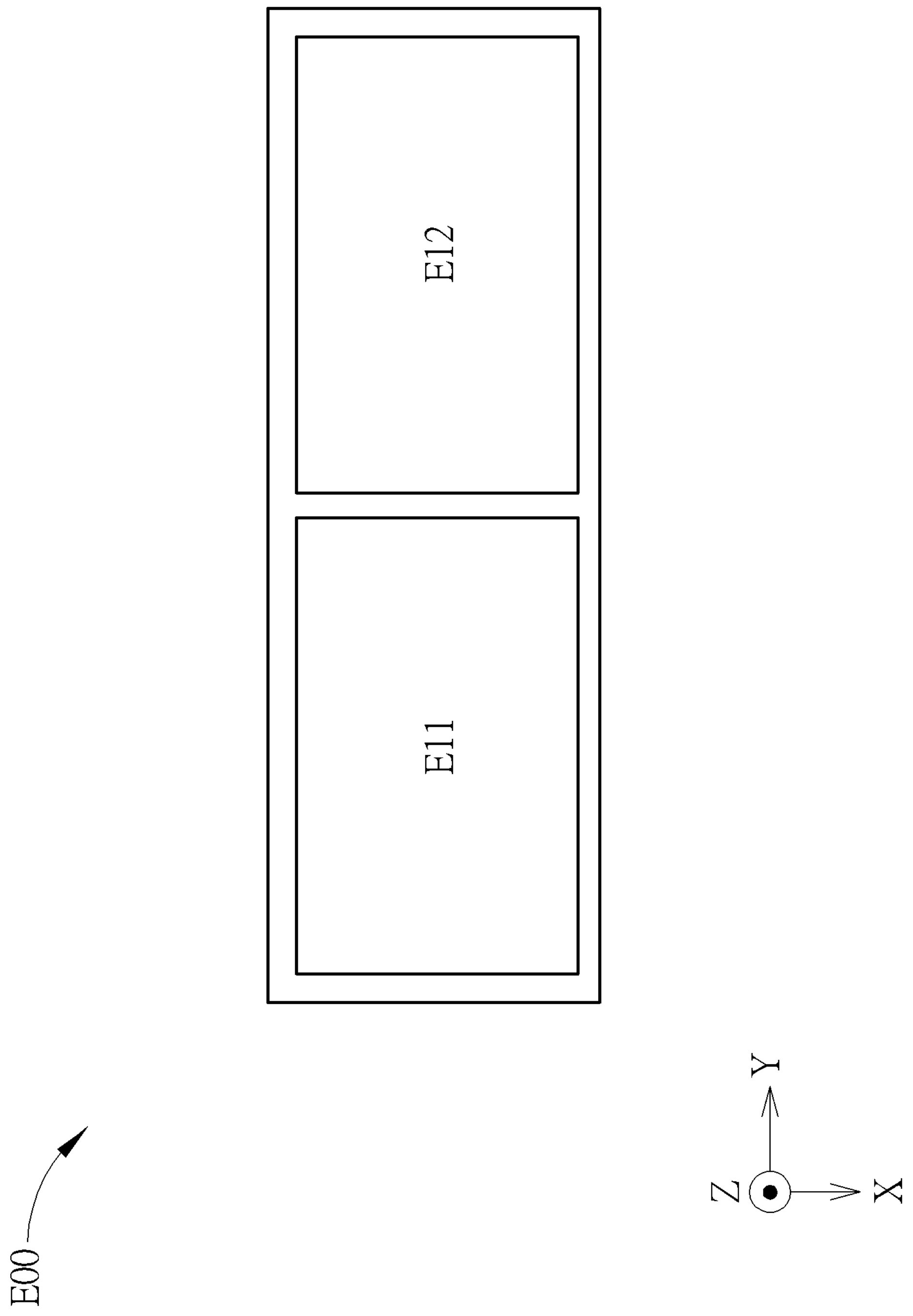
FIG. 31 is a top view of an air-pulse generating device according to an embodiment of the present invention.

FIG. 31 (showing spatial arrangement) is a top view of an APG device E00 according to an embodiment of the present invention. The device E00 comprises two cells E11 and E12 disposed next/adjacent to each other. The cell E11/E12 may be one of the ΔPG devices of the present invention.

Figure 32:
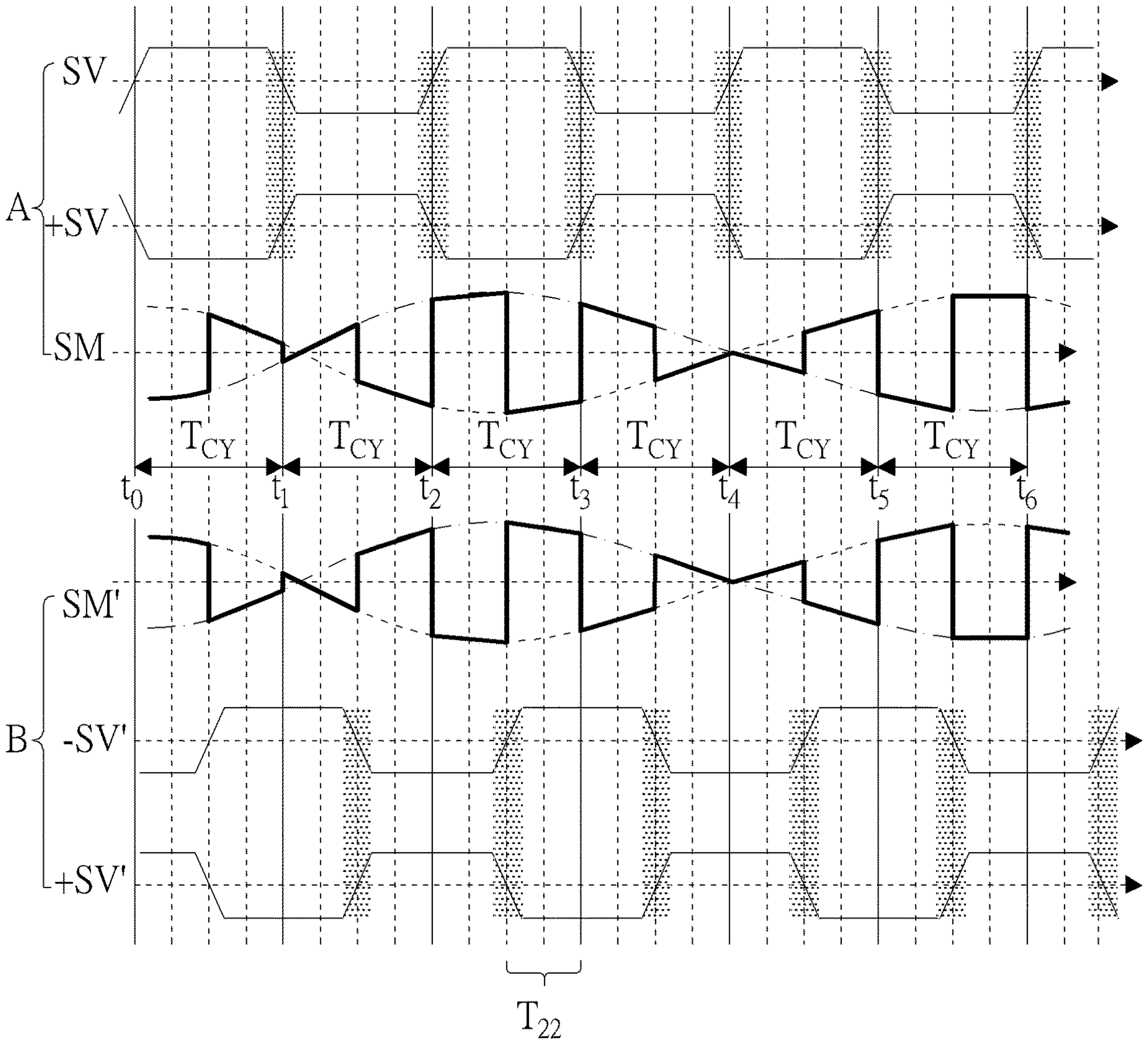
FIG. 32 illustrates waveforms of two set of (de)modulation-driving signals for the air-pulse generating device of FIG. 31.

FIG. 32 (showing temporal relationship) illustrates waveforms of two set of (de)modulation-driving signals, A and B, intended for the cells E11 and E12. The set A comprises demodulation-driving signal ±SV and modulation-driving signal SM; while the set B comprises demodulation-driving signal ±SV' and modulation-driving signal SM'. In the embodiment shown in FIG. 32, the demodulation-driving signal +SV'/−SV' of the signal set B is a delayed version of the demodulation-driving signal +SV/−SV of the signal set A. Furthermore, the signal +SV'/−SV' of the signal set B is the signal +SV/−SV of the signal set A delayed by $T_{CY}/2$, half of the operating cycle, where $T_{CY}=1/f_{UC}$ and $f_{UC}$ represents operating frequency for cell E11/E12. The modulation-driving signal SM' of the set B may be viewed as an inverse of or a polarity inversion version of the modulation-driving signal SM of the set A. The signals SM and SM' may have a relationship of SM'=−SM or SM+SM'=C, where C is some constant or bias. For example, when the modulation-driving signal SM of the set A has a pulse with negative polarity with respect to a voltage level (shown as dashed line in FIG. 32) within a time period $T_{22}$, the modulation-driving signal SM' of the set B would have a pulse with positive polarity with respect to the voltage level (shown as dashed line in FIG. 32) within the time period $T_{22}$.

By providing one set of the sets A and B to the cell E11 and the other set of the sets A and B to the cell E12, the device E00 may produce pulse array with pulse/sampling rate as $2\times f_{UC}$ and $f_{UC}$ is operating frequency for each cell.

Figure 33:
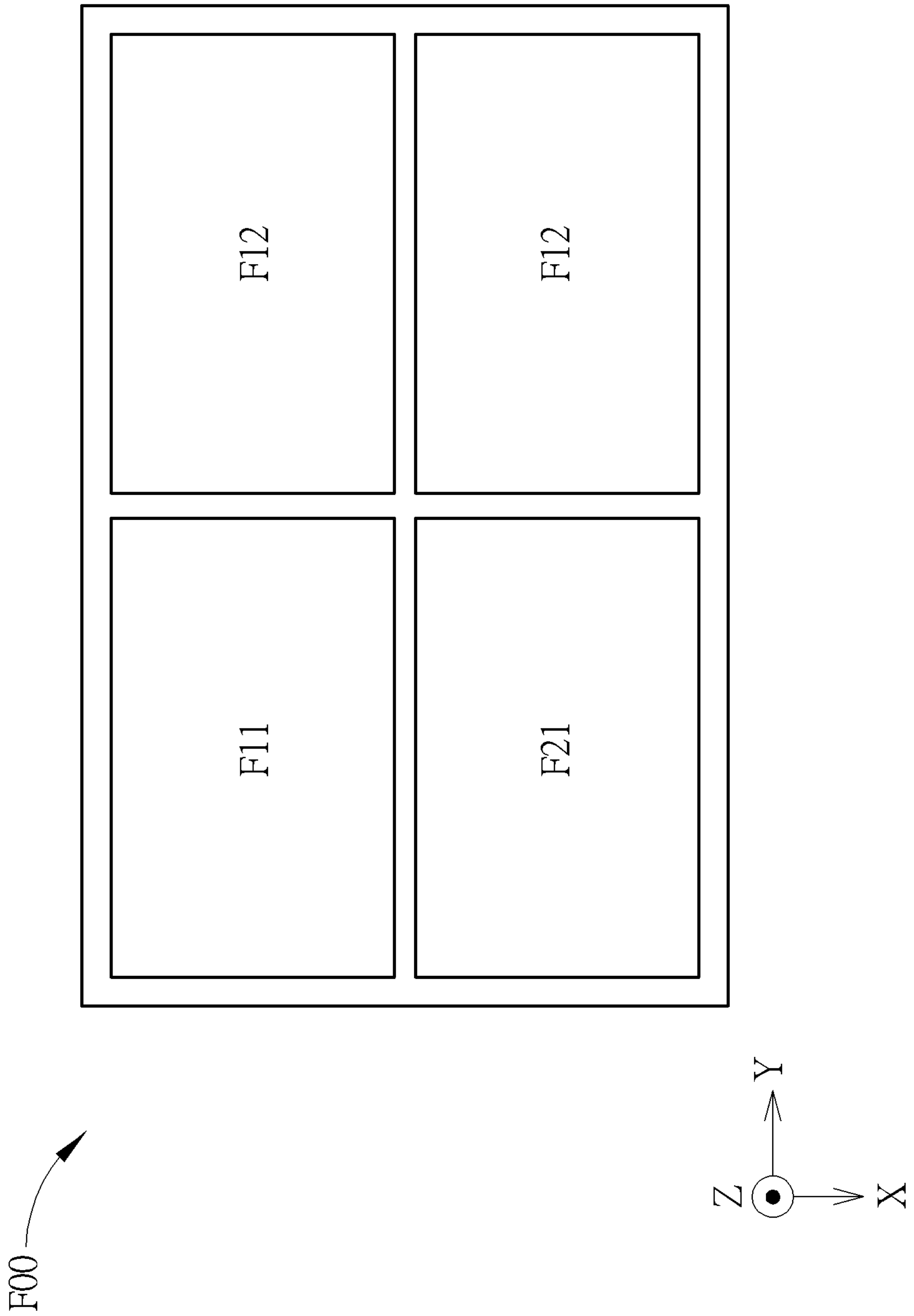
FIG. 33 is a top view of an air-pulse generating device according to an embodiment of the present invention.

FIG. 33 is a top view of an APG device F00 according to an embodiment of the present invention. The device F00 comprises cells F11, F12, F21 and F22, arranged in a 2×2 array. The cell in the device F00 may be one of the APG devices of the present invention. Two of the cells F11, F12, F21 and F22 may receive the signal set A, and the other two cells may receive the signal set B.

In an embodiment, the cells F11, F12 receive signal set A and the cells F21, F22 receive signal set B. In an embodiment, the cells F11, F22 receive signal set A and the cells F12, F21 receive signal set B. In an embodiment, the cells F11, F21 receive signal set A and the cells F12, F22 receive signal set B. Similar to the device E00, the device also produces pulse array with pulse/sampling rate as $2\times f_{UC}$.

Note that, conventional speaker (e.g., dynamic driver) using physical surface movement to generate acoustic wave faces problem of front-/back-radiating wave cancellation. When physical surface moves to cause airmass movement, a pair of soundwaves, i.e., front-radiating wave and back-radiating wave, are generated. The two soundwaves would cancel most of each other out, causing net SPL being much lower than the one that front-/back-radiating wave is measured alone.

Commonly adopted solution for front-/back-radiating wave canceling problem is to utilize either back enclosure or open baffle. Both solutions require physical size/dimension which is comparable to wavelength of lowest frequency of interest, e.g., wavelength as 1.5 meter of frequency as 230 Hz.

Compared to conventional speaker, the APG device of the present invention occupies only tens of square millimeters (much smaller than conventional speaker), and produces tremendous SPL especially in low frequency.

It is achieved by producing asymmetric amplitude modulated air pulses, where the modulation portion produces symmetric amplitude modulated air pressure variation via membrane movement and the demodulation portion produces the asymmetric amplitude modulated air pulses via virtual valve. The modulation portion and the demodulation portion are realized by flap pair(s) fabricated in the same fabrication layer, which reduces fabrication/production complexity. The modulation operation is performed via common mode movement of flap pair and the demodulation operation is performed via differential mode movement of flap pair, wherein the modulation operation (via common mode movement) and the demodulation operation (via differential mode movement) may be performed by single flap pair. Proper timing alignment between differential mode movement and common mode movement enhances asymmetricity of the output air pulses. In addition, horn-shape outlet or trumpet-like conduit helps on improving propagation efficiency.

In summary, the air-pulse generating device of the present invention comprises a modulating means and a demodulating means. The modulating means, which may be realized by applying the modulation-driving signal to the flap pair (102 or 104), is to produce amplitude modulated ultrasonic acoustic/air wave with ultrasonic carrier frequency according to a sound signal. The demodulating means, which may be realized by applying the pair of demodulation-driving signals +SV and −SV to the flap pair (102) or by driving the flap pair (102) to form the opening (112) periodically, to perform the synchronous demodulation operation of shifting spectral components of the ultrasonic acoustic/air wave UAW by $\pm n\times f_{UC}$. As a result, spectral component of the ultrasonic air wave corresponding to the sound signal is shifted to audible baseband and the sound signal is reproduced.

Those skilled in the art will readily observe that numerous modifications and alterations of the device and method may be made while retaining the teachings of the invention.

Accordingly, the above disclosure should be construed as limited only by the metes and bounds of the appended claims.

What is claimed is:

1. An air-pulse generating device, comprising:

a film structure, comprising a flap pair, wherein the flap pair comprises a first flap and a second flap opposite to each other;

wherein the film structure is driven to form an amplitude-modulated ultrasonic air pressure variation with an ultrasonic carrier frequency;

wherein the flap pair is driven to form a virtual valve or an opening at a rate synchronous with the ultrasonic carrier frequency;

wherein the air-pulse generating device produces a plurality of air pulses according to the amplitude-modulated ultrasonic air pressure variation, and the plurality of air pulses is asymmetric; wherein the first flap is driven by a first demodulation-driving signal and the second flap is driven by a second demodulation-driving signal, such that the flap pair forms the opening;

wherein the virtual valve is closed corresponding to a period within a first transition time of the first demodulation-driving signal and a second transition time of the second demodulation-driving signal.

2. The air-pulse generating device of claim 1, wherein a timing of forming the opening is designated such that the plurality of air pulses produced by the air-pulse generating device is asymmetric.

3. The air-pulse generating device of claim 1, wherein the flap pair is driven to form the amplitude-modulated ultrasonic air pressure variation with the ultrasonic carrier frequency;

wherein the flap pair is driven to form the opening at the rate synchronous with the ultrasonic carrier frequency;

wherein the air-pulse generating device produces the plurality of air pulses according to the amplitude-modulated ultrasonic air pressure variation, and the plurality of air pulses is asymmetric.

4. The air-pulse generating device of claim 1, wherein an opening time of the opening is aligned to a peak time when the amplitude-modulated ultrasonic air pressure variation achieves a peak.

5. The air-pulse generating device of claim 1, wherein a chamber is formed within the air-pulse generating device, and the film structure forms the amplitude-modulated ultrasonic air pressure variation within the chamber.

6. The air-pulse generating device of claim 1, wherein the opening is formed when a common mode movement of the flap pair is toward a first direction;

wherein the opening is closed when the common mode movement of the flap pair is toward a second direction opposite to the first direction.

7. The air-pulse generating device of claim 6, wherein a time of the virtual valve being opened is aligned to a time corresponding to a maximum speed of the common mode movement of the flap pair moving toward the first direction;

wherein a time of the virtual valve being closed is aligned to the time corresponding to the maximum speed of the common mode movement of the flap pair moving toward the second direction opposite to the first direction.

8. The air-pulse generating device of claim 6, wherein the first direction is toward an ambient.

9. The air-pulse generating device of claim 1, wherein a conduit is formed within the air-pulse generating device.

10. The air-pulse generating device of claim 9, wherein a common mode movement of the flap pair generating an air wave propagates through the conduit.

11. The air-pulse generating device of claim 9, wherein the conduit comprises a chamber, a passageway and a horn-shaped outlet.

12. The air-pulse generating device of claim 11, wherein a dimension of the chamber is narrowed toward the passageway.

13. The air-pulse generating device of claim 11, wherein a dimension of the horn-shaped outlet is widened toward an ambient.

14. The air-pulse generating device of claim 1, wherein a time of the virtual valve being opened is aligned to a time corresponding to a peak acceleration of a common mode movement of the flap pair.

15. The air-pulse generating device of claim 1, wherein a time corresponding to a peak of a differential mode movement of the flap pair is aligned to a time corresponding to a peak acceleration of a common mode movement of the flap pair.

16. The air-pulse generating device of claim 1, wherein a time of the virtual valve being closed is aligned to a time corresponding to a peak acceleration of a common mode movement of the flap pair.

17. The air-pulse generating device of claim 1, wherein the flap pair is driven perform a common mode movement, to form the amplitude-modulated ultrasonic air pressure variation with the ultrasonic carrier frequency;

wherein the flap pair is driven to perform a differential mode movement, to form the opening at the rate synchronous with the ultrasonic carrier frequency;

wherein a time of the differential mode movement is aligned to a time of the common mode movement, such that the air-pulse generating device produces a plurality of asymmetric air pulses.

18. The air-pulse generating device of claim 1, wherein the virtual valve is closed corresponding to the period during which the first flap is moving toward a first direction and the second flap is moving toward a second direction;

wherein the second direction is opposite to the first direction.

19. The air-pulse generating device of claim 1, wherein the virtual valve is closed in the period during which the first flap is moving toward a first direction with respect to a common mode movement and the second flap is moving toward a second direction with respect to the common mode movement;

wherein the second direction is opposite to the first direction;

wherein the flap pair performs the common mode movement so as to form the amplitude-modulated ultrasonic air pressure variation.

20. An air-pulse generating device, comprising:

a modulation means, configured to perform a modulation operation to generate an amplitude-modulated ultrasonic air pressure variation with an ultrasonic carrier frequency, wherein the amplitude-modulated ultrasonic air pressure variation is amplitude modulated according to an input audio signal, and the input audio signal is an electrical representation of a sound signal;

a demodulation means, configured to perform a synchronous demodulation operation on the amplitude-modulated ultrasonic air pressure variation, wherein spectral components of the amplitude-modulated ultrasonic air pressure variation are shifted by an amount of integer multiple of the ultrasonic carrier frequency via the synchronous demodulation operation;

wherein the air-pulse generating device comprises a flap pair;

wherein the flap pair comprises a first flap and a second flap opposite to each other;

wherein the demodulation means comprises applying a first demodulation-driving signal on the first flap and applying a second demodulation-driving signal on the second flap, such that the flap pair perform a differential mode movement to form an opening or a virtual valve;

wherein the virtual valve is closed corresponding to a period within a first transition time of the first demodulation-driving signal and a second transition time of the second demodulation-driving signal;

wherein the air-pulse generating device produces a plurality of air pulses via performing the synchronous demodulation operation;

wherein an audible spectrum component of the plurality of air pulses is corresponding to the sound signal.

21. The air-pulse generating device of claim 20, wherein the modulation means comprises applying a modulation-driving signal on the flap pair.

22. The air-pulse generating device of claim 20, wherein the air-pulse generating device comprises a first flap pair and a second flap pair;

wherein the demodulation means comprises applying a pair of demodulation-driving signals on the first flap pair;

wherein the modulation means comprises applying a modulation-driving signal on the second flap pair.

23. The air-pulse generating device of claim 20, wherein the demodulation means comprises driving the flap pair to form an opening periodically;

wherein an opening rate of the opening is the ultrasonic carrier frequency.

24. The air-pulse generating device of claim 20, wherein a pair of demodulation-driving signals comprise the first demodulation-driving signal and the second demodulation-driving signal;

wherein the pair of demodulation-driving signals is periodic and corresponding to a driving frequency which is synchronous with the ultrasonic carrier frequency.

25. The air-pulse generating device of claim 24, wherein the driving frequency of the pair of demodulation-driving signals is half of the ultrasonic carrier frequency.

26. The air-pulse generating device of claim 20, wherein the amplitude-modulated ultrasonic air pressure variation is double-sideband suppress carrier (DSB-SC) modulated;

wherein a spectrum of the amplitude-modulated ultrasonic air pressure variation comprises no signal spectrum component within a baseband.

27. The air-pulse generating device of claim 20, wherein the first and second flaps are fabricated at a single fabrication layer to form an opening at a rate synchronous with the ultrasonic carrier frequency, so as to shift a spectral component of the amplitude-modulated ultrasonic air pressure variation to a baseband.

* * * * *